United States Patent
Rodriguez

(10) Patent No.: US 8,006,273 B2
(45) Date of Patent: *Aug. 23, 2011

(54) UPDATING DOWNLOAD OPTIONS FOR UNAVAILABLE MEDIA CONTENT

(76) Inventor: Arturo A. Rodriguez, Norcross, GA (US)

( * ) Notice: Subject to any disclaimer, the term of this patent is extended or adjusted under 35 U.S.C. 154(b) by 218 days.

This patent is subject to a terminal disclaimer.

(21) Appl. No.: 12/180,416

(22) Filed: Jul. 25, 2008

(65) Prior Publication Data

US 2008/0281968 A1 Nov. 13, 2008

Related U.S. Application Data

(63) Continuation of application No. 10/008,429, filed on Nov. 13, 2001, now Pat. No. 7,526,788, which is a continuation-in-part of application No. 09/896,331, filed on Jun. 29, 2001, now Pat. No. 6,760,918, and a continuation-in-part of application No. 09/896,390, filed on Jun. 29, 2001, now Pat. No. 7,512,964, and a continuation-in-part of application No. 09/896,231, filed on Jun. 29, 2001.

(51) Int. Cl.
*H04N 7/173* (2006.01)
(52) U.S. Cl. .................. 725/86; 725/93; 725/97
(58) Field of Classification Search .............. 725/86–87, 725/89, 91, 95–97, 100, 104; 709/217, 227, 709/238
See application file for complete search history.

(56) References Cited

U.S. PATENT DOCUMENTS

| | | | |
|---|---|---|---|
| 3,676,580 A | 7/1972 | Beck | |
| 4,586,158 A | 4/1986 | Brandle | |
| 4,706,121 A | 11/1987 | Young | |
| 4,751,578 A | 6/1988 | Reiter et al. | |
| 4,821,097 A | 4/1989 | Robbins | |
| 4,827,250 A | 5/1989 | Stallkamp | |
| 4,885,775 A | 12/1989 | Lucas | |
| 4,908,713 A | 3/1990 | Levine | |
| 4,930,158 A | 5/1990 | Vogel | |
| 4,949,187 A | 8/1990 | Cohen | |

(Continued)

FOREIGN PATENT DOCUMENTS

CA 2 363 052 A1 11/1995

(Continued)

OTHER PUBLICATIONS

"A Brief History of the Trailer," http://www.movietrailertrash.com/views/history.html, 11 pages (Publicly known at least as early as Dec. 20, 2003).

(Continued)

*Primary Examiner* — Hunter B Lonsberry
(74) *Attorney, Agent, or Firm* — Merchant & Gould, P.C.

(57) ABSTRACT

A method provides download options for purchasable recordable media (PRM). The method includes storing a download option associated with a PRM content instance, updating the option, and transmitting the option to a digital home communication terminal. The option includes a time at which the PRM content instance is downloadable from a digital content delivery system. The update and transmit occurs in response to a change in availability of resources for transmitting the PRM content instance to a subscriber. Another method includes providing a download option to a user. The option is associated with a PRM content instance and includes an indication of a time at which the PRM content instance is available for download from the remote server. The option is updated responsive to a change in availability of the option due to a change in download resources that are associated with transmitting the PRM content instance to the subscriber.

20 Claims, 20 Drawing Sheets

U.S. PATENT DOCUMENTS

| | | |
|---|---|---|
| 4,963,994 A | 10/1990 | Levine |
| 4,984,152 A | 1/1991 | Mueller |
| 4,991,011 A | 2/1991 | Johnson et al. |
| 5,038,211 A | 8/1991 | Hallenbeck |
| 5,172,413 A | 12/1992 | Bradley et al. |
| 5,191,410 A | 3/1993 | McCalley et al. |
| 5,253,066 A | 10/1993 | Vogel |
| 5,291,554 A | 3/1994 | Morales |
| 5,293,357 A | 3/1994 | Hallenbeck |
| 5,317,391 A | 5/1994 | Banker et al. |
| 5,329,590 A | 7/1994 | Pond |
| 5,353,121 A | 10/1994 | Young et al. |
| 5,357,276 A | 10/1994 | Banker et al. |
| 5,359,362 A | 10/1994 | Lewis et al. |
| 5,371,551 A | 12/1994 | Logan et al. |
| 5,398,071 A | 3/1995 | Gove et al. |
| 5,410,326 A | 4/1995 | Goldstein |
| 5,410,343 A | 4/1995 | Coddington et al. |
| 5,410,344 A | 4/1995 | Graves et al. |
| 5,414,455 A | 5/1995 | Hooper et al. |
| 5,418,622 A | 5/1995 | Takeuchi |
| 5,448,313 A | 9/1995 | Kim et al. |
| 5,477,262 A | 12/1995 | Banker et al. |
| 5,479,268 A | 12/1995 | Young et al. |
| 5,481,542 A | 1/1996 | Logston et al. |
| 5,483,277 A | 1/1996 | Granger |
| 5,485,216 A | 1/1996 | Lee |
| 5,493,638 A | 2/1996 | Hooper et al. |
| 5,508,815 A | 4/1996 | Levine |
| 5,512,958 A | 4/1996 | Rzeszewski |
| 5,515,495 A | 5/1996 | Ikemoto |
| 5,521,631 A | 5/1996 | Budow et al. |
| 5,530,754 A | 6/1996 | Garfinkle |
| 5,532,735 A | 7/1996 | Blahut et al. |
| 5,532,754 A | 7/1996 | Young et al. |
| 5,544,354 A | 8/1996 | May et al. |
| 5,555,441 A | 9/1996 | Haddad |
| 5,557,541 A | 9/1996 | Schulhof et al. |
| 5,562,732 A | 10/1996 | Eisenberg |
| 5,568,272 A | 10/1996 | Levine |
| 5,583,560 A | 12/1996 | Florin et al. |
| 5,583,995 A | 12/1996 | Gardner et al. |
| 5,585,821 A | 12/1996 | Ishikura et al. |
| 5,585,838 A | 12/1996 | Lawler et al. |
| 5,589,892 A | 12/1996 | Knee et al. |
| 5,592,551 A | 1/1997 | Lett et al. |
| 5,594,509 A | 1/1997 | Florin et al. |
| 5,598,524 A | 1/1997 | Johnston, Jr. et al. |
| 5,600,364 A | 2/1997 | Hendricks et al. |
| 5,600,573 A | 2/1997 | Hendricks et al. |
| 5,614,940 A | 3/1997 | Cobbley et al. |
| 5,619,247 A | 4/1997 | Russo |
| 5,619,249 A | 4/1997 | Billock et al. |
| 5,621,456 A | 4/1997 | Florin et al. |
| 5,623,613 A | 4/1997 | Rowe et al. |
| 5,625,405 A | 4/1997 | DuLac et al. |
| 5,625,864 A | 4/1997 | Budow et al. |
| 5,629,732 A | 5/1997 | Moskowitz et al. |
| 5,631,693 A | 5/1997 | Wunderlich et al. |
| 5,632,681 A | 5/1997 | Bakoglu et al. |
| 5,635,979 A | 6/1997 | Kostreski et al. |
| 5,635,980 A | 6/1997 | Lin et al. |
| 5,635,989 A | 6/1997 | Rothmuller |
| 5,650,831 A | 7/1997 | Farwell |
| 5,659,350 A | 8/1997 | Hendricks et al. |
| 5,664,133 A | 9/1997 | Malamud |
| 5,666,293 A | 9/1997 | Metz et al. |
| 5,671,411 A | 9/1997 | Watts et al. |
| 5,675,752 A | 10/1997 | Scott et al. |
| 5,682,206 A | 10/1997 | Wehmeyer et al. |
| 5,682,597 A | 10/1997 | Ganek et al. |
| 5,684,918 A | 11/1997 | Abecassis |
| 5,686,954 A | 11/1997 | Yoshinobu et al. |
| 5,687,331 A | 11/1997 | Volk et al. |
| 5,689,641 A | 11/1997 | Ludwig et al. |
| 5,694,176 A | 12/1997 | Bruette et al. |
| 5,694,546 A | 12/1997 | Reisman |
| 5,699,107 A | 12/1997 | Lawler et al. |
| 5,715,169 A | 2/1998 | Noguchi |
| 5,715,515 A | 2/1998 | Akins, III et al. |
| 5,721,827 A | 2/1998 | Logan et al. |
| 5,721,829 A | 2/1998 | Dunn et al. |
| 5,721,897 A | 2/1998 | Rubinstein |
| 5,724,106 A | 3/1998 | Autry et al. |
| 5,724,521 A | 3/1998 | Dedrick |
| 5,724,646 A | 3/1998 | Ganek et al. |
| 5,727,060 A | 3/1998 | Young |
| 5,729,549 A | 3/1998 | Kostreski et al. |
| 5,732,216 A | 3/1998 | Logan et al. |
| 5,734,853 A | 3/1998 | Hendricks et al. |
| 5,737,028 A | 4/1998 | Bertram et al. |
| 5,740,304 A | 4/1998 | Katsuyama et al. |
| 5,740,549 A | 4/1998 | Reilly et al. |
| 5,745,837 A | 4/1998 | Fuhrmann |
| 5,748,493 A | 5/1998 | Lightfoot et al. |
| 5,751,282 A | 5/1998 | Girard et al. |
| 5,752,160 A | 5/1998 | Dunn |
| 5,754,773 A | 5/1998 | Ozden et al. |
| 5,764,873 A | 6/1998 | Magid et al. |
| 5,764,899 A | 6/1998 | Eggleston et al. |
| 5,771,435 A | 6/1998 | Brown |
| 5,774,170 A | 6/1998 | Hite et al. |
| 5,778,077 A | 7/1998 | Davidson |
| 5,790,170 A | 8/1998 | Suzuki |
| 5,790,176 A | 8/1998 | Craig |
| 5,790,935 A | 8/1998 | Payton |
| 5,790,940 A | 8/1998 | Laborde et al. |
| 5,796,828 A | 8/1998 | Tsukamoto et al. |
| 5,798,785 A | 8/1998 | Hendricks et al. |
| 5,799,063 A | 8/1998 | Krane |
| 5,801,747 A | 9/1998 | Bedard |
| 5,801,787 A | 9/1998 | Schein et al. |
| 5,802,502 A | 9/1998 | Gell et al. |
| 5,808,608 A | 9/1998 | Young et al. |
| 5,808,611 A | 9/1998 | Johnson et al. |
| 5,809,204 A | 9/1998 | Young et al. |
| 5,812,123 A | 9/1998 | Rowe et al. |
| 5,812,124 A | 9/1998 | Eick et al. |
| 5,812,786 A | 9/1998 | Seazholtz et al. |
| 5,822,123 A | 10/1998 | Davis et al. |
| 5,826,110 A | 10/1998 | Ozden et al. |
| 5,828,419 A | 10/1998 | Bruette et al. |
| 5,828,845 A | 10/1998 | Jagadish et al. |
| 5,835,843 A | 11/1998 | Haddad |
| 5,838,314 A | 11/1998 | Neel et al. |
| 5,844,620 A | 12/1998 | Coleman et al. |
| 5,848,352 A | 12/1998 | Dougherty et al. |
| 5,850,218 A | 12/1998 | LaJoie et al. |
| 5,856,975 A | 1/1999 | Rostoker et al. |
| 5,859,641 A | 1/1999 | Cave |
| 5,861,906 A | 1/1999 | Dunn et al. |
| 5,877,756 A | 3/1999 | Um |
| 5,880,768 A | 3/1999 | Lemmons et al. |
| 5,886,690 A | 3/1999 | Pond et al. |
| 5,886,732 A | 3/1999 | Humpleman |
| 5,895,454 A | 4/1999 | Harrington |
| 5,898,456 A | 4/1999 | Wahl |
| 5,900,905 A | 5/1999 | Shoff et al. |
| 5,905,522 A | 5/1999 | Lawler |
| 5,905,942 A | 5/1999 | Stoel et al. |
| 5,907,323 A | 5/1999 | Lawler et al. |
| 5,913,040 A | 6/1999 | Rakavy et al. |
| 5,914,712 A | 6/1999 | Sartain et al. |
| 5,914,746 A | 6/1999 | Matthews, III et al. |
| 5,915,068 A | 6/1999 | Levine |
| 5,917,822 A | 6/1999 | Lyles et al. |
| 5,929,849 A | 7/1999 | Kikinis |
| 5,930,493 A | 7/1999 | Ottesen et al. |
| 5,935,206 A | 8/1999 | Dixon et al. |
| 5,936,659 A | 8/1999 | Viswanathan |
| 5,940,073 A | 8/1999 | Klosterman et al. |
| 5,943,047 A | 8/1999 | Suzuki |
| 5,956,024 A | 9/1999 | Strickland et al. |
| 5,956,716 A | 9/1999 | Kenner et al. |
| 5,960,411 A | 9/1999 | Hartman et al. |
| 5,961,603 A | 10/1999 | Kunkel et al. |
| 5,969,748 A | 10/1999 | Casement et al. |

| Patent | Date | Inventor |
|---|---|---|
| 5,978,043 A | 11/1999 | Blonstein et al. |
| 5,983,273 A | 11/1999 | White et al. |
| 5,986,650 A | 11/1999 | Ellis et al. |
| 5,987,256 A | 11/1999 | Wu et al. |
| 5,990,881 A | 11/1999 | Inoue et al. |
| 5,990,890 A | 11/1999 | Etheredge |
| 5,990,927 A | 11/1999 | Hendricks et al. |
| 5,995,134 A | 11/1999 | Hayashi |
| 6,002,401 A | 12/1999 | Baker |
| 6,005,565 A | 12/1999 | Legall et al. |
| 6,005,631 A | 12/1999 | Anderson et al. |
| 6,006,257 A | 12/1999 | Slezak |
| 6,008,803 A | 12/1999 | Rowe et al. |
| 6,008,836 A | 12/1999 | Bruck et al. |
| 6,014,184 A | 1/2000 | Knee et al. |
| 6,014,694 A | 1/2000 | Aharoni et al. |
| 6,016,348 A | 1/2000 | Blatter et al. |
| 6,018,359 A | 1/2000 | Kermode |
| 6,018,372 A | 1/2000 | Etheredge |
| 6,020,912 A | 2/2000 | De Lang |
| 6,023,267 A | 2/2000 | Chapuis et al. |
| 6,025,837 A | 2/2000 | Matthews, III et al. |
| 6,025,868 A | 2/2000 | Russo |
| 6,025,869 A | 2/2000 | Stas et al. |
| 6,026,376 A | 2/2000 | Kenney |
| 6,035,281 A | 3/2000 | Crosskey et al. |
| 6,037,933 A | 3/2000 | Blonstein et al. |
| 6,049,831 A | 4/2000 | Gardell et al. |
| 6,057,872 A | 5/2000 | Candelore |
| 6,061,097 A | 5/2000 | Satterfield |
| 6,064,380 A | 5/2000 | Swenson et al. |
| 6,064,980 A | 5/2000 | Jacobi et al. |
| 6,070,186 A | 5/2000 | Nishio |
| 6,072,982 A | 6/2000 | Haddad |
| 6,073,105 A | 6/2000 | Sutcliffe et al. |
| 6,075,575 A | 6/2000 | Schein et al. |
| 6,081,263 A | 6/2000 | LeGall et al. |
| 6,085,185 A | 7/2000 | Matsuzawa et al. |
| 6,094,680 A | 7/2000 | Hokanson |
| 6,097,383 A | 8/2000 | Gaughan et al. |
| 6,098,082 A | 8/2000 | Gibbon et al. |
| 6,101,512 A | 8/2000 | DeRose et al. |
| 6,108,002 A | 8/2000 | Ishizaki |
| 6,108,042 A | 8/2000 | Adams et al. |
| 6,118,445 A | 9/2000 | Nonomura et al. |
| 6,118,976 A | 9/2000 | Arias et al. |
| 6,124,878 A | 9/2000 | Adams et al. |
| 6,125,259 A | 9/2000 | Perlman |
| 6,133,909 A | 10/2000 | Schein et al. |
| 6,137,539 A | 10/2000 | Lownes et al. |
| 6,138,139 A | 10/2000 | Beck et al. |
| 6,141,003 A | 10/2000 | Chor et al. |
| 6,141,488 A | 10/2000 | Knudson et al. |
| 6,145,083 A | 11/2000 | Shaffer et al. |
| 6,148,332 A | 11/2000 | Brewer et al. |
| 6,151,059 A | 11/2000 | Schein et al. |
| 6,157,377 A | 12/2000 | Shah-Nazaroff et al. |
| 6,157,413 A | 12/2000 | Hanafee et al. |
| 6,160,546 A | 12/2000 | Thompson et al. |
| 6,160,989 A | 12/2000 | Hendricks et al. |
| 6,163,272 A | 12/2000 | Goode et al. |
| 6,166,730 A | 12/2000 | Goode et al. |
| 6,169,543 B1 | 1/2001 | Wehmeyer |
| 6,172,674 B1 | 1/2001 | Etheredge |
| 6,172,677 B1 | 1/2001 | Stautner et al. |
| 6,177,931 B1 | 1/2001 | Alexander et al. |
| 6,181,333 B1 | 1/2001 | Chaney et al. |
| 6,181,693 B1 | 1/2001 | Maresca |
| 6,182,287 B1 | 1/2001 | Schneidewend et al. |
| 6,184,877 B1 | 2/2001 | Dodson et al. |
| 6,188,684 B1 | 2/2001 | Setoyama et al. |
| 6,195,689 B1 | 2/2001 | Bahlmann |
| 6,201,540 B1 | 3/2001 | Gallup et al. |
| 6,205,485 B1 | 3/2001 | Kikinis |
| 6,208,335 B1 | 3/2001 | Gordon et al. |
| 6,209,130 B1 | 3/2001 | Rector et al. |
| 6,216,264 B1 | 4/2001 | Maze et al. |
| 6,238,290 B1 | 5/2001 | Tarr et al. |
| 6,239,845 B1 | 5/2001 | Itagaki et al. |
| 6,240,555 B1 | 5/2001 | Shoff et al. |
| 6,243,142 B1 | 6/2001 | Mugura et al. |
| 6,249,532 B1 | 6/2001 | Yoshikawa et al. |
| 6,253,375 B1 | 6/2001 | Gordon et al. |
| 6,259,733 B1 | 7/2001 | Kaye et al. |
| 6,266,814 B1 | 7/2001 | Lemmons et al. |
| 6,268,849 B1 | 7/2001 | Boyer et al. |
| 6,272,484 B1 | 8/2001 | Martin et al. |
| 6,275,268 B1 | 8/2001 | Ellis et al. |
| 6,282,713 B1 | 8/2001 | Kitsukawa et al. |
| 6,289,346 B1 | 9/2001 | Milewski et al. |
| 6,289,514 B1 | 9/2001 | Link et al. |
| 6,292,624 B1 | 9/2001 | Saib et al. |
| 6,305,019 B1 | 10/2001 | Dyer et al. |
| 6,311,011 B1 | 10/2001 | Kuroda |
| 6,314,572 B1 | 11/2001 | LaRocca et al. |
| 6,314,573 B1 | 11/2001 | Gordon et al. |
| 6,314,575 B1 | 11/2001 | Billock et al. |
| 6,317,777 B1 | 11/2001 | Skarbo et al. |
| 6,317,885 B1 | 11/2001 | Fries |
| 6,323,911 B1 | 11/2001 | Schein et al. |
| 6,327,628 B1 | 12/2001 | Anuff et al. |
| 6,335,936 B1 | 1/2002 | Bossemeyer, Jr. et al. |
| 6,347,400 B1 | 2/2002 | Ohkura et al. |
| 6,349,410 B1 | 2/2002 | Lortz |
| 6,353,448 B1 | 3/2002 | Scarborough et al. |
| 6,357,046 B1 | 3/2002 | Thompson et al. |
| 6,359,636 B1 | 3/2002 | Schindler et al. |
| 6,360,367 B1 | 3/2002 | Yamamoto |
| 6,362,841 B1 | 3/2002 | Nykanen |
| 6,367,078 B1 | 4/2002 | Lasky |
| 6,378,130 B1 | 4/2002 | Adams |
| 6,381,332 B1 | 4/2002 | Glaab |
| 6,385,614 B1 | 5/2002 | Vellandi |
| 6,393,585 B1 | 5/2002 | Houha et al. |
| 6,396,549 B1 | 5/2002 | Weber |
| 6,400,280 B1 | 6/2002 | Osakabe |
| 6,401,243 B1 | 6/2002 | Suzuki |
| 6,405,239 B1 | 6/2002 | Addington et al. |
| 6,421,067 B1 | 7/2002 | Kamen et al. |
| 6,429,899 B1 | 8/2002 | Nio et al. |
| 6,434,748 B1 | 8/2002 | Shen et al. |
| 6,441,862 B1 | 8/2002 | Yuen et al. |
| 6,442,332 B1 | 8/2002 | Knudson et al. |
| 6,442,755 B1 | 8/2002 | Lemmons et al. |
| 6,442,756 B1 | 8/2002 | Durden et al. |
| 6,446,261 B1 | 9/2002 | Rosser |
| 6,446,262 B1 | 9/2002 | Malaure et al. |
| 6,460,181 B1 | 10/2002 | Donnelly |
| 6,463,585 B1 | 10/2002 | Hendricks et al. |
| 6,476,833 B1 | 11/2002 | Moshfeghi |
| 6,480,669 B1 | 11/2002 | Tsumagari et al. |
| 6,481,010 B2 | 11/2002 | Nishikawa et al. |
| 6,481,011 B1 | 11/2002 | Lemmons |
| 6,486,920 B2 | 11/2002 | Arai et al. |
| 6,501,902 B1 | 12/2002 | Wang |
| 6,505,348 B1 | 1/2003 | Knowles et al. |
| 6,507,949 B1 | 1/2003 | Jonason et al. |
| 6,510,556 B1 | 1/2003 | Kusaba et al. |
| 6,515,680 B1 | 2/2003 | Hendricks et al. |
| 6,515,710 B1 | 2/2003 | Koshimuta |
| 6,519,770 B2 | 2/2003 | Ford |
| 6,526,575 B1 | 2/2003 | McCoy et al. |
| 6,526,577 B1 | 2/2003 | Knudson et al. |
| 6,532,589 B1 | 3/2003 | Proehl et al. |
| 6,536,041 B1 | 3/2003 | Knudson et al. |
| 6,539,548 B1 | 3/2003 | Hendricks et al. |
| 6,543,053 B1 | 4/2003 | Li et al. |
| 6,545,669 B1 | 4/2003 | Kinawi et al. |
| 6,557,030 B1 | 4/2003 | Hoang |
| 6,563,515 B1 | 5/2003 | Reynolds et al. |
| 6,564,378 B1 | 5/2003 | Satterfield et al. |
| 6,564,379 B1 | 5/2003 | Knudson et al. |
| 6,564,383 B1 | 5/2003 | Combs et al. |
| 6,571,390 B1 | 5/2003 | Dunn et al. |
| 6,574,793 B1 | 6/2003 | Ngo et al. |
| 6,578,077 B1 | 6/2003 | Rakoshitz et al. |
| 6,594,699 B1 | 7/2003 | Sahai et al. |
| 6,594,825 B1 | 7/2003 | Goldschmidt Iki et al. |

| | | |
|---|---|---|
| 6,600,496 B1 | 7/2003 | Wagner et al. |
| 6,604,240 B2 | 8/2003 | Ellis et al. |
| 6,609,253 B1 | 8/2003 | Swix et al. |
| 6,611,958 B1 | 8/2003 | Shintani et al. |
| 6,614,440 B1 | 9/2003 | Bowen et al. |
| 6,614,988 B1 | 9/2003 | Sampsell |
| 6,628,302 B2 | 9/2003 | White et al. |
| 6,631,413 B1 | 10/2003 | Aggarwal et al. |
| 6,642,939 B1 | 11/2003 | Vallone et al. |
| 6,647,548 B1 | 11/2003 | Lu et al. |
| 6,651,044 B1 | 11/2003 | Stoneman |
| 6,662,365 B1 | 12/2003 | Sullivan et al. |
| 6,665,869 B1 | 12/2003 | Ellis et al. |
| 6,671,328 B1 | 12/2003 | Poon et al. |
| 6,675,384 B1 | 1/2004 | Block et al. |
| 6,675,385 B1 | 1/2004 | Wang |
| 6,678,891 B1 | 1/2004 | Wilcox et al. |
| 6,681,395 B1 | 1/2004 | Nishi |
| 6,681,396 B1 | 1/2004 | Bates et al. |
| 6,684,025 B1 | 1/2004 | Perlman |
| 6,684,400 B1 | 1/2004 | Goode et al. |
| 6,697,376 B1 | 2/2004 | Son et al. |
| 6,698,023 B2 | 2/2004 | Levitan |
| 6,701,523 B1 | 3/2004 | Hancock et al. |
| 6,701,528 B1 | 3/2004 | Arsenault et al. |
| 6,706,311 B2 | 3/2004 | Wong et al. |
| 6,708,336 B1 | 3/2004 | Bruette |
| 6,717,590 B1 | 4/2004 | Sullivan et al. |
| 6,718,552 B1 | 4/2004 | Goode |
| 6,725,461 B1 | 4/2004 | Dougherty et al. |
| 6,731,310 B2 | 5/2004 | Craycroft et al. |
| 6,732,367 B1 | 5/2004 | Ellis et al. |
| 6,732,369 B1 | 5/2004 | Schein et al. |
| 6,732,372 B2 | 5/2004 | Tomita et al. |
| 6,735,572 B2 | 5/2004 | Landesmann |
| 6,738,982 B1 | 5/2004 | Jerding |
| 6,757,909 B1 | 6/2004 | Maruo et al. |
| 6,760,918 B2 | 7/2004 | Rodriguez et al. |
| 6,769,127 B1 | 7/2004 | Bonomi et al. |
| 6,771,290 B1 | 8/2004 | Hoyle |
| 6,772,209 B1 | 8/2004 | Chernock et al. |
| 6,772,433 B1 | 8/2004 | LaJoie et al. |
| 6,782,550 B1 | 8/2004 | Cao |
| 6,791,620 B1 | 9/2004 | Elswick et al. |
| 6,792,615 B1 | 9/2004 | Rowe et al. |
| 6,801,533 B1 | 10/2004 | Barkley |
| 6,817,028 B1 | 11/2004 | Jerding et al. |
| 6,832,386 B1 | 12/2004 | Jerding et al. |
| 6,847,969 B1 | 1/2005 | Mathai et al. |
| 6,876,628 B2 | 4/2005 | Howard et al. |
| 6,898,762 B2 | 5/2005 | Ellis et al. |
| 6,901,385 B2 | 5/2005 | Okamoto et al. |
| 6,957,386 B2 | 10/2005 | Nishina et al. |
| 6,968,372 B1 | 11/2005 | Thompson et al. |
| 6,978,310 B1 | 12/2005 | Rodriguez et al. |
| 6,978,475 B1 | 12/2005 | Kunin et al. |
| 6,986,156 B1 | 1/2006 | Rodriguez et al. |
| 6,990,676 B1 | 1/2006 | Proehl et al. |
| 6,990,677 B1 | 1/2006 | Pietraszak et al. |
| 6,993,782 B1 | 1/2006 | Newberry et al. |
| 7,010,801 B1 | 3/2006 | Jerding et al. |
| 7,024,681 B1 | 4/2006 | Fransman et al. |
| 7,039,944 B1 | 5/2006 | Cho et al. |
| 7,062,466 B2 | 6/2006 | Wagner et al. |
| 7,076,734 B2 | 7/2006 | Wolff et al. |
| 7,086,077 B2 | 8/2006 | Giammaressi |
| 7,103,903 B1 | 9/2006 | Kydd |
| 7,110,714 B1 | 9/2006 | Kay et al. |
| 7,117,440 B2 | 10/2006 | Gordon et al. |
| 7,120,926 B1 | 10/2006 | Safadi et al. |
| 7,143,430 B1 | 11/2006 | Fingerman et al. |
| 7,150,031 B1 | 12/2006 | Rodriguez et al. |
| 7,155,733 B2 | 12/2006 | Rodriguez et al. |
| 7,180,422 B2 | 2/2007 | Milenkovic et al. |
| 7,185,355 B1 | 2/2007 | Ellis et al. |
| 7,188,356 B1 | 3/2007 | Miura et al. |
| 7,194,757 B1 | 3/2007 | Fish et al. |
| 7,200,857 B1 | 4/2007 | Rodriguez et al. |
| 7,237,251 B1 | 6/2007 | Oz et al. |
| 7,243,364 B2 | 7/2007 | Dunn et al. |
| 7,249,366 B1 | 7/2007 | Flavin |
| 7,324,552 B1 | 1/2008 | Galand et al. |
| 7,324,553 B1 | 1/2008 | Varier et al. |
| 7,334,251 B2 | 2/2008 | Rodriguez et al. |
| 7,340,759 B1 | 3/2008 | Rodriguez |
| 7,343,614 B1 | 3/2008 | Hendricks et al. |
| 7,356,477 B1 | 4/2008 | Allan et al. |
| 7,404,200 B1 | 7/2008 | Hailey et al. |
| 7,496,943 B1 | 2/2009 | Goldberg et al. |
| 7,496,945 B2 | 2/2009 | Rodriguez |
| 7,509,267 B1 | 3/2009 | Yarmolich et al. |
| 7,512,964 B2 | 3/2009 | Rodriguez et al. |
| 7,526,788 B2 | 4/2009 | Rodriguez |
| 7,647,549 B2 | 1/2010 | Denoual et al. |
| 7,673,314 B2 | 3/2010 | Ellis et al. |
| 7,685,520 B2 | 3/2010 | Rashkovskiy et al. |
| 7,707,614 B2 | 4/2010 | Krikorian et al. |
| 7,934,232 B1 | 4/2011 | Jerding et al. |
| 2001/0003846 A1 | 6/2001 | Rowe et al. |
| 2001/0013125 A1 | 8/2001 | Kitsukawa et al. |
| 2001/0013127 A1 | 8/2001 | Tomita et al. |
| 2001/0029523 A1 | 10/2001 | Mcternan et al. |
| 2001/0030667 A1 | 10/2001 | Kelts |
| 2001/0032335 A1 | 10/2001 | Jones |
| 2001/0034763 A1 | 10/2001 | Jacobs et al. |
| 2001/0036271 A1 | 11/2001 | Javed |
| 2001/0044744 A1 | 11/2001 | Rhoads |
| 2002/0002642 A1 | 1/2002 | Tyson et al. |
| 2002/0007485 A1 | 1/2002 | Rodriguez et al. |
| 2002/0013836 A1 | 1/2002 | Friedman et al. |
| 2002/0026496 A1 | 2/2002 | Boyer et al. |
| 2002/0026638 A1 | 2/2002 | Eldering et al. |
| 2002/0032638 A1 | 3/2002 | Arora et al. |
| 2002/0032728 A1 | 3/2002 | Sako et al. |
| 2002/0032905 A1 | 3/2002 | Sherr et al. |
| 2002/0042913 A1 | 4/2002 | Ellis et al. |
| 2002/0044762 A1 | 4/2002 | Wood et al. |
| 2002/0049804 A1 | 4/2002 | Rodriguez et al. |
| 2002/0049978 A1 | 4/2002 | Rodriguez et al. |
| 2002/0056098 A1 | 5/2002 | White |
| 2002/0056118 A1 | 5/2002 | Hunter et al. |
| 2002/0057336 A1 | 5/2002 | Gaul et al. |
| 2002/0062481 A1 | 5/2002 | Slaney et al. |
| 2002/0069105 A1 | 6/2002 | do Rosario Botelho |
| 2002/0069218 A1 | 6/2002 | Sull et al. |
| 2002/0069412 A1 | 6/2002 | Philips |
| 2002/0078176 A1 | 6/2002 | Nomura et al. |
| 2002/0083443 A1 | 6/2002 | Eldering et al. |
| 2002/0087981 A1 | 7/2002 | Daniels |
| 2002/0101367 A1 | 8/2002 | Geiger et al. |
| 2002/0104083 A1 | 8/2002 | Hendricks et al. |
| 2002/0108125 A1 | 8/2002 | Joao |
| 2002/0124249 A1 | 9/2002 | Shintani et al. |
| 2002/0128908 A1 | 9/2002 | Levin et al. |
| 2002/0129362 A1 | 9/2002 | Chang et al. |
| 2003/0002862 A1 | 1/2003 | Rodriguez et al. |
| 2003/0014753 A1 | 1/2003 | Beach et al. |
| 2003/0030679 A1 | 2/2003 | Jain |
| 2003/0031465 A1 | 2/2003 | Blake |
| 2003/0037068 A1 | 2/2003 | Thomas et al. |
| 2003/0037332 A1 | 2/2003 | Chapin et al. |
| 2003/0061619 A1 | 3/2003 | Giammaressi |
| 2003/0067554 A1 | 4/2003 | Klarfeld et al. |
| 2003/0074214 A1 | 4/2003 | Kelliher |
| 2003/0074257 A1 | 4/2003 | Saveliev et al. |
| 2003/0079227 A1 | 4/2003 | Knowles et al. |
| 2003/0088872 A1 | 5/2003 | Maissel et al. |
| 2003/0101451 A1 | 5/2003 | Bentolila et al. |
| 2003/0101454 A1 | 5/2003 | Ozer et al. |
| 2003/0124973 A1 | 7/2003 | Sie et al. |
| 2003/0126425 A1 | 7/2003 | Yang et al. |
| 2003/0131356 A1 | 7/2003 | Proehl et al. |
| 2003/0135853 A1 | 7/2003 | Goldman et al. |
| 2003/0154475 A1 | 8/2003 | Rodriguez et al. |
| 2003/0154486 A1 | 8/2003 | Dunn et al. |
| 2003/0159147 A1 | 8/2003 | Young et al. |
| 2003/0174243 A1 | 9/2003 | Arbeiter et al. |
| 2003/0188313 A1 | 10/2003 | Ellis et al. |

| | | |
|---|---|---|
| 2003/0193486 A1 | 10/2003 | Estrop |
| 2003/0206553 A1 | 11/2003 | Surcouf et al. |
| 2003/0219228 A1 | 11/2003 | Thiagarajan et al. |
| 2003/0221194 A1 | 11/2003 | Thiagarajan et al. |
| 2004/0034867 A1 | 2/2004 | Rashkovskiy et al. |
| 2004/0049787 A1 | 3/2004 | Maissel et al. |
| 2004/0107436 A1 | 6/2004 | Ishizaki |
| 2004/0117831 A1 | 6/2004 | Ellis et al. |
| 2004/0128685 A1 | 7/2004 | Hassell et al. |
| 2004/0133907 A1 | 7/2004 | Rodriguez et al. |
| 2004/0163117 A1 | 8/2004 | Rodriguez et al. |
| 2004/0168191 A1 | 8/2004 | Jerding et al. |
| 2004/0181801 A1 | 9/2004 | Hagen et al. |
| 2004/0221310 A1 | 11/2004 | Herrington et al. |
| 2004/0261112 A1 | 12/2004 | Hicks et al. |
| 2004/0261125 A1 | 12/2004 | Ellis et al. |
| 2005/0008074 A1 | 1/2005 | van Beek et al. |
| 2005/0028190 A1 | 2/2005 | Rodriguez et al. |
| 2005/0044565 A1 | 2/2005 | Jerding et al. |
| 2005/0044566 A1 | 2/2005 | Jerding et al. |
| 2005/0044577 A1 | 2/2005 | Jerding et al. |
| 2005/0071882 A1 | 3/2005 | Rodriguez et al. |
| 2005/0076360 A1 | 4/2005 | Jerding et al. |
| 2005/0091693 A1 | 4/2005 | Amine et al. |
| 2005/0111046 A1 | 5/2005 | Kurumisawa et al. |
| 2005/0138657 A1 | 6/2005 | Leftwich |
| 2005/0155056 A1 | 7/2005 | Knee et al. |
| 2005/0160468 A1 | 7/2005 | Rodriguez et al. |
| 2005/0188415 A1 | 8/2005 | Riley |
| 2005/0204387 A1 | 9/2005 | Knudson et al. |
| 2005/0204388 A1 | 9/2005 | Knudson et al. |
| 2005/0213506 A1 | 9/2005 | Wakumoto et al. |
| 2005/0216936 A1 | 9/2005 | Knudson et al. |
| 2005/0240961 A1 | 10/2005 | Jerding et al. |
| 2005/0251822 A1 | 11/2005 | Knowles et al. |
| 2005/0278741 A1 | 12/2005 | Robarts et al. |
| 2005/0283797 A1 | 12/2005 | Eldering et al. |
| 2005/0283810 A1 | 12/2005 | Ellis et al. |
| 2005/0289618 A1 | 12/2005 | Hardin |
| 2006/0020982 A1 | 1/2006 | Jerding et al. |
| 2006/0026080 A1 | 2/2006 | Rodriguez et al. |
| 2006/0026665 A1 | 2/2006 | Rodriguez et al. |
| 2006/0059525 A1 | 3/2006 | Jerding et al. |
| 2006/0070107 A1 | 3/2006 | Renkis |
| 2006/0088105 A1 | 4/2006 | Shen et al. |
| 2006/0112434 A1 | 5/2006 | Banker et al. |
| 2006/0206913 A1 | 9/2006 | Jerding et al. |
| 2006/0271933 A1 | 11/2006 | Agassi et al. |
| 2006/0271964 A1 | 11/2006 | Rodriguez et al. |
| 2006/0271973 A1 | 11/2006 | Jerding et al. |
| 2007/0019670 A1 | 1/2007 | Falardeau |
| 2007/0053293 A1 | 3/2007 | McDonald et al. |
| 2007/0094690 A1 | 4/2007 | Rodriguez et al. |
| 2007/0136748 A1 | 6/2007 | Rodriguez et al. |
| 2007/0186240 A1 | 8/2007 | Ward, III et al. |
| 2008/0010658 A1 | 1/2008 | Abbott et al. |
| 2008/0098421 A1 | 4/2008 | Rodriguez et al. |
| 2008/0098422 A1 | 4/2008 | Rodriguez et al. |
| 2008/0101460 A1 | 5/2008 | Rodriguez |
| 2008/0104637 A1 | 5/2008 | Rodriguez et al. |
| 2008/0137755 A1 | 6/2008 | Onur et al. |
| 2008/0155631 A1 | 6/2008 | Liwerant et al. |
| 2008/0229361 A1 | 9/2008 | Jerding et al. |
| 2008/0279217 A1 | 11/2008 | McDonald et al. |
| 2008/0282307 A1 | 11/2008 | McDonald et al. |
| 2008/0282308 A1 | 11/2008 | McDonald et al. |
| 2009/0141794 A1 | 6/2009 | Rodriguez et al. |
| 2009/0150958 A1 | 6/2009 | Jerding et al. |
| 2009/0158306 A1 | 6/2009 | Rodriguez et al. |
| 2009/0158324 A1 | 6/2009 | Rodriguez et al. |
| 2009/0158329 A1 | 6/2009 | Rodriguez et al. |
| 2009/0158331 A1 | 6/2009 | Rodriguez et al. |
| 2009/0158332 A1 | 6/2009 | Rodriguez et al. |
| 2009/0158335 A1 | 6/2009 | Rodriguez et al. |
| 2009/0158339 A1 | 6/2009 | Rodriguez et al. |
| 2009/0158352 A1 | 6/2009 | Rodriguez et al. |
| 2009/0158354 A1 | 6/2009 | Rodriguez et al. |
| 2009/0158355 A1 | 6/2009 | Rodriguez et al. |
| 2009/0158363 A1 | 6/2009 | Rodriguez et al. |
| 2009/0183081 A1 | 7/2009 | Rodriguez et al. |
| 2009/0190028 A1 | 7/2009 | Rodriguez et al. |
| 2009/0193468 A1 | 7/2009 | Rodriguez |
| 2009/0193471 A1 | 7/2009 | Rodriguez |
| 2009/0276808 A1 | 11/2009 | Jerding et al. |
| 2009/0282372 A1 | 11/2009 | Jerding et al. |
| 2009/0282440 A1 | 11/2009 | Rodriguez |
| 2010/0242063 A1 | 9/2010 | Slaney et al. |

FOREIGN PATENT DOCUMENTS

| | | |
|---|---|---|
| CA | 2 223 025 C | 11/2001 |
| CA | 2 475 723 C | 1/2011 |
| EP | 0 572 090 A2 | 12/1993 |
| EP | 0 673 159 A1 | 9/1995 |
| EP | 0 680 214 A2 | 11/1995 |
| EP | 0 725 538 A2 | 8/1996 |
| EP | 0 763 936 A2 | 3/1997 |
| EP | 0 811 939 A2 | 12/1997 |
| EP | 0 838 915 A2 | 4/1998 |
| EP | 0 849 948 A2 | 6/1998 |
| EP | 0 854 645 A2 | 7/1998 |
| EP | 0 891 084 A2 | 1/1999 |
| EP | 0 896 318 A2 | 2/1999 |
| EP | 0 909 095 A1 | 4/1999 |
| EP | 0 701 756 B1 | 12/1999 |
| EP | 0 989 751 A2 | 3/2000 |
| EP | 1 069 801 A1 | 1/2001 |
| EP | 1 075 143 A1 | 2/2001 |
| EP | 1 111 572 A2 | 6/2001 |
| EP | 1 161 085 A1 | 12/2001 |
| GB | 2 343 051 A | 4/2000 |
| JP | 8-289219 | 11/1996 |
| JP | 9-322022 | 12/1997 |
| JP | 10-143734 | 5/1998 |
| JP | 11-73361 | 3/1999 |
| JP | 11-73394 | 3/1999 |
| JP | 11-164284 | 6/1999 |
| JP | 2000-101941 | 4/2000 |
| WO | WO 92/22983 | 12/1992 |
| WO | WO 94/14284 | 6/1994 |
| WO | WO 96/17467 | 6/1996 |
| WO | WO 96/33579 | 10/1996 |
| WO | WO 96/34486 | 10/1996 |
| WO | WO 96/34491 | 10/1996 |
| WO | WO 96/41477 | 12/1996 |
| WO | WO 96/41478 | 12/1996 |
| WO | WO 97/34414 | 9/1997 |
| WO | WO 98/03012 | 1/1998 |
| WO | WO 98/26528 | 6/1998 |
| WO | WO 98/31116 | 7/1998 |
| WO | WO 98/37695 | 8/1998 |
| WO | WO 98/39893 | 9/1998 |
| WO | WO 98/47279 | 10/1998 |
| WO | WO 98/48566 | 10/1998 |
| WO | WO 98/56172 | 12/1998 |
| WO | WO 98/56173 | 12/1998 |
| WO | WO 98/56188 | 12/1998 |
| WO | WO 99/01984 | 1/1999 |
| WO | WO 99/04560 | 1/1999 |
| WO | WO 99/04561 | 1/1999 |
| WO | WO 99/12109 | 3/1999 |
| WO | WO 99/14947 | 3/1999 |
| WO | WO 99/35831 | 7/1999 |
| WO | WO 99/45701 | 9/1999 |
| WO | WO 99/49717 | 10/1999 |
| WO | WO 99/52285 | 10/1999 |
| WO | WO 99/57903 | 11/1999 |
| WO | WO 99/60790 | 11/1999 |
| WO | WO 99/66719 | 12/1999 |
| WO | WO 00/02385 | 1/2000 |
| WO | WO 00/04726 | 1/2000 |
| WO | WO 00/05889 | 2/2000 |
| WO | WO 00/30354 | 5/2000 |
| WO | WO 00/40017 | 7/2000 |
| WO | WO 00/46988 | 8/2000 |
| WO | WO 00/49801 | 8/2000 |
| WO | WO 00/59202 | 10/2000 |
| WO | WO 00/60482 | 10/2000 |
| WO | WO 00/78031 A2 | 12/2000 |

| | | | |
|---|---|---|---|
| WO | WO 00/78045 A1 | 12/2000 |
| WO | WO 00/78047 A1 | 12/2000 |
| WO | WO 00/78048 A1 | 12/2000 |
| WO | WO 01/06788 A1 | 1/2001 |
| WO | WO 01/20907 A1 | 3/2001 |
| WO | WO 01/24067 A1 | 4/2001 |
| WO | WO 01/56273 A1 | 8/2001 |
| WO | WO 01/67736 A2 | 9/2001 |
| WO | WO 01/72042 A1 | 9/2001 |
| WO | WO 01/76245 A2 | 10/2001 |
| WO | WO 01/77888 A2 | 10/2001 |
| WO | WO 01/84831 A2 | 11/2001 |
| WO | WO 02/097584 A2 | 12/2002 |
| WO | WO 03/003164 A2 | 1/2003 |
| WO | WO 03/003709 A2 | 1/2003 |
| WO | WO 03/014873 A2 | 2/2003 |
| WO | WO 03/024084 A2 | 3/2003 |
| WO | WO 03/042787 A2 | 5/2003 |
| WO | WO 03/069898 A1 | 8/2003 |
| WO | WO 2004/091219 A1 | 10/2004 |
| WO | WO 2004/100500 A2 | 11/2004 |
| WO | WO 2005/059202 A1 | 6/2005 |
| WO | WO 2005/071658 A1 | 8/2005 |
| WO | WO 2007/030370 A1 | 3/2007 |

OTHER PUBLICATIONS

"Client User Interface Specification (Phase I) for Video-On-Demand Application Development on the Explorer 2000™ Digital Home Communications Terminal", Revision 1.10 (Aug. 31, 1998).
"Evidence of illustrative movie release years," Retrieved from the Internet Movie Database using Internet, http://www.imdb.com, 19 pages (Retrieved on Jun. 6, 2005).
"ISO/IEC 13818-6 Information technology—Generic coding of moving pictures and associated audio information—Part 6: Extensions for DSM-CC," Chapter 4, 113 pages (Sep. 1, 1998).
"Netcaster Developer's Guide," Devedge Online Documentation, Netscape Communications Corporation, http://developer.netscape.com/docs/manuals/netcast/devguide/ index.html, XP-002166370, 82 pages (Sep. 25, 1997).
"Netscape Navigator Help," Netscape Navigator Software User Documentation, Netscape Communications Corporation, http://home.netscape.com, XP-002166369, pp. 1-63 (Aug. 10, 1997).
"SezYou . . . origin of word daemon," *Take Our Word for It*, Issue 146, p. 4, http://www.takeourword.com/TOW146/page4.html (retrieved on Apr. 4, 2006).
Addington, Timothy H., "System Architecture Specification for Video-On-Demand Application Development on the Explorer 2000™ Digital Home Communications Terminal", Revision 1.10r Review Copy (Mar. 4, 1999).
Alberico, G. et al., "Satellite Interactive Multimedia: A New Opportunity for Broadcasters," *International Broadcasting Convention*, Conference Publication No. 447, pp. 18-23 (Sep. 12-16, 1997).
ATI Multimedia Center 7.9, User's Guide, ATI Technologies Inc., pp. i-vi and 1-96 (Copyright 2002).
Barth et al., "10 Fernsehen am PC", Suse GmbH, XP-002324319, pp. 143-149 (2001).
BPAI Decision for U.S. Appl. No. 09/692,995, mailed Aug. 20, 2008.
BPAI Decision for U.S. Appl. No. 09/693,288, mailed Nov. 28, 2007.
Canadian Office Action cited in Application No. 2,376,556 mailed Sep. 30, 2008.
Canadian Office Action cited in Application No. 2,376,556 mailed Nov. 23, 2007.
Canadian Office Action cited in Application No. 2,376,556 mailed Dec. 6, 2005.
Canadian Office Action cited in Application No. 2,402,088 mailed Jun. 1, 2010.
Canadian Office Action cited in Application No. 2,402,088 mailed May 30, 2006.
Canadian Office Action cited in Application No. 2,405,491 mailed Jun. 9, 2010.
Canadian Office Action cited in Application No. 2,405,491 mailed Apr. 3, 2009.
Canadian Office Action cited in Application No. 2,405,491 mailed May 22, 2008.
Canadian Office Action cited in Application No. 2,405,491 mailed Jun. 20, 2007.
Canadian Office Action cited in Application No. 2,405,491 mailed Jan. 20, 2006.
Canadian Office Action cited in Application No. 2,408,289 mailed Aug. 27, 2008.
Canadian Office Action cited in Application No. 2,408,289 mailed May 30, 2006.
Canadian Office Action cited in Application No. 2,451,477 mailed Nov. 3, 2009.
Canadian Office Action cited in Application No. 2,456,318 mailed May 5, 2008.
Canadian Office Action cited in Application No. 2,456,318 mailed Mar. 27, 2007.
Canadian Office Action cited in Application No. 2,459,334 mailed Apr. 16, 2009.
Canadian Office Action cited in Application No. 2,466,667 mailed Apr. 15, 2009.
Canadian Office Action cited in Application No. 2,475,723 mailed Jul. 7, 2009.
Canadian Office Action cited in Application No. 2,554,208 mailed Apr. 1, 2010.
Canadian Office Action cited in Application No. 2,621,605 mailed Dec. 15, 2009.
Cunningham et al., "5 Das X Window System"., Suse GmbH, XP-002324320, pp. 129-180 (2001).
Decision on Appeal affirmed cited in U.S. Appl. No. 09/590,434 mailed May 28, 2008.
Definition of "flag", *Microsoft Press: Computer User's Dictionary*, 3 pages (1998).
Definition of "renting", Webster's II: New College Dictionary, 1995, Houghton Mifflin Company, p. 939.
European Examination Report cited in Application No. 00 938 251.6 mailed Mar. 2, 2010.
European Examination Report cited in Application No. 00 938 251.6 mailed Nov. 2, 2007.
European Examination Report cited in Application No. 00 939 759.7 mailed May 10, 2007.
European Examination Report cited in Application No. 01 905 058.2 mailed Dec. 19, 2006.
European Examination Report cited in Application No. 01 922 261.1 mailed Jul. 18, 2008.
European Examination Report cited in Application No. 01 922 261.1 mailed Nov. 2, 2007.
European Examination Report cited in Application No. 01 922 261.1 mailed Jan. 24, 2007.
European Examination Report cited in Application No. 01 922 261.1 mailed May 26, 2006.
European Examination Report cited in Application No. 01 923 092.9 mailed Jul. 20, 2009.
European Examination Report cited in Application No. 01 923 092.9 mailed Nov. 27, 2008.
European Examination Report cited in Application No. 01 937 209.3 mailed Mar. 16, 2010.
European Examination Report cited in Application No. 01 937 209.3 mailed Jun. 23, 2008.
European Examination Report cited in Application No. 02 737 593.0 mailed May 6, 2009.
European Examination Report cited in Application No. 02 750 416.6 mailed Aug. 4, 2008.
European Examination Report cited in Application No. 02 750 416.6 mailed Aug. 28, 2007.
European Examination Report cited in Application No. 02 761 572.3 mailed Apr. 20, 2009.
European Examination Report cited in Application No. 02 761 572.3 mailed Sep. 22, 2008.
European Examination Report cited in Application No. 02 761 572.3 mailed Jan. 22, 2008.
European Examination Report cited in Application No. 02 761 572.3 mailed Aug. 29, 2007.
European Examination Report cited in Application No. 06 802 683.0 mailed Jun. 26, 2008.

Examiner's Answer to Appeal Brief cited in U.S. Appl. No. 09/590,488 mailed Jan. 11, 2008.
Japanese Office Action cited in Application No. 2001-581527 mailed Feb. 10, 2010.
Japanese Office Action cited in Application No. 2001-581527 mailed Sep. 8, 2009.
Kevin, "Change Screen Resolution in Windows (Tips, Tricks, Tweaks, and Setting)," http://www.tacktech.com/display.cfm?t-tid=207, pp. 1-3 (Oct. 26, 2002).
Leftwitch et al., "StarSight Interactive Television Program Guide—Functional/Interational Architecture Specification Document, Interaction Analysis and Design Project—Phase III," 36 pages.
Little et al., "Prospects for Interactive Video-On-Demand", IEEE Multimedia, IEEE Service Center, New York, NY US, vol. 1 No. 3, Sep. 1994, pp. 14-24, XP000476885 ISSN: 1070-986X.
McFedries, "The Complete Idiot's Guide to Windows 95," Que, 2nd Edition, p. 49 (1997).
PCT Search Report cited in International Application No. PCT/US00/15952 mailed Jan. 16, 2001.
PCT Search Report cited in International Application No. PCT/US00/15963 mailed Sep. 1, 2000.
PCT Search Report cited in International Application No. PCT/US00/16000 mailed Oct. 2, 2000.
PCT Search Report cited in International Application No. PCT/US01/02490 mailed May 18, 2001.
PCT Search Report cited in International Application No. PCT/US01/06663 mailed Oct. 18, 2001.
PCT Search Report cited in International Application No. PCT/US01/10874 mailed Nov. 29, 2001.
PCT Search Report cited in International Application No. PCT/US01/14150 mailed Apr. 29, 2002.
PCT Search Report cited in International Application No. PCT/US02/20307 mailed Jan. 3, 2003.
PCT Search Report cited in International Application No. PCT/US02/20519 mailed Apr. 7, 2003.
PCT Search Report cited in International Application No. PCT/US02/24704 mailed Mar. 5, 2003.
PCT Search Report cited in International Application No. PCT/US02/28212 mailed Jan. 23, 2003.
PCT Search Report cited in International Application No. PCT/US02/36291 mailed May 23, 2003.
PCT Search Report cited in International Application No. PCT/US03/03391 mailed Jul. 14, 2003.
PCT Search Report and Written Opinion cited in International Application No. PCT/US2005/001812 mailed May 2, 2005.
PCT Search Report and Written Opinion cited in International Application No. PCT/US2006/033965 mailed Feb. 9, 2007.
PCT Search Report and Written Opinion cited in International Application No. PCT/US2006/033965 Feb. 19, 2007.
PCT Written Opinion cited in International Application No. PCT/US00/15952 mailed Jul. 25, 2001.
PCT Written Opinion cited in International Application No. PCT/US00/15963 mailed Jun. 22, 2001.
PCT Written Opinion cited in International Application No. PCT/US00/16000 mailed Oct. 25, 2001.
PCT Written Opinion cited in International Application No. PCT/US01/02490 mailed Oct. 23, 2001.
PCT Written Opinion cited in International Application No. PCT/US01/06663 mailed Jan. 3, 2002.
PCT Written Opinion cited in International Application No. PCT/US01/10874 mailed Jun. 4, 2002.
PCT Written Opinion cited in International Application No. PCT/US01/14150 mailed Sep. 30, 2004.
PCT Written Opinion cited in International Application No. PCT/US02/20307 mailed Aug. 8, 2003.
PCT Written Opinion cited in International Application No. PCT/US02/20519 mailed Apr. 6, 2004.
PCT Written Opinion cited in International Application No. PCT/US02/24704 mailed Nov. 20, 2003.
PCT Written Opinion cited in International Application No. PCT/US02/28212 mailed Dec. 4, 2003.
Petit et al., "Bandwidth Resource Optimization in Video-On-Demand Network Architectures", Community Networking Integrated Multimedia Services to the Home, 1994, Proceedings of the 1st International Workshop on San Francisco, CA USA, Jul. 1994, New York, NY USA, IEEE, Jul. 1994, pp. 91-97, XP010124402 ISBN: 978-0-7803-2076-5.
Reid, Dixie, "Coming attractions before they hit the big screen, most films begin life as a trailer," *The Sacramento Bee*, Sacramento, California, p. E.1 (Jul. 18, 1996).
Remote Wonder, ATI, Tweak 3D, pp. 1-5 (Sep. 30, 2002).
Reply Brief in U.S. Appl. No. 09/565,931 mailed on Sep. 17, 2007.
Rottentomatoes web archived site, http://web.archive.org/web/20000301122211/http://rottentomatoes.com, Mar. 1, 2000, pp. 1-2.
Summons to attend oral proceedings pursuant to Rule 115(1) EPC in European Application No. 02737593.0-1241 mailed May 28, 2010.
Supplementary European Search Report cited in European Application No. 02737593.0 mailed Mar. 3, 2009.
Supplementary European Search Report cited in European Application No. 02744705.1 mailed Feb. 19, 2010.
Supplementary European Search Report cited in European Application No. 02750416.6 mailed Jan. 2, 2007.
Supplementary European Search Report cited in European Application No. 02761572.3 mailed Mar. 20, 2007.
Supplementary European Search Report cited in European Application No. 02797096.1 mailed Oct. 14, 2005.
Supplementary European Search Report cited in European Application No. 03713364.2 mailed Jul. 6, 2005.
U.S. Final Office Action cited in U.S. Appl. No. 09/518,041 mailed Jul. 7, 2008.
U.S. Non-Final Office Action cited in U.S. Appl. No. 09/518,041 mailed Jan. 10, 2008.
U.S. Final Office Action cited in U.S. Appl. No. 09/518,041 mailed Aug. 24, 2007.
U.S. Non-Final Office Action cited in U.S. Appl. No. 09/518,041 mailed Feb. 6, 2007.
U.S. Final Office Action cited in U.S. Appl. No. 09/518,041 mailed Aug. 28, 2006.
U.S. Non-Final Office Action cited in U.S. Appl. No. 09/518,041 mailed Apr. 4, 2006.
U.S. Final Office Action cited in U.S. Appl. No. 09/518,041 mailed Sep. 15, 2005.
U.S. Non-Final Office Action cited in U.S. Appl. No. 09/518,041 mailed Apr. 22, 2005.
U.S. Final Office Action cited in U.S. Appl. No. 09/518,041 mailed Oct. 20, 2004.
U.S. Non-Final Office Action cited in U.S. Appl. No. 09/518,041 mailed Feb. 11, 2004.
U.S. Final Office Action cited in U.S. Appl. No. 09/518,041 mailed Aug. 27, 2003.
U.S. Non-Final Office Action cited in U.S. Appl. No. 09/518,041 mailed Mar. 18, 2003.
U.S. Final Office Action cited in U.S. Appl. No. 09/542,484 mailed Jun. 17, 2008.
U.S. Non-Final Office Action cited in U.S. Appl. No. 09/542,484 mailed Dec. 7, 2007.
U.S. Non-Final Office Action cited in U.S. Appl. No. 09/542,484 mailed Mar. 12, 2007.
U.S. Non-Final Office Action cited in U.S. Appl. No. 09/542,484 mailed Sep. 7, 2006.
U.S. Final Office Action cited in U.S. Appl. No. 09/542,484 mailed Mar. 21, 2006.
U.S. Non-Final Office Action cited in U.S. Appl. No. 09/542,484 mailed Jul. 28, 2005.
U.S. Final Office Action cited in U.S. Appl. No. 09/542,484 mailed Mar. 22, 2005.
U.S. Non-Final Office Action cited in U.S. Appl. No. 09/542,484 mailed Apr. 1, 2004.
U.S. Non-Final Office Action cited in U.S. Appl. No. 09/565,931 mailed Oct. 28, 2009.
U.S. Final Office Action cited in U.S. Appl. No. 09/565,931 mailed Jul. 14, 2009.
U.S. Non-Final Office Action cited in U.S. Appl. No. 09/565,931 mailed Feb. 13, 2009.
U.S. Final Office Action cited in U.S. Appl. No. 09/565,931 mailed Jun. 15, 2006.

U.S. Non-Final Office Action cited in U.S. Appl. No. 09/565,931 mailed Jan. 11, 2006.
U.S. Final Office Action cited in U.S. Appl. No. 09/565,931 mailed Jul. 1, 2005.
U.S. Non-Final Office Action cited in U.S. Appl. No. 09/565,931 mailed Sep. 10, 2004.
U.S. Final Office Action cited in U.S. Appl. No. 09/590,434 mailed May 11, 2006.
U.S. Non-Final Office Action cited in U.S. Appl. No. 09/590,434 mailed Nov. 21, 2005.
U.S. Final Office Action cited in U.S. Appl. No. 09/590,434 mailed Dec. 1, 2004.
U.S. Non-Final Office Action cited in U.S. Appl. No. 09/590,434 mailed Apr. 22, 2004.
U.S. Final Office Action cited in U.S. Appl. No. 09/590,434 mailed Dec. 18, 2003.
U.S. Non-Final Office Action cited in U.S. Appl. No. 09/590,434 mailed May 23, 2003.
U.S. Final Office Action cited in U.S. Appl. No. 09/590,488 mailed Feb. 27, 2007.
U.S. Non-Final Office Action cited in U.S. Appl. No. 09/590,488 mailed Oct. 26, 2006.
U.S. Final Office Action cited in U.S. Appl. No. 09/590,488 mailed Jul. 10, 2006.
U.S. Non-Final Office Action cited in U.S. Appl. No. 09/590,488 mailed Dec. 20, 2005.
U.S. Final Office Action cited in U.S. Appl. No. 09/590,488 mailed Jun. 30, 2005.
U.S. Non-Final Office Action cited in U.S. Appl. No. 09/590,488 mailed Nov. 16, 2004.
U.S. Final Office Action cited in U.S. Appl. No. 09/590,488 mailed Jun. 7, 2004.
U.S. Final Office Action cited in U.S. Appl. No. 09/590,488 mailed Dec. 16, 2003.
U.S. Non-Final Office Action cited in U.S. Appl. No. 09/590,488 mailed Jun. 10, 2003.
U.S. Final Office Action cited in U.S. Appl. No. 09/590,904 mailed Sep. 13, 2007.
U.S. Non-Final Office Action cited in U.S. Appl. No. 09/590,904 mailed Mar. 26, 2007.
U.S. Final Office Action cited in U.S. Appl. No. 09/590,904 mailed Nov. 15, 2006.
U.S. Non-Final Office Action cited in U.S. Appl. No. 09/590,904 mailed May 31, 2006.
U.S. Final Office Action cited in U.S. Appl. No. 09/590,904 mailed Jan. 24, 2006.
U.S. Non-Final Office Action cited in U.S. Appl. No. 09/590,904 mailed Jul. 13, 2005.
U.S. Final Office Action cited in U.S. Appl. No. 09/590,904 mailed Jan. 11, 2005.
U.S. Non-Final Office Action cited in U.S. Appl. No. 09/590,904 mailed Jun. 4, 2004.
U.S. Final Office Action cited in U.S. Appl. No. 09/591,356 mailed Apr. 13, 2006.
U.S. Non-Final Office Action cited in U.S. Appl. No. 09/591,356 mailed Dec. 20, 2005.
U.S. Final Office Action cited in U.S. Appl. No. 09/591,356 mailed Jun. 30, 2005.
U.S. Final Office Action cited in U.S. Appl. No. 09/591,356 mailed May 10, 2004.
U.S. Non-Final Office Action cited in U.S. Appl. No. 09/591,356 mailed Jan. 14, 2004.
U.S. Final Office Action cited in U.S. Appl. No. 09/591,356 mailed Sep. 26, 2003.
U.S. Non-Final Office Action cited in U.S. Appl. No. 09/591,356 mailed May 21, 2003.
U.S. Final Office Action cited in U.S. Appl. No. 09/692,920 mailed Jul. 22, 2008.
U.S. Non-Final Office Action cited in U.S. Appl. No. 09/692,920 mailed Jan. 17, 2008.
U.S. Final Office Action cited in U.S. Appl. No. 09/692,920 mailed Jun. 14, 2007.
U.S. Non-Final Office Action cited in U.S. Appl. No. 09/692,920 mailed Nov. 24, 2006.
U.S. Final Office Action cited in U.S. Appl. No. 09/692,920 mailed Jun. 21, 2006.
U.S. Non-Final Office Action cited in U.S. Appl. No. 09/692,920 mailed Feb. 16, 2006.
U.S. Final Office Action cited in U.S. Appl. No. 09/692,920 mailed Jun. 17, 2005.
U.S. Non-Final Office Action cited in U.S. Appl. No. 09/692,920 mailed Nov. 18, 2004.
U.S. Final Office Action cited in U.S. Appl. No. 09/692,995 mailed Sep. 4, 2009.
U.S. Non-Final Office Action cited in U.S. Appl. No. 09/692,995 mailed Jan. 23, 2009.
U.S. Final Office Action cited in U.S. Appl. No. 09/692,995 mailed Sep. 8, 2006.
U.S. Non-Final Office Action cited in U.S. Appl. No. 09/692,995 mailed Mar. 27, 2006.
U.S. Final Office Action cited in U.S. Appl. No. 09/692,995 mailed Sep. 21, 2005.
U.S. Final Office Action cited in U.S. Appl. No. 09/692,995 mailed May 3, 2005.
U.S. Non-Final Office Action cited in U.S. Appl. No. 09/692,995 mailed Oct. 21, 2004.
U.S. Final Office Action cited in U.S. Appl. No. 09/692,995 mailed Apr. 26, 2004.
U.S. Non-Final Office Action cited in U.S. Appl. No. 09/692,995 mailed Dec. 5, 2003.
U.S. Final Office Action cited in U.S. Appl. No. 09/693,115 mailed Jan. 25, 2005.
U.S. Non-Final Office Action cited in U.S. Appl. No. 09/693,115 mailed Jun. 16, 2004.
U.S. Final Office Action cited in U.S. Appl. No. 09/693,115 mailed Feb. 9, 2004.
U.S. Non-Final Office Action cited in U.S. Appl. No. 09/693,115 mailed Sep. 26, 2003.
U.S. Non-Final Office Action cited in U.S. Appl. No. 09/693,288 mailed Jun. 21, 2010.
U.S. Final Office Action cited in U.S. Appl. No. 09/693,288 mailed Dec. 1, 2005.
U.S. Non-Final Office Action cited in U.S. Appl. No. 09/693,288 mailed Jul. 19, 2005.
U.S. Final Office Action cited in U.S. Appl. No. 09/693,288 mailed Feb. 10, 2005.
U.S. Non-Final Office Action cited in U.S. Appl. No. 09/693,288 mailed Jul. 15, 2004.
U.S. Final Office Action cited in U.S. Appl. No. 09/693,288 mailed Feb. 26, 2004.
U.S. Non-Final Office Action cited in U.S. Appl. No. 09/693,288 mailed Oct. 27, 2003.
U.S. Final Office Action cited in U.S. Appl. No. 09/693,790 mailed Jul. 25, 2008.
U.S. Non-Final Office Action cited in U.S. Appl. No. 09/693,790 mailed Jan. 15, 2008.
U.S. Final Office Action cited in U.S. Appl. No. 09/693,790 mailed Jun. 19, 2007.
U.S. Non-Final Office Action cited in U.S. Appl. No. 09/693,790 mailed Dec. 28, 2006.
U.S. Final Office Action cited in U.S. Appl. No. 09/693,790 mailed Jun. 16, 2006.
U.S. Non-Final Office Action cited in U.S. Appl. No. 09/693,790 mailed Dec. 28, 2005.
U.S. Final Office Action cited in U.S. Appl. No. 09/693,790 mailed Jun. 21, 2005.
U.S. Non-Final Office Action cited in U.S. Appl. No. 09/693,790 mailed Oct. 6, 2004.
U.S. Final Office Action cited in U.S. Appl. No. 09/881,516 mailed Jun. 3, 2005.
U.S. Non-Final Office Action cited in U.S. Appl. No. 09/881,516 mailed Dec. 29, 2004.
U.S. Final Office Action cited in U.S. Appl. No. 09/881,516 mailed Jul. 26, 2004.

U.S. Final Office Action cited in U.S. Appl. No. 09/881,516 mailed Apr. 21, 2004.
U.S. Non-Final Office Action cited in U.S. Appl. No. 09/881,516 mailed Oct. 28, 2003.
U.S. Final Office Action cited in U.S. Appl. No. 09/894,508 mailed Sep. 17, 2009.
U.S. Non-Final Office Action cited in U.S. Appl. No. 09/894,508 mailed Feb. 4, 2009.
U.S. Non-Final Office Action cited in U.S. Appl. No. 09/894,508 mailed Jun. 13, 2008.
U.S. Final Office Action cited in U.S. Appl. No. 09/894,508 mailed Dec. 31, 2007.
U.S. Non-Final Office Action cited in U.S. Appl. No. 09/894,508 mailed Jul. 26, 2007.
U.S. Final Office Action cited in U.S. Appl. No. 09/896,231 mailed May 28, 2010.
U.S. Non-Final Office Action cited in U.S. Appl. No. 09/896,231 mailed Nov. 17, 2009.
U.S. Final Office Action cited in U.S. Appl. No. 09/896,231 mailed Jun. 3, 2009.
U.S. Non-Final Office Action cited in U.S. Appl. No. 09/896,231 mailed Dec. 23, 2008.
U.S. Final Office Action cited in U.S. Appl. No. 09/896,231 mailed Dec. 29, 2005.
U.S. Non-Final Office Action cited in U.S. Appl. No. 09/896,231 mailed Jun. 23, 2005.
U.S. Final Office Action cited in U.S. Appl. No. 09/924,111 mailed Aug. 7, 2008.
U.S. Non-Final Office Action cited in U.S. Appl. No. 09/924,111 mailed Jan. 29, 2008.
U.S. Final Office Action cited in U.S. Appl. No. 09/924,111 mailed Oct. 5, 2007.
U.S. Non-Final Office Action cited in U.S. Appl. No. 09/924,111 mailed Apr. 19, 2007.
U.S. Final Office Action cited in U.S. Appl. No. 09/924,111 mailed Sep. 18, 2006.
U.S. Non-Final Office Action cited in U.S. Appl. No. 09/924,111 mailed Mar. 15, 2006.
U.S. Final Office Action cited in U.S. Appl. No. 09/947,890 mailed Nov. 24, 2009.
U.S. Non-Final Office Action cited in U.S. Appl. No. 09/947,890 mailed Apr. 10, 2009.
U.S. Final Office Action cited in U.S. Appl. No. 09/947,890 mailed Nov. 6, 2008.
U.S. Non-Final Office Action cited in U.S. Appl. No. 09/947,890 mailed Jun. 25, 2008.
U.S. Final Office Action cited in U.S. Appl. No. 10/740,138 mailed Jan. 15, 2010.
U.S. Non-Final Office Action cited in U.S. Appl. No. 10/740,138 mailed Sep. 3, 2009.
U.S. Final Office Action cited in U.S. Appl. No. 10/740,138 mailed Mar. 19, 2009.
U.S. Non-Final Office Action cited in U.S. Appl. No. 10/740,138 mailed Sep. 15, 2008.
U.S. Final Office Action cited in U.S. Appl. No. 10/740,138 mailed Jun. 11, 2008.
U.S. Non-Final Office Action cited in U.S. Appl. No. 10/740,138 mailed Oct. 2, 2007.
U.S. Non-final Office Action cited in U.S. Appl. No. 10/761,777 mailed Jan. 21, 2010.
U.S. Non-Final Office Action cited in U.S. Appl. No. 10/761,777 mailed Jun. 11, 2009.
U.S. Final Office Action cited in U.S. Appl. No. 10/761,777 mailed Dec. 19, 2008.
U.S. Non-Final Office Action cited in U.S. Appl. No. 10/761,777 mailed Jul. 18, 2007.
U.S. Non-Final Office Action cited in U.S. Appl. No. 10/761,777 mailed Jan. 24, 2007.
U.S. Final Office Action cited in U.S. Appl. No. 10/778,494 mailed Jul. 25, 2008.
U.S. Non-Final Office Action cited in U.S. Appl. No. 10/778,494 mailed Jan. 16, 2008.
U.S. Final Office Action cited in U.S. Appl. No. 10/778,494 mailed May 22, 2007.
U.S. Non-Final Office Action cited in U.S. Appl. No. 10/778,494 mailed Feb. 2, 2007.
U.S. Final Office Action cited in U.S. Appl. No. 10/778,494 mailed Aug. 28, 2006.
U.S. Non-Final Office Action cited in U.S. Appl. No. 10/778,494 mailed Dec. 29, 2004.
U.S. Final Office Action cited in U.S. Appl. No. 10/783,235 mailed Oct. 2, 2008.
U.S. Non-Final Office Action cited in U.S. Appl. No. 10/783,235 mailed Feb. 25, 2008.
U.S. Non-Final Office Action cited in U.S. Appl. No. 10/934,253 mailed Apr. 27, 2010.
U.S. Final Office Action cited in U.S. Appl. No. 10/934,253 mailed Dec. 23, 2009.
U.S. Non-Final Office Action cited in U.S. Appl. No. 10/934,253 mailed Jun. 26, 2009.
U.S. Final Office Action cited in U.S. Appl. No. 10/934,253 mailed Dec. 26, 2008.
U.S. Non-Final Office Action cited in U.S. Appl. No. 10/934,253 mailed Jun. 17, 2008.
U.S. Final Office Action cited in U.S. Appl. No. 10/934,253 mailed Jul. 24, 2007.
U.S. Non-Final Office Action cited in U.S. Appl. No. 10/934,253 mailed Feb. 9, 2007.
U.S. Non-Final Office Action cited in U.S. Appl. No. 10/934,253 mailed Sep. 14, 2006.
U.S. Final Office Action cited in U.S. Appl. No. 10/957,849 mailed Aug. 8, 2008.
U.S. Non-Final Office Action cited in U.S. Appl. No. 10/957,849 mailed Apr. 30, 2008.
U.S. Final Office Action cited in U.S. Appl. No. 10/957,854 mailed Apr. 1, 2010.
U.S. Non-Final Office Action cited in U.S. Appl. No. 10/957,854 mailed Sep. 28, 2009.
U.S. Final Office Action cited in U.S. Appl. No. 10/957,854 mailed Apr. 7, 2009.
U.S. Non-Final Office Action cited in U.S. Appl. No. 10/957,854 mailed Oct. 15, 2008.
U.S. Non-Final Office Action cited in U.S. Appl. No. 10/957,854 mailed Apr. 30, 2008.
U.S. Non-Final Office Action cited in U.S. Appl. No. 10/957,942 mailed Jun. 30, 2010.
U.S. Final Office Action cited in U.S. Appl. No. 10/957,942 mailed Jul. 28, 2009.
U.S. Non-Final Office Action cited in U.S. Appl. No. 10/957,942 mailed Jan. 14, 2009.
U.S. Final Office Action cited in U.S. Appl. No. 10/957,942 mailed Jul. 31, 2008.
U.S. Non-Final Office Action cited in U.S. Appl. No. 10/957,942 mailed May 1, 2008.
U.S. Final Office Action cited in U.S. Appl. No. 10/981,053 mailed Jan. 21, 2010.
U.S. Non-Final Office Action cited in U.S. Appl. No. 10/981,053 mailed Apr. 15, 2009.
U.S. Final Office Action cited in U.S. Appl. No. 10/981,053 mailed Aug. 6, 2008.
U.S. Non-Final Office Action cited in U.S. Appl. No. 10/891,053 mailed Jan. 2, 2008.
U.S. Final Office Action cited in U.S. Appl. No. 10/994,599 mailed Dec. 1, 2006.
U.S. Non-Final Office Action cited in U.S. Appl. No. 10/994,599 mailed May 16, 2006.
U.S. Final Office Action cited in U.S. Appl. No. 10/994,599 mailed Jan. 26, 2006.
U.S. Non-Final Office Action cited in U.S. Appl. No. 10/994,599 mailed Aug. 23, 2005.
U.S. Final Office Action cited in U.S. Appl. No. 11/162,345 mailed Mar. 16, 2010.
U.S. Non-Final Office Action cited in U.S. Appl. No. 11/162,345 mailed Aug. 21, 2009.

U.S. Final Office Action cited in U.S. Appl. No. 11/162,345 mailed Mar. 9, 2009.
U.S. Non-Final Office Action cited in U.S. Appl. No. 11/162,345 mailed Oct. 31, 2008.
U.S. Final Office Action cited in U.S. Appl. No. 11/170,348 mailed Feb. 1, 2010.
U.S. Non-Final Office Action cited in U.S. Appl. No. 11/170,348 mailed Sep. 30, 2009.
U.S. Final Office Action cited in U.S. Appl. No. 11/170,348 mailed May 28, 2009.
U.S. Non-Final Office Action cited in U.S. Appl. No. 11/170,348 mailed Dec. 11, 2008.
U.S. Final Office Action cited in U.S. Appl. No. 11/208,387 mailed Dec. 22, 2008.
U.S. Non-Final Office Action cited in U.S. Appl. No. 11/208,387 mailed Jun. 12, 2008.
U.S. Non-Final Office Action cited in U.S. Appl. No. 11/238,369 mailed Mar. 30, 2010.
U.S. Non-Final Office Action cited in U.S. Appl. No. 11/244,621 mailed Feb. 5, 2010.
U.S. Final Office Action cited in U.S. Appl. No. 11/244,621 mailed Sep. 17, 2009.
U.S. Non-Final Office Action cited in U.S. Appl. No. 11/244,621 mailed Mar. 19, 2009.
U.S. Non-Final Office Action cited in U.S. Appl. No. 11/244,621 mailed Sep. 19, 2008.
U.S. Non-Final Office Action cited in U.S. Appl. No. 11/275,245 mailed May 5, 2010.
U.S. Non-Final Office Action cited in U.S. Appl. No. 11/275,245 mailed Oct. 22, 2009.
U.S. Final Office Action cited in U.S. Appl. No. 11/275,245 mailed Jul. 29, 2009.
U.S. Non-Final Office Action cited in U.S. Appl. No. 11/275,245 mailed Sep. 22, 2008.
U.S. Final Office Action cited in U.S. Appl. No. 11/460,516 mailed Mar. 18, 2010.
U.S. Non-Final Office Action cited in U.S. Appl. No. 11/460,516 mailed Jun. 26, 2009.
U.S. Final Office Action cited in U.S. Appl. No. 11/460,516 mailed Feb. 13, 2009.
U.S. Non-Final Office Action cited in U.S. Appl. No. 11/460,516 mailed Sep. 17, 2008.
U.S. Final Office Action cited in U.S. Appl. No. 11/496,303 mailed Jul. 22, 2010.
U.S. Non-Final Office Action cited in U.S. Appl. No. 11/496,303 mailed Mar. 2, 2010.
U.S. Non-Final Office Action cited in U.S. Appl. No. 11/496,303 mailed Sep. 29, 2009.
U.S. Final Office Action cited in U.S. Appl. No. 11/496,303 mailed Apr. 1, 2009.
U.S. Non-Final Office Action cited in U.S. Appl. No. 11/496,303 mailed Sep. 18, 2008.
U.S. Non-Final Office Action cited in U.S. Appl. No. 11/564,431 mailed Jul. 20, 2010.
U.S. Final Office Action cited in U.S. Appl. No. 11/564,431 mailed Jan. 4, 2010.
U.S. Non-Final Office Action cited in U.S. Appl. No. 11/564,431 mailed Aug. 24, 2009.
U.S. Final Office Action cited in U.S. Appl. No. 11/678,653 mailed Jun. 23, 2010.
U.S. Non-Final Office Action cited in U.S. Appl. No. 11/678,653 mailed Dec. 16, 2009.
U.S. Non-Final Office Action cited in U.S. Appl. No. 11/963,942 mailed Jun. 8, 2010.
U.S. Non-Final Office Action cited in U.S. Appl. No. 11/963,945 mailed Jul. 16, 2010.
U.S. Non-Final Office Action cited in U.S. Appl. No. 12/127,968 mailed Mar. 31, 2010.
U.S. Final Office Action cited in U.S. Appl. No. 12/127,968 mailed Dec. 1, 2009.
U.S. Non-Final Office Action cited in U.S. Appl. No. 12/127,968 mailed Apr. 30, 2009.
U.S. Non-Final Office Action cited in U.S. Appl. No. 12/179,752 mailed Dec. 23, 2009.
U.S. Non-Final Office Action cited in U.S. Appl. No. 12/179,767 mailed Jan. 22, 2010.
U.S. Final Office Action cited in U.S. Appl. No. 12/372,887 mailed Apr. 14, 2010.
U.S. Non-Final Office Action cited in U.S. Appl. No. 12/372,887 mailed Oct. 16, 2009.
U.S. Non-Final Office Action cited in U.S. Appl. No. 12/372,894 mailed Oct. 27, 2009.
U.S. Final Office Action cited in U.S. Appl. No. 12/372,917 mailed May 17, 2010.
U.S. Non-Final Office Action cited in U.S. Appl. No. 12/372,917 mailed Oct. 26, 2009.
U.S. Final Office Action cited in U.S. Appl. No. 12/388,139 mailed Jul. 6, 2010.
U.S. Non-Final Office Action cited in U.S. Appl. No. 12/388,139 mailed Dec. 15, 2009.
U.S. Non-Final Office Action cited in U.S. Appl. No. 12/389,128 mailed Jun. 2, 2010.
U.S. Final Office Action cited in U.S. Appl. No. 12/389,564 mailed Apr. 28, 2010.
U.S. Non-Final Office Action cited in U.S. Appl. No. 12/389,564 mailed Nov. 10, 2009.
U.S. Final Office Action cited in U.S. Appl. No. 12/413,686 mailed Jun. 10, 2010.
U.S. Non-Final Office Action cited in U.S. Appl. No. 12/413,686 mailed Nov. 30, 2009.
U.S. Appl. No. 09/330,792, filed Jun. 11, 1999 entitled "Series Reminders and Series Recording from an Interactive Television program Guide".
U.S. Appl. No. 09/378,533, filed Aug. 20, 1999 entitled "Electronic Program Guide with Advance Notification".
U.S. Appl. No. 09/518,041, filed Mar. 2, 2000 entitled "Apparatus and Method for Providing a Plurality of Interactive Program Guide Initial Arrangements".
U.S. Appl. No. 09/542,484, filed Apr. 3, 2000 entitled "System for Providing Alternative Services".
U.S. Appl. No. 09/565,931, filed May 4, 2000 entitled "Navigation Paradigm for Access to Television Services".
U.S. Appl. No. 09/590,434, filed Jun. 9, 2000 entitled "Video Promotional and Advertising Systems for Video on Demand System".
U.S. Appl. No. 09/590,488, filed Jun. 9, 2000 entitled "User Interface Navigational System with Parental Control for Video on Demand System".
U.S. Appl. No. 09/590,521, filed Jun. 9, 2000 entitled "Systems and Methods for Adaptive Scheduling and Dynamic Bandwidth Resource Allocation Management in a Digital Broadband Delivery System".
U.S. Appl. No. 09/590,904, filed Jun. 9, 2000 entitled "Program Information Searching System for Interactive Program Guide".
U.S. Appl. No. 09/591,356, filed Jun. 9, 2000 entitled "Future Program Options Menu System for Interactive Program Guide".
U.S. Appl. No. 09/692,920, filed Oct. 20, 2000 entitled "Media-on-Demand Title Indexing System".
U.S. Appl. No. 09/692,995, filed Oct. 20, 2000 entitled "Media-on-Demand Bookmark System".
U.S. Appl. No. 09/693,115, filed Oct. 20, 2000 entitled "Media Services Window Configuration System".
U.S. Appl. No. 09/693,288, filed Oct. 20, 2000 entitled "Media-on-Demand Rental Duration Management System".
U.S. Appl. No. 09/693,790, filed Oct. 20, 2000 entitled "Integrated Searching System for Interactive Media Guide".
U.S. Restriction Requirement cited in U.S. Appl. No. 11/162,345 mailed Jul. 3, 2008.
VESA Plug and Display Standard, Version 1, Video Electronics Standards Association, XP-002123075, 90 pages (Jun. 11, 1997).
W3C, Putting language attributes in HTML, www.w3.org.org/International/O-help-lang, 2 pages (Apr. 29, 1997).
Canadian Office Action cited in Application No. 2,408,289 mailed Sep. 2, 2010.
Canadian Office Action cited in Application No. 2,451,477 mailed Oct. 20, 2010.

U.S. Non-Final Office Action cited in U.S. Appl. No. 10/740,138 mailed Oct. 27, 2010.
U.S. Non-Final Office Action cited in U.S. Appl. No. 10/934,253 mailed Nov. 4, 2010.
U.S. Non-Final Office Action cited in U.S. Appl. No. 11/170,348 mailed Oct. 26, 2010.
U.S. Non-Final Office Action cited in U.S. Appl. No. 12/390,418 mailed Sep. 28, 2010.
U.S. Non-Final Office Action cited in U.S. Appl. No. 12/390,420 mailed Oct. 19, 2010.
U.S. Non-Final Office Action cited in U.S. Appl. No. 12/390,422 mailed Oct. 20, 2010.
U.S. Final Office Action cited in U.S. Appl. No. 10/761,777 mailed Aug. 2, 2010.
U.S. Non-Final Office Action cited in U.S. Appl. No. 11/234,967 mailed Sep. 10, 2010.
U.S. Final Office Action cited in U.S. Appl. No. 11/238,369 mailed Aug. 31, 2010.
U.S. Final Office Action cited in U.S. Appl. No. 11/244,621 mailed Aug. 18, 2010.
U.S. Non-Final Office Action cited in U.S. Appl. No. 11/963,951 mailed Aug. 2, 2010.
U.S. Final Office Action cited in U.S. Appl. No. 12/127,968 mailed Sep. 14, 2010.
U.S. Final Office Action cited in U.S. Appl. No. 12/179,767 mailed Aug. 20, 2010.
U.S. Non-Final Office Action cited in U.S. Appl. No. 12/388,002 mailed Sep. 3, 2010.
U.S. Non-Final Office Action cited in U.S. Appl. No. 12/389,564 mailed Aug. 23, 2010.
Canadian Office Action cited in Application No. 2,456,318 mailed Nov. 17, 2010, 4 pages.
U.S. Final Office Action cited in U.S. Appl. No. 12/389,128 mailed Nov. 9, 2010, 50 pages.
U.S. Non-Final Office Action cited in U.S. Appl. No. 12/179,763 mailed Jan. 4, 2011, 18 pages.
U.S. Non-Final Office Action cited in U.S. Appl. No. 12/389,564 mailed Jan. 21, 2011, 13 pages.
Canadian Office Action cited in Application No. 2,459,334 mailed Mar. 4, 2011, 3 pages.
"Industry Leading Software Vendors Endorse BroadVision's Next Generation of Retail and Business-To-Business E-Commerce Application Solutions," PR Newswire, Jun. 14, 1999, 4 pages.
U.S. Final Office Action cited in U.S. Appl. No. 09/693,288 mailed Feb. 8, 2011, 28 pages.
U.S. Non-Final Office Action cited in U.S. Appl. No. 11/162,345 mailed Feb. 1, 2011, 33 pages.
U.S. Non-Final Office Action cited in U.S. Appl. No. 12/413,686, mailed Mar. 17, 2011, 20 pages.
Summons to attend oral proceedings in EP Application No. 01937209.3 mailed Mar. 21, 2011, 7 pages.
U.S. Non-Final Office Action cited in U.S. Appl. No. 10/761,777 mailed Apr. 12, 2011, 20 pages.
U.S. Non-Final Office Action cited in U.S. Appl. No. 10/934,253 mailed Apr. 29, 2011, 11 pages.
U.S. Final Office Action cited in U.S. Appl. No. 12/389,564 mailed May 19, 2011, 15 pages.
U.S. Non-Final Office Action cited in U.S. Appl. No. 10/740,138 mailed Jun. 8, 2011, 26 pages.
U.S. Final Office Action cited in U.S. Appl. No. 11/170,348 mailed Jun. 9, 2011, 14 pages.

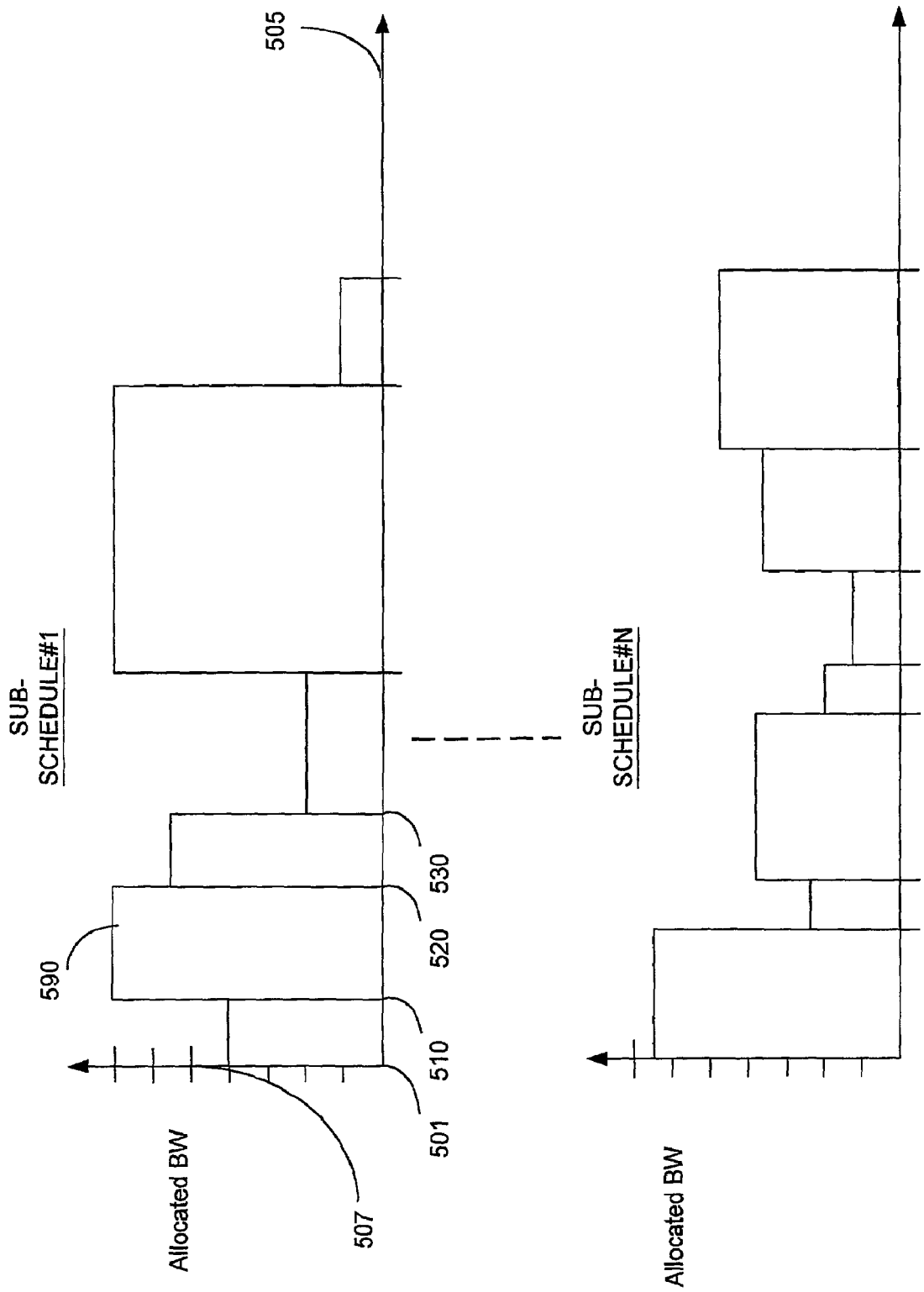

INTERACTIVE PROGRAM GUIDE ACCESS TO SERVICE GUIDE

| SG 01 | | | CURRENT TV PROGRAM | | |
|---|---|---|---|---|---|
| SERVICE GUIDE | | | | | |
| CHANNEL ▼ | 2:00 PM | ◀ 2:30 PM | 10 TUE 9/1 3:00 PM | 12:01 PM 3:30 | |
| ETW 301 | EXTRA | ENTERTAINMENT NEWS | AMERICAN HISTORY X | | |
| PPV 400 | ◀◀ SAVING PRIVATE RYAN | SERVICE GUIDE | SERVICE GUIDE | SERVIC | } 876 |
| SG 1 | SERVICE GUIDE | | | | |
| ETV 2 | TALK SOUP | | EI BEHIND THE SCENES | | |
| TVLD 3 | ONE LIFE TO LIVE | | GENERAL HOSPITAL | | |
| TUE 9/1 | Ⓐ BROWSE BY Ⓑ DATE ↺ | | | | |

… 
UPDATING DOWNLOAD OPTIONS FOR UNAVAILABLE MEDIA CONTENT

CROSS-REFERENCE TO RELATED APPLICATIONS

This application is a continuation of U.S. utility application entitled: "Graphic User Interface Alternate Download Options for Unavailable PRM Content,", having Ser. No. 10/008,429, filed Nov. 13, 2001, now U.S. Pat. No. 7,526,788, which is a continuation in part of copending U.S. utility applications entitled, "Method and Apparatus for Recordable Media Content Distribution", having Ser. No. 09/896,331, filed Jun. 29, 2001, now U.S. Pat. No. 6,760,918, "System and Method for Archiving Multiple Downloaded Recordable Media Content", having Ser. No. 09/896,390, filed Jun. 29, 2001, now U.S. Pat. No. 7,512,964, and "Bandwidth Allocation and Pricing System for Downloadable Media Content", having Ser. No. 09/896,231, filed Jun. 29, 2001, all of which are entirely incorporated herein by reference.

FIELD OF THE INVENTION

This invention relates in general to the field of television systems, and more particularly, to interactive television.

BACKGROUND OF THE INVENTION

With the recent advent of digital transmission technology, subscriber television systems are now capable of providing many other services in addition to traditional analog broadcast video. For example, two-way and advanced one-way communications between a subscriber and a subscriber network system headend are now possible. The home communication terminal ("HCT"), including digital HCTs (or DHCTs), also known as the set-top box, has become an important computing device for accessing video services and navigating a subscriber through a maze of services available.

There are other electronic communications systems that have been used for purchasable recordable media (PRM) content. For example, one may be able to purchase an audio product on the Internet and then download it to a personal computer for future use. The application of electronic communications systems for the sale and delivery of applicable products can offer advantages over more conventional product sales and delivery systems such as phone ordering with parcel delivery. For example, advantages may be offered such as the lower cost of product delivery or the savings of not requiring inventory, floor space, and retail employees. But, the present electronic communications sales and delivery systems are often subject to "bottlenecks" that may result in undelivered media content as requested by a purchaser. Thus, there is a need for dependable delivery of products by way of an electronic communications system.

BRIEF DESCRIPTION OF THE DRAWINGS

The preferred embodiments of the invention can be better understood with reference to the following drawings. The components in the drawings are not necessarily to scale, and emphasis is instead being placed upon clearly illustrating the principles of the preferred embodiments of the invention. Moreover, in the drawings, like reference numerals designate corresponding parts throughout the several views.

FIG. 5 is a block diagram illustrating sub-schedules invoked by the headend depicted in FIG. 3 for allocating bandwidth for downloading recordable media content, in accordance with one embodiment of the invention.

FIG. 8 is a screen diagram of an example IPG screen for accessing a service guide.

DETAILED DESCRIPTION OF THE PREFERRED EMBODIMENT

The preferred embodiments of the invention now will be described more fully hereinafter with reference to the accompanying drawings, in which preferred embodiments of the invention are shown. This invention may, however, be embodied in many different forms and example embodiments and should not be construed as limited to the example embodiments set forth herein; rather, these embodiments are provided so that this disclosure will be thorough and complete, and will fully convey the scope of the invention to those having ordinary skill in the art. Furthermore, all example embodiments given herein are intended to be non-limiting and among others.

Figure 1:
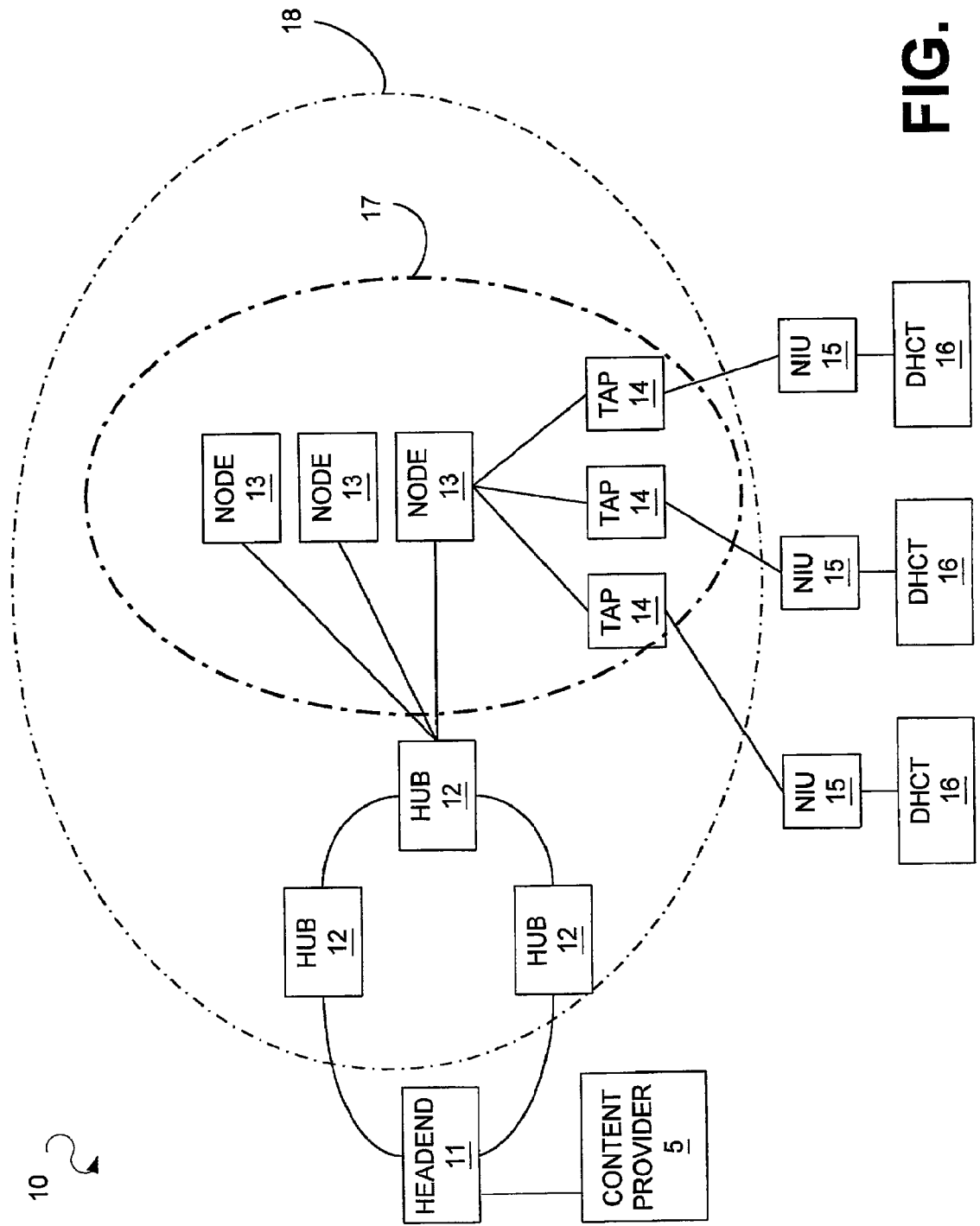
FIG. 1 is a block diagram of an example subscriber television system (STS), in accordance with one embodiment of the invention.

One preferred embodiment of the present invention is generally implemented as part of a subscriber television system (STS), such as for example, a digital broadband delivery system (DBDS) or a cable television system (CTS). Hence, an illustrative STS and its operation will be described initially. Other conventional data delivery systems are also included within the scope of the preferred embodiments of the present invention. FIG. 1 shows a block diagram view of a STS 10, which is generally a high quality, reliable and integrated network system that is preferably capable of delivering video, audio, voice and data services to client devices, such as digital home communication terminal devices (DHCTs) 16. Although FIG. 1 depicts a high level view of a STS 10, it should be appreciated that a plurality of STSs can tie together a plurality of regional networks into an integrated global network so that DHCT users can receive media content provided from anywhere in the world. Further, it will be appreciated that the STS 10 shown in FIG. 1 is merely illustrative and should not be construed as implying any limitations upon the scope of the preferred embodiments of the present invention. For instance, subscriber television systems also included within the scope of the preferred embodiments of the invention include systems not utilizing physical structured cabling for transmission, such as, but not limited to, satellite systems. Further, transmission media included within the scope of the preferred embodiments of the invention include, but are not limited to, hybrid fiber/coax (HFC), optical, satellite, radio frequency (RF), frequency modulated (FM), and microwave. Further, data provided from the headend 11 to the DHCTs 16 and programming necessary to perform the functions discussed below will be understood to be present in the STS 10, in accordance with the description below.

The STS 10 preferably delivers broadcast video signals as digitally formatted signals in addition to delivering traditional broadcast analog video signals. Furthermore, the system can preferably support one way broadcast services as well as both one-way data services and two-way media content and data services. The two-way operation of the network preferably allows for user interactivity with services, such as Pay-Per-View programming, Near Video-On-Demand (NVOD) programming according to any of several known NVOD implementation methods, Video-on-Demand (VOD) programming (according to any of several VOD implementation methods), and interactive applications, such as Internet connections and purchasable recordable media (PRM) content services.

The STS 10 also provides the interfaces, network control, transport control, session control, and servers to access media content from media services, and distributes media content to DHCT users. Note that the terms media content and PRM content will be understood to mean the content stored and delivered throughout the STS 10, such as movies, software, music, etc. When it is helpful to discuss each individual movie or program, etc. (i.e. media content in the singular), the term media content instance or PRM content instance or the like will be used. The title of that media content instance, or PRM content instance, will be referred to as a media content title, or PRM content title. As shown in FIG. 1, a typical STS 10 comprises a headend 11, hubs 12, an HFC access network 17, and DHCTs 16. It should be appreciated that although a single component (e.g. a headend) is illustrated in FIG. 1, a STS 10 can feature a plurality of any one of the illustrated components or may be configured with alternative embodiments for any one of the individual components or with yet other additional components not enumerated above. Media content provided by one or more content providers, such as content provider 5, is communicated by the content providers to one or more headends 11. From those headends 11 the content is then communicated over a communications network 18 that includes a plurality of HFC access networks 17 (only one HFC access network 17 is illustrated). The HFC access network 17 preferably comprises a plurality of HFC nodes 13, each of which may serve a local geographical area. The hub 12 connects to the HFC node 13 through a fiber portion of the HFC access network 17. The HFC node 13 is connected to a tap 14 which, in one implementation, is connected to a digital home communication terminal (DHCT) 16. In other implementations, the tap 14 is connected to a network interface unit (NIU) 15 which is connected to a digital home communication terminal (DHCT) 16. The NIU 15 is normally located at the property of a user and provides a transparent interface between the HFC node 13 and the users' internal wiring. Coaxial cables are typically used to couple nodes 13, taps 14 and NIUs 15 because the electrical signals can be easily repeated with RF amplifiers. As the high-level operations of many of the functions of a STS 10 are well known to those of ordinary skill in the art, further high level description of the overall STS 10 of FIG. 1 will not be contained herein.

Figure 2:
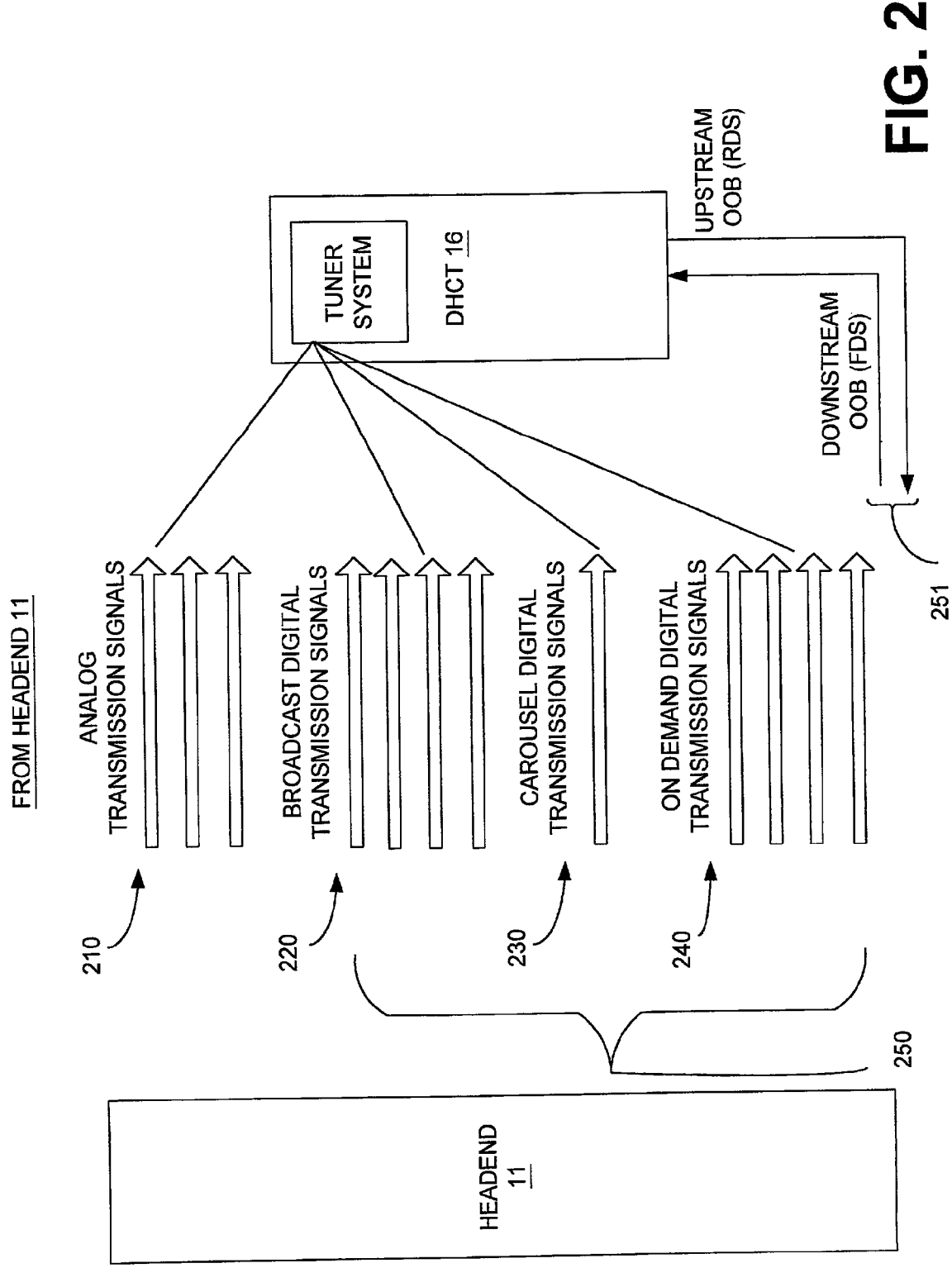
FIG. 2 is a block diagram of types of input and output signals to a DHCT supported by the example STS of FIG. 1, in accordance with one embodiment of the invention.

FIG. 2 shows one implementation of transmission channels supported by the STS 10 illustrated in FIG. 1, as delivered by the headend 11 and received as input channels by the DHCT 16. Although one DHCT 16 and one headend 11 are illustrated, it is understood by those having ordinary skill in the art that more than one of each may be included in a subscriber television system. The STS 10 (FIG. 1) can simultaneously support a number of transmission signal types, transmission rates and modulation formats. The ability to carry analog and digital signals over a large bandwidth are characteristics of a hybrid fiber/coax (HFC) network typically employed in a subscriber television system. As will be appreciated by those of ordinary skill in the art, analog and digital signals in HFC networks can be multiplexed using, in one implementation, frequency division multiplexing (FDM), which enables many different types of signals to be transmitted over the subscriber television system to the DHCT 16. In one typical implementation, a subscriber television system using HFC supports downstream (i.e. in the direction from the headend 11 to the DHCT 16) frequencies from 50 MHz to 870 MHz, whereas upstream frequencies (i.e. in the direction from the DHCT to higher levels of the system) are in the 5 MHz to 42 MHz band. Generally, the RF bandwidth spacing for analog and digital services is 6 MHz. Furthermore, for a typical 870 MHz system in the U.S., a possible downstream RF spectrum subdivision plan uses 6 MHz frequency subdivisions, or spans within the 50 MHz to 550 MHz band for analog video transmission signals and within the 550 MHz to 870 MHz range for digital transmission signals. The Analog Transmission Signals (ATSs) 210 are typically broadcast in 6 MHz frequency subdivisions, typically referred to in analog broadcasting as channels, having an analog broadcast signal composed of analog video and analog audio, and include Broadcast TV Systems Committee (BTSC) stereo and Secondary Audio Program (SAP) audio.

Referring again to FIG. 2, the downstream direction transmission signals, having been multiplexed preferably using frequency division multiplexing (FDM), and often referred to as in-band transmission signals, include Analog Transmission Signals (ATSs) 210 and Digital Transmission Signals (DTSs) 250. These transmission signals carry video, audio, and data services. For example, these transmission signals can carry television signals, Internet data, or any additional types of data, such as Interactive Program Guide (IPG) data. Additionally, as will be appreciated by those of ordinary skill in the art, additional data can be sent with the analog video image in the Vertical Blanking Interval (VBI) of the video signal and stored in DHCT memory or a DHCT local physical storage device (not shown). It should be appreciated, however, that the amount of data that can be transmitted in the VBI of the analog video signal is typically significantly less than data transmitted in DTSs 250.

Like the ATSs 210, the DTSs 250 each occupies 6 MHz of the RF spectrum. However, the DTSs 250 are preferably digital transmission signals consisting of 64- or 256-Quadrature Amplitude Modulated (QAM) digital signals formatted as MPEG-2 transport streams, allocated in a separate frequency range. The MPEG-2 transport stream enables transmission of a plurality of DTS types over each 6 MHz RF subdivision, as compared to a 6 MHz ATS 210. Three types of digital transport signals 250 illustrated in FIG. 2 include broadcast digital transmission signals 220, carousel digital transmission signals 230, and on-demand transmission signals 240. MPEG-2 transport may be used to multiplex video, audio, and data in each of these digital transmission signals (DTSs) 250. However, because MPEG-2 transport streams multiplex video, audio, and data to be placed in the same stream, the DTSs 250 do not necessarily have to be allocated in separate 6 MHz RF frequencies, unlike the ATSs 210.

Continuing with FIG. 2, the broadcast DTSs 220 and carousel DTSs 230 preferably function as continuous feeds for indefinite time, whereas the on-demand DTSs 240 are continuous feed sessions for a limited time. Preferably, all DTSs 250 are capable of being transmitted at high data rates. The broadcast DTSs 220 preferably carry data comprising multiple digitally compressed and formatted as MPEG-2, TV source signals and other continuously fed data information. The carousel DTSs 230 carry broadcast data, such as IPG data and data for a catalog of recordable media content, that is systematically broadcast in a cycling fashion but updated and revised as need be. Thus, the carousel DTSs 230 can serve to carry high volume data, such as IPG data and purchasable recordable media (PRM) catalog data, as well as other data at high data rates. The carousel DTSs 230 preferably carry data formatted in directories and files by a Broadcast File System (BFS) (not shown), which is used for producing and transmitting data streams throughout the subscriber television system, and which provides an efficient method for delivery of application executables and application data to the DHCT 16. The on-demand DTSs 240 can carry particular information, such as compressed video and audio pertaining to subscriber requested video services or recordable media content, as well as other specialized data information. Each carousel DTS 230 and on-demand DTS 240 is defined by a session managed by a session manager 334 in FIG. 3, via an MPEG-2 Digital Storage Media-Command and Control (DSM-CC) protocol.

Also shown in FIG. 2 are Out-Of-Band (OOB) signals 251 that provides a continuously available two-way signaling path to the DHCT 16 regardless of which in-band signals are tuned to by an individual DHCT 16 in-band tuner. The DHCT 16 may also comprise multiple in-band tuners in which case the OOB signals 251 complement the service of the set of in-band tuners. The OOB signals 251 consist of a forward data signal (FDS) and a reverse data signal (RDS). The OOB signals 251 can comply to any one of a number of well known transport protocols but preferably comply to either a DAVIC 1.1 Transport Protocol with FDS of 1.544 mega bits per second (MBps) or more using Quadrature Phase-Shift Keying (QPSK) modulation and an RDS of 1.544 Mbps or more using QPSK modulation, or to a DOCSIS Transport Protocol with FDS of 27 Mbps using 64-QAM modulation and a RDS of 1.544 Mbps or more using QPSK modulation or 16-QAM modulation. The OOB signals 251 provide the two-way operation of the network, which allows for subscriber interactivity with the services provided by the network. Therefore, the DHCT 16 preferably contains functionality somewhat similar to a networked computer (i.e., a computer without a persistent storage device) in addition to traditional set top box functionality, as is well known in the art. Furthermore, the OOB signals 251 are not limited to a 6 MHz spectrum, but generally to a smaller spectrum, such as 1.5 or 3 MHz, in one embodiment.

Figure 3:
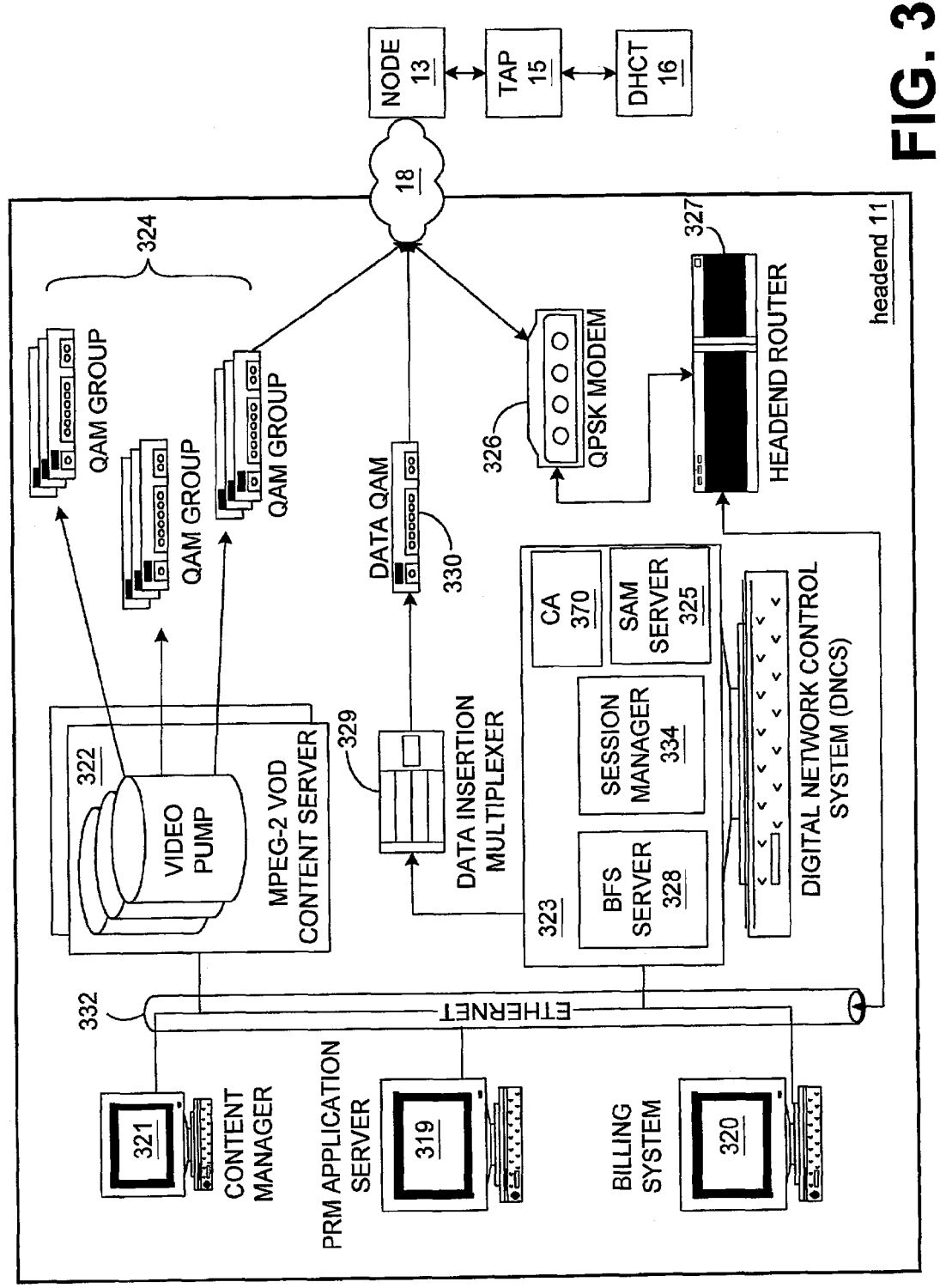
FIG. 3 is a block diagram of the example headend depicted in FIG. 1, in accordance with one embodiment of the invention.

FIG. 3 is a block diagram of the example headend 11 depicted in FIG. 1, as configured in a subscriber television system, to provide purchasable and recordable media (PRM) content services, either as an on-demand or scheduled service with a plurality of possible delivery durations. It will be understood that the headend 11 shown in FIG. 3 is merely illustrative and should not be construed as implying any limitations upon the scope of the preferred embodiments of the invention. In the system headend 11, a PRM application server 319 and a plurality of other application servers (not shown) are connected to a digital network control system (DNCS) 323 via an Ethernet connection 332. The PRM application server 319 preferably is responsible for the following: reserving and configuring system resources needed to provide PRM services, for packaging, configuring and making available the executable software program comprising a PRM application client 477 (FIG. 4A), for providing configuration and service data (such as a catalog of recordable media content categorized and displayed by titles available for rent and/or purchase) to PRM application clients 477, and for storing data at the request of a PRM application client 477. The DNCS 323, in communication with the PRM application server 319, reserve and configure system resources to effect the delivery of PRM content to a purchaser, as described below. A PRM application client 477 executing on processor 444 (FIG. 4A) in the DHCT 16 generates a user interface that is displayed on television 441 (FIG. 4A) for the subscriber to browse, purchase, and access media content such as movies, CDs, video clips, etc. This may require, among other things, engaging, preferably, in a direct two-way IP (Internet Protocol) connection with VOD content servers 322. In other embodiments, the PRM application server 319 generates the user interface to provide similar functionality to the user interface generated via the PRM application client 477 described above.

The DNCS 323 provides management, monitoring, and control of the STS 10 (FIG. 1) network elements and broadcast services provided to users. The DNCS 323 provides control and communication functionality by monitoring the DHCTs 16 and facilitating messaging between the DHCTs 16 and components within the headend 11. When any of the communication functionality is provided by headend 11 components other than the DNCS 323, the DNCS 323 indirectly provides similar functionality by providing the control and coordination to those other devices that provide the required communication functionality to enact a particular media service.

Figure 4A:
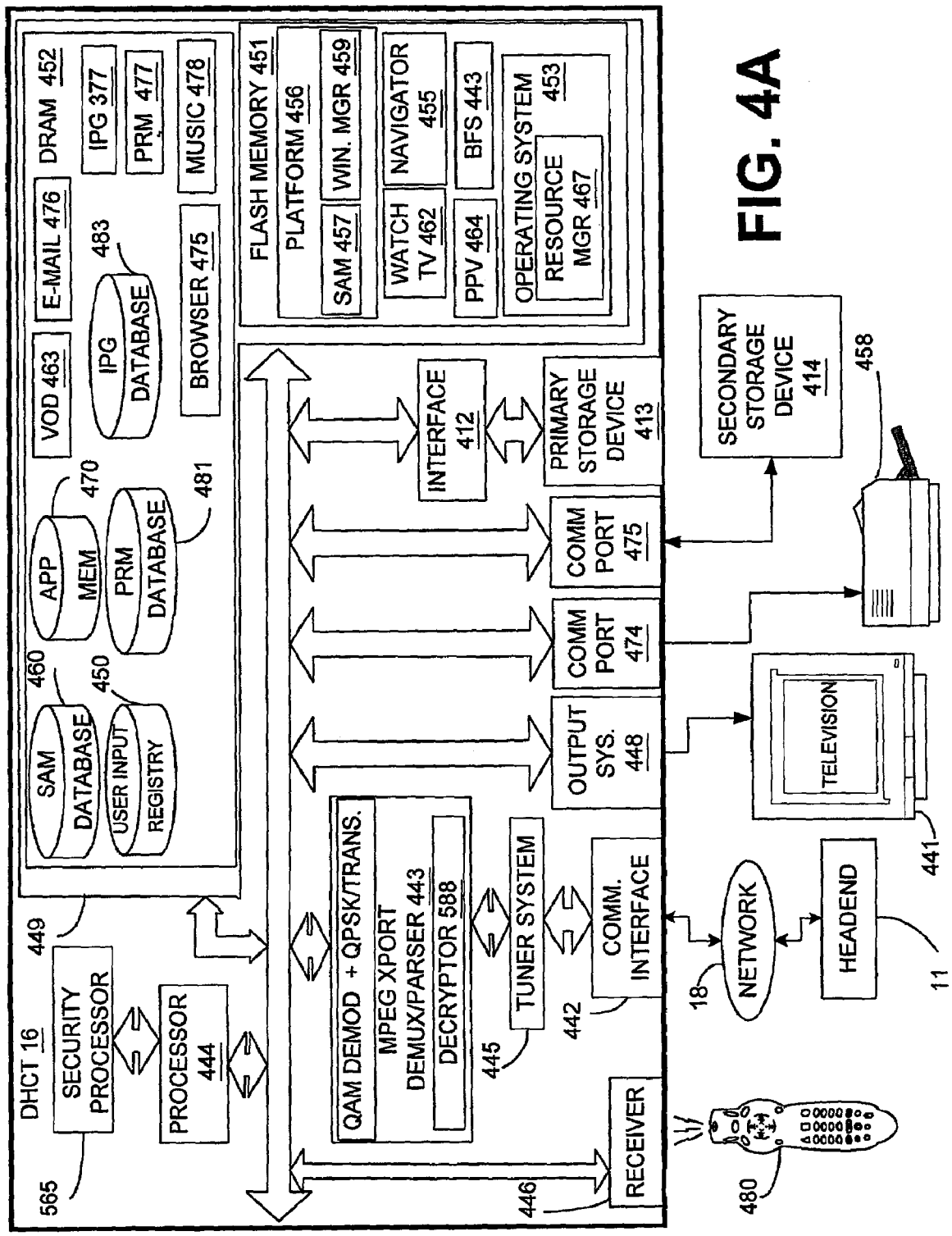
FIG. 4A is a block diagram of the example DHCT depicted in FIG. 1, in accordance with one embodiment of the invention.

In one implementation, the DNCS 323 includes functional support for client-server applications and other components in the STS 10 (FIG. 1) with its server counterparts, including BFS Server 328 and SAM server 325, which will be described in greater detail below. Briefly, the client-server application counterparts work in coordination with DNCS 323 to effectively utilize the primary features of the interactive television system and manage the sale and delivery of, among other things, PRM content. Furthermore, the client-server application software in communication with the DNCS 323 can effectively redirect allocation of excess VOD infrastructure capacity to facilitate maximum rate delivery of PRM content in cooperation with the PRM application client 477 (FIG. 4A). Also, in one implementation, the DNCS 323 uses a data insertion multiplexer 329 and a data QAM 330 to insert the in-band broadcast file system (BFS) data into a compressed data stream, for example, an MPEG-2 transport stream.

The DNCS 323 also includes a session manager 334 and a conditional access system 370. The session manager 334 preferably uses the MPEG-2 DSM-CC protocol to coordinate requests for media content, for example, PRM content. The session manager 334 processes user to network (U-N) session signaling messages, manages allocation of session-related network resources and supports network management operations. The session manager 334 supports exclusive services, such as the PRM service, by providing the signaling interface to establish, maintain, and release client-initiated exclusive sessions. The session manager 334 acts as a point of contact to the network for the DHCT 16 in the network 18 to establish individual sessions. The session manager 334 also defines a resource descriptor structure, which is used to request the network resources within a session.

The conditional access system 370 communicates with the DHCT 16 and the billing system 320 to determine whether a particular subscriber is authorized to receive PRM content. If a DHCT 16 is not authorized for PRM service, the conditional access system 370 insures that such services are not transmitted.

The PRM application server 319 communicates via the Ethernet connection 332 to a service application manager (SAM) server 325 contained in the DNCS 323. Service application manager (SAM) server 325 is a server component of a client-server pair of components, with the client component being located at the DHCT 16. Together, the client-server SAM components provide a system in which the user can access services, which are identified by an application to run and one or more parameters, such as particular data content, specific to that service. The SAM server 325 also manages the life cycle of the applications on the system, including the definition, activation, and suspension of services they provide and the downloading of the applications into the DHCT 16 as necessary. The PRM application server 319 defines its application to the SAM server 325 and the SAM server 325 instructs the BFS server 328 to add the executable code for the PRM application client 477 (FIG. 4A) to a carousel (not shown) for distribution to the various DHCTs 16 in the network 18. In other embodiments, executable code is not transferred, but instead, functionality is effected through other mechanisms.

The BFS server 328 is a part of a broadcast file system that has a BFS client 443 (FIG. 4A) in each DHCT 16 in the network 18. Applications on both the headend 11 and the DHCT 16 can access the data stored in the BFS server 328 in a manner somewhat similar to a file system found on disc operating systems. The BFS server 328 loads data for applications on a carousel (not shown) that sends data in a cyclical repeated fashion, each cycle approximately the same period of time so that the DHCT 16 that communicates a request for any particular data may receive it when the user desires the data. Thus, the BFS client 443 (FIG. 4A) contained in the DHCT 16 that receives the broadcast from the BFS server 328 can implement the application for the user, as will be described in greater detail below.

PRM content or data can reside in the PRM application server 319, in the VOD content server 322, or in other application servers (not shown). The content manager 321 and VOD content servers 322 deliver MPEG-2 content to a group of QAM modulators 324. PRM content can reside in VOD content servers 322 as a movie, as an audio program, or as an MPEG-2 private data program. The content manager 321 is responsible for managing the content on the VOD content servers 322 and on other servers such as PRM application server 319 or other application servers (not shown). The PRM application server 319 utilizes the content manager 321 and VOD content servers 322 to deliver the data, video and/or audio streams that make up the PRM services. The PRM application server 319 is in communication with the content manager 321 and VOD content servers 322 to effect the delivery of PRM content that resides in VOD content servers 322. The QAM group 324 is actually a multiplex of QAMs that support PRM content transmission to a particular DHCT 16. The session manager 334 in DNCS 323 determines which QAM modulator has access to a particular DHCT 16. The QAM modulators 324 are also responsible for encrypting the transport stream and inserting other data and information into the stream, as will be described in more detail below. The QAM modulators 324 receive the MPEG-2 transport stream from the VOD content servers 222 and convert it to an encrypted RF signal at a specified frequency (e.g. channel).

In one embodiment of the invention, content manager 321 fulfills management of VOD content and PRM content. In an alternate embodiment, content manager 321 is comprised of two entities, a first content manager dedicated to VOD content management and a second manager dedicated to PRM content management.

A Quadrature Phase-Shift Keying (QPSK) modem 326 is responsible for transporting the out-of-band IP (Internet protocol) datagram traffic between the distribution headend 11 and a DHCT 16. Data from the QPSK modem 326 is routed by headend router 327 within the headend 11. The headend router 327 is also responsible for delivering upstream application traffic, such as a user requests for PRM content, to the various application servers, such as, for example, PRM application server 319.

FIG. 4A is a block diagram illustrating a DHCT 16 that is coupled to a headend 11 and to a television 441. It will be understood that the DHCT 16 shown in FIG. 4A is merely illustrative and should not be construed as implying any limitations upon the scope of the preferred embodiments of the invention. Some of the functionality performed by applications executed in the DHCT 16 (for example, the PRM application client 477) may instead be performed at the headend 11 and vice versa, in some embodiments. A DHCT 16 is typically situated at the residence of a user or place of business and may be a stand-alone unit or integrated into another device such as, for example, a television set or a personal computer or an audio device, such as, for example, a programmable radio. The DHCT 16 preferably includes a communications interface 442 for receiving signals (video, audio and/or other data) from the headend 11 through the network 18 and for providing any reverse information to the headend 11 through the network 18.

The DHCT 16 preferably includes at least one processor 444 for controlling operations of the DHCT 16, an output system 448 for driving the television display 441, and at least one tuner system 445 for tuning into a particular television channel to be displayed and for sending and receiving various types of data or media content to and from the headend 11. In other embodiments, multiple tuners can be used. The tuner system 445 includes, in one implementation, an out-of-band tuner and upstream transmitter for bi-directional QPSK data communication and a quadrature amplitude modulation (QAM) tuner (in-band) for receiving television signals. It should be appreciated that the OOB tuner and upstream transmitter can be one component, or in other embodiments, the tuner and transmitter can be independent of each other and located separately within the DHCT 16. The OOB tuner and upstream transmitter enables the DHCT 16 to interface with the network 18 so that the DHCT 16 can provide upstream data to the network 18, for example, via a QPSK channel that serves as an upstream OOB channel and received by a QPSK receiver in QPSK modem 326 in headend 11. In this manner, a subscriber can interact with the subscriber television system to request services or the data of services such as, for example, PRM content. Alternatively, the upstream data transmission can be effected via a QAM channel with a QAM transmitter in DHCT 16 and a QAM receiver in headend 11. Alternatively, a telephone modem in the DHCT 16 can be utilized for upstream data transmission. Further, a headend 11 or hub 12 (FIG. 1) or other component located upstream in the subscriber television system may receive data from a telephone network coupled to a telephone modem and can route the upstream data to a destination internal or external to the subscriber television system.

The DHCT 16 preferably includes a demultiplexing system 443 comprising functionality for QAM demodulation, forward error correction (FEC), transport demultiplexing, decryption (via decryptor 588), and parsing, as is well known in the art, for signal processing of broadcast media content and data in the subscriber television system. Transport demultiplexing preferably includes MPEG-2 transport demultiplexing. The demultiplexing system 443 in communication with communication interface 442, tuner system 445 and processor 444 effects reception of compressed video streams, compressed audio streams, and compressed data streams corresponding to a selected program to be separated from other programs and/or streams transported in the tuned transmission channel and to be eventually stored in secondary storage device 414 (FIG. 4A) in accordance with one embodiment of the invention, as will be described in greater detail below.

The security processor 565 is a secure element for performing security and conditional access related functions. More particularly, the security processor 565 functions to authorize the DHCT 16 of a paying subscriber to execute specialized functionality of the DHCT 16, such as receiving and decrypting (or descrambling) encrypted (or scrambled) media content and other data sent from a remote device. Security processor 565 preferably includes a microprocessor and a memory that only the microprocessor of the security processor 565 may access. Preferably, security processor 565 is contained in a tamper proof package. With reference to FIG. 3, in one implementation, encryption is applied to the data stream of the requested media content, for example the respective PRM content, at the QAM group 324 at the headend 11 according to encryption methods well-known to those of ordinary skill in the art. An encryption component resident in the QAM group 324 in the headend 11 and under the direction of the DNCS 323 encrypts, for example, MPEG-2 transport stream packets used to transmit the PRM content. The encrypted PRM content also includes, in one embodiment, entitlement control messages that are recognized by the security processor 565 (FIG. 4A) at the DHCT 16 as information needed to decrypt the encrypted PRM content. Security processor 565 preferably stores authorization information, wherein the authorization information indicates that the subscriber is entitled to access the PRM content. The authorization information is obtained from one or more entitlement messages sent by the headend 11 after, or concurrently with, initialization of the DHCT 16 into a purchased service. If the authorization information indicates that the subscriber is entitled to the PRM content, security processor 565 generates a code word or key based on the authorization information and the received entitlement control message, and the security processor 565 uses this key to decrypt the encrypted PRM content at the decryptor 588 (FIG. 4A).

Additionally, a receiver 446 receives externally generated information, such as user inputs or commands from other devices. The DHCT 16 may also include one or more wireless or wired interfaces, also called communication ports 474 and 475, for receiving and/or transmitting data to other devices. For example, communication ports can be configured as USB (Universal Serial Bus), Ethernet (for connection to a computer), IEEE-1394 (for connection to media devices in an entertainment center), or as serial and/or parallel data ports such as integrated drive electronics (IDE) or small computer system interface (SCSI) port. The user inputs may be, for example, provided by a computer or transmitter with buttons or keys located either on the exterior of the terminal or by a hand-held remote control device or keyboard that includes user-actuated buttons, or the user inputs may be aural.

Figure 4B:
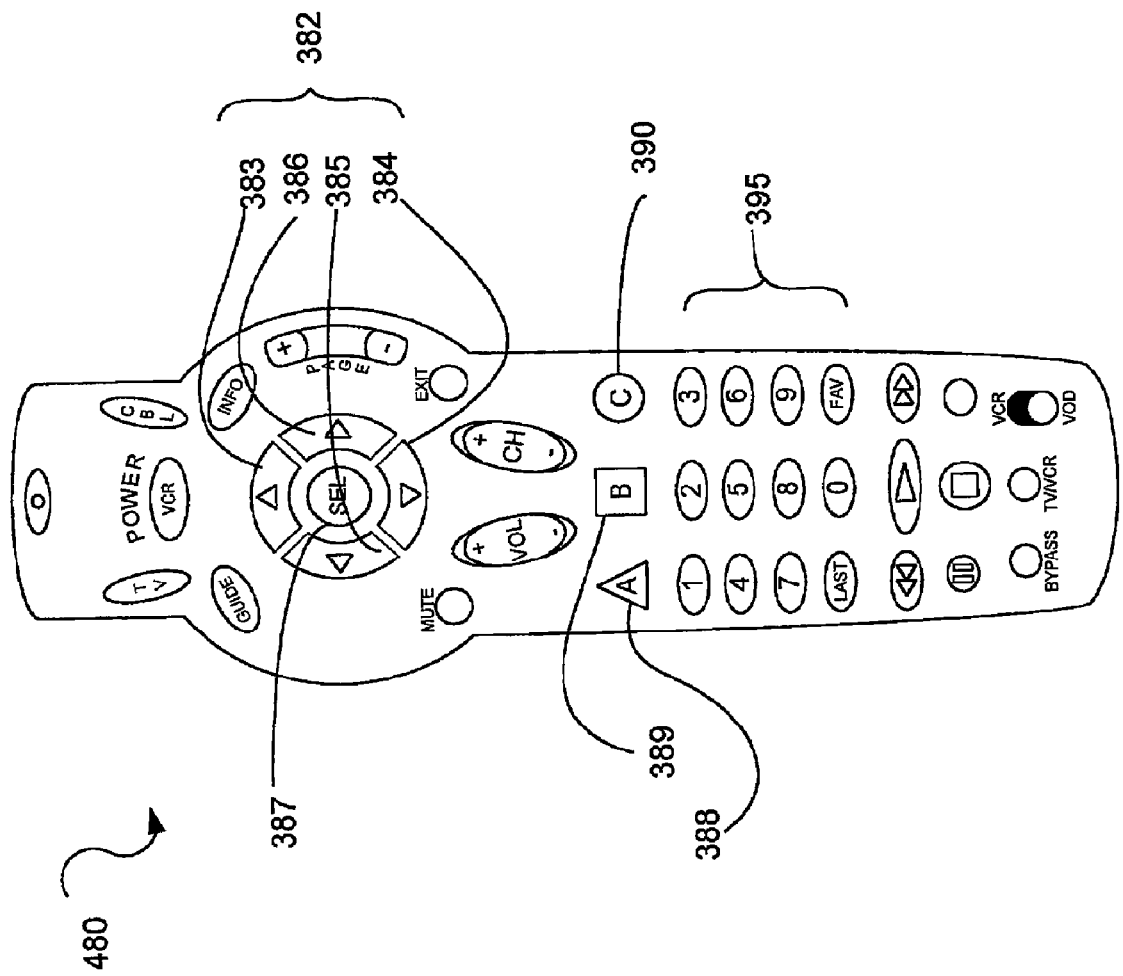
FIG. 4B is a diagram of an example remote control device for providing input to the DHCT depicted in FIG. 1, in accordance with one embodiment of the invention.

FIG. 4B is a block diagram of an example remote control device 480 that is used to provide user input to the DHCT 16. The arrow buttons 382 include an up arrow button 383, a down arrow button 384, a left arrow button 385, and a right arrow button 386 that are used to scroll through options or selections and/or to highlight an option or selection displayed on one of the plurality of user interface screens described below. The select button 387 may be used to select a currently highlighted option or selection that is provided to the user. Lettered button "A" 388, "B" 389, and "C" 390 may be used to implement functions on a user interface screen that have the corresponding letter. Numeric buttons 395 may be used to enter numbers, or configured with the application to enter letters corresponding to the numeric buttons 395. In describing the example screen displays (described below), it will be understood that "selecting" or "pressing" the navigational and lettered buttons on the screen actually require selecting the corresponding buttons, or keys, on remote control device 480. Many alternative methods of providing user input may be used including a remote control device with different buttons and/or button layouts, a keyboard device, a voice activated device, etc. The embodiments of the invention described herein are not limited by the type of device used to provide user input.

Returning to FIG. 4A, in one implementation, the DHCT 16 includes system memory 449, which includes FLASH memory 451 and dynamic random access memory (DRAM) 452, for storing various applications, modules and data for execution and use by the processor 444. Basic functionality of the DHCT 16 is provided by an operating system 453 that is primarily stored in FLASH memory 451. Among other elements, the operating system 453 includes at least one resource manager 467 that provides an interface to resources of the DHCT 16 such as, for example, computing resources. An application referred to as a navigator 455 is also resident in FLASH memory 451 for providing a navigation framework for services provided by the DHCT 16. The navigator 455 registers for and in some cases reserves certain user inputs related to navigational keys such as channel increment/decrement, last channel, favorite channel, etc. The navigator 455 also provides users with television related menu options that correspond to DHCT 16 functions such as, for example, blocking a channel or a group of channels from being displayed in a channel menu.

The FLASH memory 451 also contains a platform library 456. The platform library 456 is a collection of utilities useful to applications, such as a timer manager, a compression manager, a configuration manager, an HTML parser, a database manager, a widget toolkit, a string manager, and other utilities (not shown). These utilities are accessed by applications via application programming interfaces (APIs) as necessary so that each application does not have to contain these utilities.

Two components of the platform library 456 that are shown in FIG. 4A are a window manager 459 and a service application manager client (SAM) 457.

The window manager 459 provides a mechanism for implementing the sharing of the screen regions and user input. The window manager 459 in the DHCT 16 is responsible for, as directed by one or more applications, implementing the creation, display, and de-allocation of the limited DHCT 16 screen display resources. It allows multiple applications to share the screen by assigning ownership of screen regions, or windows. The window manager 459 also maintains, among other things, a user input registry 450 in DRAM 452. When a user enters a key or a command via the remote control device 480 or another input device such as a keyboard or mouse, the user input registry 450 is accessed to determine which of various applications running on the DHCT 16 should receive data corresponding to the input key and in which order. As an application is executed, it registers a request to receive certain user input keys or commands. When the user presses a key corresponding to one of the commands on the remote control device 480, the command is received by the receiver 446 and relayed to the processor 444. The processor 444 dispatches the event to the operating system 453 where it is forwarded to the window manager 459 which ultimately accesses the user input registry 450 and routes data corresponding to the incoming command to the appropriate application.

The client SAM 457 is a client component of a client-server pair of components, with the server component being located on the headend 11 preferably in the DNCS 323 (FIG. 3). A SAM database 460 (i.e. structured data such as a database or data structure) in DRAM 452 includes a data structure of services and a data structure of channels that are created and updated by the headend 11. Herein, database will refer to a database, structured data or other data structures as is well known to those of ordinary skill in the art. Many services can be defined using the same application component, with different parameters. Examples of services include, without limitation and in accordance with one implementation, presenting television programs (available through a WatchTV application 462), pay-per-view events (available through a PPV application 464), digital music (478), video-on-demand (available through a VOD application 463), purchasable recordable media (PRM) services (via PRM application client 477), and an interactive program guide (available through IPG application 377). In general, the identification of a service includes the identification of an executable application that provides the service along with a set of application-dependent parameters that indicate to the application the service to be provided. For example, a service of presenting a television program could be executed by WatchTV application 462 with a set of parameters specifying the HBO to view HBO or with a separate set of parameters to view CNN. Each association of the application component (tune video) and one parameter component (HBO or CNN) represents a particular service that has a unique service I.D. The client SAM 457 also interfaces with the resource manager 467, as discussed below, to control resources of the DHCT 16.

Application clients, or applications, can also be downloaded into DRAM 452 at the request of the client SAM 457, preferably in response to a request by the user or in response to a message from the headend 11. In one implementation, DRAM 452 contains a video-on-demand application (VOD) 463, an e-mail application 476, a PRM application 477, and a web browser application 475, among others. It should be clear to one with ordinary skill in the art that these applications are not limiting and merely serve as examples for one embodiment of the invention. Furthermore, one or more DRAM based applications may, as an alternative embodiment, be resident in FLASH memory 451. These applications, and others provided by the subscriber television system operator, are top level software entities on the network for providing services to the user.

In one implementation, applications executing on the DHCT 16 work with the navigator 455 by abiding by several guidelines. First, an application, or application client, utilizes the client SAM 457 for the provision, activation, and suspension of services. Second, an application shares DHCT 16 resources with other applications and abides by the resource management policies of the client SAM 457, the operating system 453, and the DHCT 16. Third, an application handles situations where resources are only available with navigator 455 intervention. Fourth, when an application loses service authorization while providing a service, the application suspends the service via the SAM (the navigator 455 will reactivate an individual service application when it later becomes authorized). Finally, an application is designed to not have access to certain user input keys reserved by the navigator (i.e., power, channel +/−, volume +/−, etc.).

An executable program or algorithm corresponding to an operating system (OS) component, or to a client platform component, or to an application client, or to respective parts thereof, can reside in and execute out of DRAM 452 and/or FLASH memory 451. Likewise, data input into or output from any executable program can reside in DRAM 452 or FLASH memory 451. Furthermore, an executable program or algorithm corresponding to an OS component, or to a client platform component, or to an application client, or to respective parts thereof, can reside in FLASH memory 451, or in a local storage device coupled to DHCT 16 and can be transferred into DRAM 452 for execution. Likewise, data input for an executable program can reside in FLASH memory 451 or a storage device, for example storage device 413, and can be transferred into DRAM 452 for use by an executable program or algorithm. In addition, data output by an executable program can be written into DRAM 452 by an executable program or algorithm and can be transferred into FLASH memory 451 or into a storage device for storage purposes.

In one embodiment, the DHCT 16 includes a primary storage device 413 and a secondary storage device 414. The ability to record programming on the primary storage device 413 provides a convenient method to temporarily buffer programming to fit a viewing schedule, however, in accordance with one embodiment, for economic reasons the DHCT 16 may have a limited amount of primary storage. In one implementation, based on, for example, existing VCR usage patterns, there will be many occasions when the user will want to save or archive programs on the secondary storage device 414 for later viewing or archive the programs for later reference. The primary storage device 413 is preferably internal to DHCT 16 and in electrical communication to an internal main bus for communication with other DHCT 16 elements through a data interface 412 implemented as a SCSI or IDE interface. In other embodiments, the primary storage device 413 can be externally connected to (and thus removable from) the DHCT 16 via a communication port (for example, 474 or 475) that is configured as a SCSI or an IDE interface. The primary storage device 413 is preferably a hard disk drive. The primary storage device 413 preferably exhibits fast seek-time and high data transfer rates properties and its storage medium is preferably non-removable, such as in the case of a hard disk drive. Because the amount of data in one or more downloaded instances of PRM content typically surpasses the memory space allocated for application data in memory 449, and because the primary storage device 413 features sufficiently large storage capacity, the primary storage device 413 serves, in one implementation, as a large repository or cache for downloaded PRM content. Alternatively, memory 449 may be large enough (and fast enough) to accommodate data transfers without the need for the primary storage device 413.

In one implementation, under the auspices of the real-time operating system 453 executed by processor 444, and in coordination with PRM application client 477, downloaded PRM content and/or data is received in DHCT 16 via communications interface 442 and stored in a temporary buffer (not shown) in memory 449. Herein, PRM content and other media content will be understood to also refer to other types of data in addition to, or instead of, media content. The temporary buffer is implemented and managed to enable data transfers from the temporary buffer to the primary storage device 413 in concert with the insertion of a newly arriving PRM content into the temporary buffer. The fast access time and high data transfer rate characteristics of primary storage device 413 enables PRM content to be read from the temporary buffer in memory 449 and written to the storage medium of primary storage device 413 in a sufficiently fast manner. Orchestration of multiple simultaneous data transfer operations is effected so that while PRM content is being transferred from memory 449 to primary storage device 413, new PRM content is received and stored in the temporary buffer. The coordination of data transfers and lower latency characteristics of primary storage device 413 enable PRM content to be received by DHCT 16 at high data rates. The primary storage device 413 functions to store PRM content that is received by the DHCT 16 from the headend 11 on an interim basis.

For permanent or semi-permanent storage, the secondary storage device 414 comprises a storage media drive, internally or externally connected to DHCT 16 in a similar fashion as the primary storage device 413, but featuring at least one high-capacity removable storage medium and, in one implementation, slower seek-time and lower data transfer rates characteristics. The secondary storage device 414 is preferably a multiple compact disc (CD) drive or multiple digital video disc (DVD) carousel or magazine drive that at least has write capability, but may also have read capability among other capabilities. Alternatively, the secondary storage device 414 may be a single CD drive or DVD drive with at least write capability, but may also have read capability among other capabilities, or the secondary storage device 414 can be a video recorder (VCR or D-VCR) or other data recorder. Alternatively, the carousel may be a magazine type. In one implementation, the PRM content that is received and stored on the primary storage device 413 is transferred by way of memory 449 to the secondary storage device 414 wherein it is written to one or more removable media residing in the secondary storage device 414. The transfer of PRM content from primary storage device 413 to secondary storage device 414 can occur concurrently to the download of the respective PRM content in a coordinated sequential fashion or after the respective PRM content has been completely received and stored in the primary storage device 413. In the former case a second temporary buffer (not shown) in memory 449 is utilized to implement the transfer of PRM content from the primary storage device 413 to secondary storage device 414. Given its faster seek time and higher data transfer rate characteristics, primary storage device 413 preferably operates faster than the secondary storage device 414. Alternatively, PRM content is transferred from memory 449 to the secondary storage device 414 with higher data rate transfer characteristics, or yet in other embodiments, PRM content is transferred from a remote server or other remote device to a DHCT 16 communication port and then directly to the secondary storage device 414.

In one embodiment, media content (including PRM content) is first recorded/stored in a primary data buffer (not shown, but for example, in primary storage device 413) and indexed by content ID and record date/time information (i.e. meta data). The minimum content ID information collected is the originating channel number but could include program ID (PID) or other media content and media content description information. The record date/time information is simply the date/time the recording was made and is used by the system for data management/purge and can also be used by the subscriber, via archiving mechanisms of the PRM application, as one of several methods to locate previously recorded media content. The media content recorded in the primary buffer is available for viewing and disposition by the subscriber. Media content can be viewed, deleted, or spooled along with the data accessible by universal or widely adopted access and naming conventions (e.g., as is characteristically in meta data) to a secondary buffer (not shown, but for instance, in secondary storage device 414) for longer term storage and playback. Media content left in the primary buffer are subject to be deleted (i.e. the associated disk space made writeable) by new media content. In one embodiment, the secondary buffer is located on removable media that can be stored for future playback.

Also as shown in FIG. 4A, the DHCT 16 preferably includes access to a printer 458, either connected locally to the DHCT 16 or via a home communication network via communication port 474. In one implementation, the printer 458 prints labels to be applied to the removable media (i.e., CDs or DVDs) of the secondary storage device 414. Preferably, these labels convey, at least, verification of purchase and authenticity of the data written to the media. Thus, in one implementation, labels are printed by the printer 458 as a result of an execution signal received by the printer 458 from the PRM application client 477 as a result of an authorized purchase of PRM content in which authorization was granted from the headend 11. Alternatively, DHCT 16 may operate without the printer 458.

The PRM application client 477 configures the DHCT 16 for the download, purchase, and billing of PRM content, including configuring the DHCT 16 for receipt of trial and impulse purchases of PRM content. The PRM application client 477 preferably is downloaded into DRAM 452 from the headend 11. Alternatively, the PRM application client 477 may be resident in FLASH memory 451. To offer PRM service, in one implementation, the subscriber television system operator assigns a portion of the downstream and upstream bandwidth capacity in the subscriber television system to be dedicated for transmission of PRM content. The amount of bandwidth capacity that can be allocated to the PRM service is finite. Grants for requests to download (i.e. transmit) PRM content may be limited during peak-time periods that correspond to high bandwidth consumption by a plurality of other services. On the other hand, off-peak-time periods may feature unused bandwidth capacity intended for other services that can be repossessed for downloading of PRM content.

In one embodiment, the amount of bandwidth capacity allocated for PRM service varies throughout time to reflect bandwidth consumption by a plurality of bandwidth consuming services, including but not limited to VOD services. During peak periods of other bandwidth consuming services such as, for example, video-on-demand (VOD), the amount of bandwidth capacity allocated to the PRM service is less than during the off-peak periods. Consequently, the duration for downloading a PRM content instance during peak-periods is typically longer than the duration for downloading a PRM content instance during off-peak periods. For example, VOD off-peak periods may run from 6:00 AM to 11:00 AM during the first week of May. Accordingly, the DNCS 323 (FIG. 3) at the headend 11 will allot bandwidth for downloading PRM content by repossessing the off-peak unused bandwidth assigned to video on-demand services via a plurality of DTSs 240 (FIG. 2).

In one embodiment, referring to FIG. 3, under coordination and communication between content manager 321, DNCS 323, and PRM application server 319, PRM content is transferred from PRM application server 319 or other application servers (not shown) to VOD content server 322 via Ethernet connection 332 to effect PRM content delivery over repossessed unused bandwidth intended for VOD services. The DNCS 323 communicates the frequency where unused bandwidth is repossessed to subscriber DHCTs requesting PRM services (i.e. subscribers who have elected downloads of PRM content during these times) resulting in the tuner system 445 (FIG. 4A) of a requesting DHCT 16 to tune to the corresponding frequency to receive the downloadable PRM content.

In another embodiment of the invention, again referring to FIG. 3, under coordination and communication between content manager 321, DNCS 323, BFS 328, and PRM application server 319, purchased PRM content that resides in the PRM application server 319 or in other application servers are transmitted for product delivery from the server wherein media content resides to the BFS server 328 via Ethernet connection 332. A particular PRM content instance may reside indefinitely in BFS server 328 due to the high demand of that particular content or content instance, or temporarily during times of unused BFS bandwidth. In another embodiment, introduction of new media content releases, such as games or audio content, may reside in the BFS server 328 for a finite period, such as a month, starting from their introduction time. Alternatively, PRM content may reside in a BFS server 328 for periods of times in which BFS server 328 exhibits unused bandwidth capacity. Thus, the PRM application server 319 (FIG. 3) employs available bandwidth capacity using in-band or out-of-band services or a combination thereof. Numerous unique combinations of PRM content delivery may be employed when lacking bandwidth resources.

According to one implementation, bandwidth allocation for PRM service is managed according to a series of recurring sub-schedules consisting of a plurality of non-overlapping time intervals as illustrated in FIG. 5. "N" sub-schedules are illustrated in FIG. 5, with the understanding that a plurality of sub-schedules may appear between sub-schedule #1 and sub-schedule #N. Time intervals are demarcated by time marks 510, 520, etc., on horizontal time axis 505, and represent times within a 24 hour period. The interval between these time marks, such as between time marks 510 and 520, represent a period during the 24 hour period, for example, 2:00 AM to 5:00 AM. The time mark 530, continuing the example, would represent 9:00 AM, and thus this interval will span 4 hours (time mark 530, which is 9:00 AM minus time mark 520 (5:00 AM) equals 4 hours). The corresponding bandwidth allotted during these time intervals is represented by the blocks over the corresponding time intervals, such as block 590 over the second time interval bordered between time marks 510 and 520. Allocated bandwidth goes from, for example, zero at the intersection point 501 of the horizontal time axis 505 and vertical bandwidth axis 507 in sub-schedule #1 to increasing bandwidth when advancing up from zero at intersection 501. Preferably, the time intervals vary in length and are established with demarcation according to collected historical data of bandwidth consumption patterns for a plurality of services. Allocation of bandwidth capacity may vary between one time interval to the next. Pricing for each respective PRM content instance may or may not vary in each of the respective time intervals according to, in one implementation, whether the time interval is a peak period or not. For example, during peak periods, such as 6:00 to 11:00 P.M. of the week nights, the recurring schedule may exhibit higher pricing for PRM services whereas during certain, low-demand time periods such as 6:00 to 11:00 A.M of the weekend days the pricing will be lower. As disclosed below, other factors such as demand for new releases and popular media content may also influence pricing. Therefore, allocation of bandwidth capacity for PRM services can be configured to adapt in a time-specific manner according to a plan.

Figure 6:
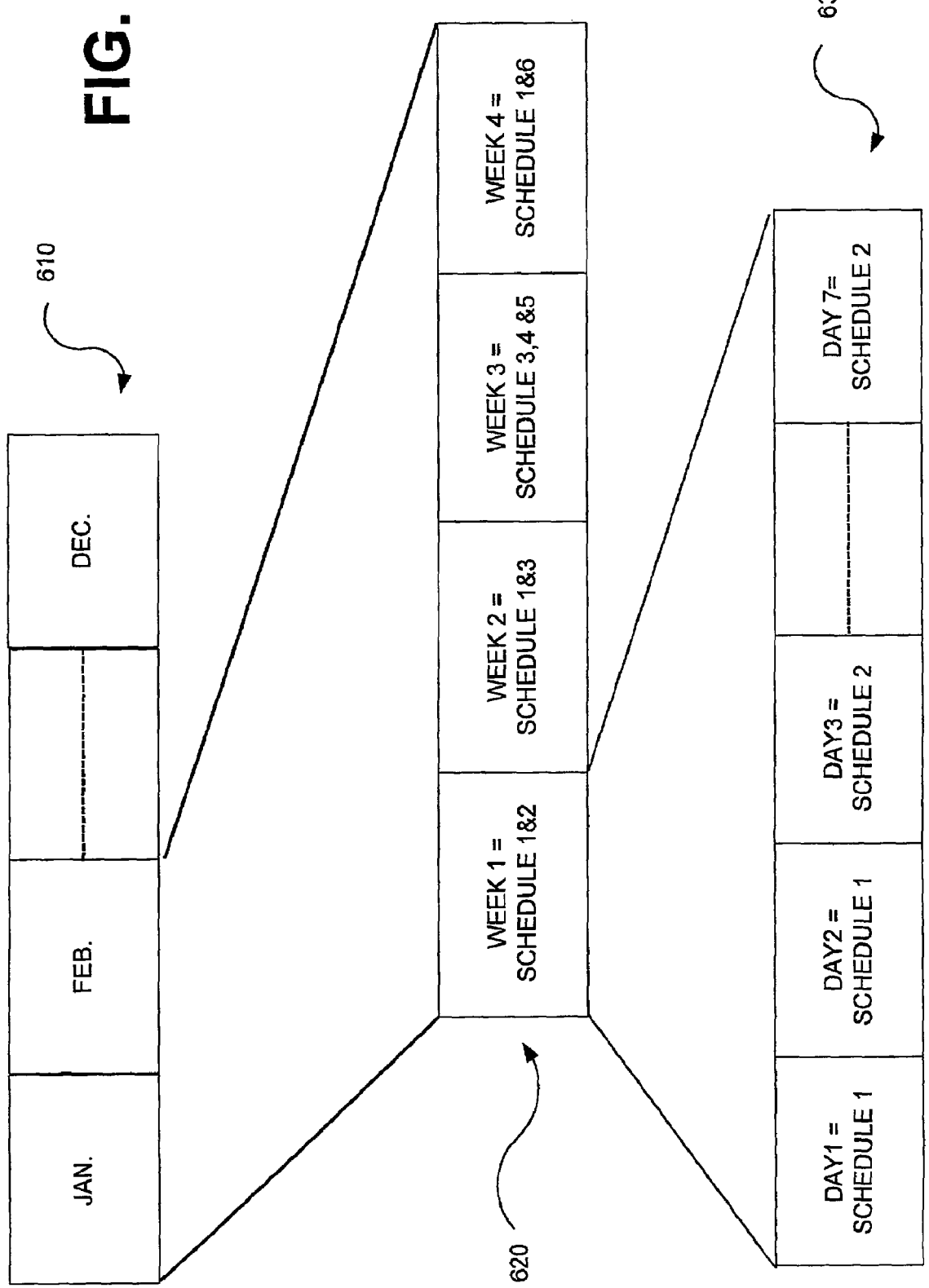
FIG. 6 is a block diagram illustrating a sub-schedule plan for implementing the sub-schedules depicted in FIG. 5 on a monthly, weekly, and daily basis, in accordance with one embodiment of the invention.

The allocated bandwidth PRM services can be configured to switch as time progresses from a first allocation sub-schedule to a second allocation sub-schedule according to a main schedule that specifies the time interval when each of two or more sub-schedules is to be active as illustrated in FIG. 6. As noted in FIG. 6, the plan may consist, in one embodiment, of scheduling for the year with multiple schedules 610, further administered with fewer schedules on a per week basis 620, and administered with even fewer schedules on a daily basis 630. For example, only one configurable sub-schedule is active at a time throughout the configurable recurring schedule but a first configurable sub-schedule may be active throughout one or more distinct and non-overlapping time intervals of the configurable recurring schedule. The recurrence of the schedule is configured to one of a plurality of time periods such as a weekly, daily, or a monthly recurring schedule.

According to another possible bandwidth allocation schedule, a multiplicity of time-adaptive schedules for each of a multiplicity of recurring schedule choices are pre-configured. In this embodiment, the cable system operator may monitor the bandwidth and PRM service usage and be given the option of manually implementing one of the pre-configured allocation schedules without following a plan.

Alternatively, the DNCS 323 (FIG. 3) may automatically monitor bandwidth usage and automatically select one of the pre-configured schedules. For instance, six different configurations may be available for time-adaptive management of the bandwidth allocated for PRM services for a daily recurring schedule. On the other hand, more than six different arrangements may be necessary when implementing time-adaptive bandwidth management on a weekly recurring schedule.

Figure 7:
FIG. 7 is a screen diagram of an example IPG screen for accessing purchasable recordable media content, in accordance with one embodiment of the invention.

In one embodiment, as illustrated in FIG. 7, the user is presented with an interactive program guide (IPG) 770 which has PRM icons next to varied media content selections, suggesting to the user the availability of a downloadable and recordable option for those selections. The icons, and their screen coordinates, can be stored locally as an attribute in each program (i.e. media content) record, like stereo or second audio program (SAP) attributes. The program records can be stored in a database in the DHCT 16, for example an IPG database 483 or the PRM database 481 (FIG. 4A). Alternatively, the program records can be maintained at the headend 11 (FIG. 3). Any application can display the icon after, for example, the program title in the application graphical user interface (GUI) presentation (e.g. IPG 770). For example, selections Saving Private Ryan and American History under the PPV category 776 have icon "CD/DVD" next to them suggesting to the user that these selections are available for downloading to a recordable medium, such as a CD or DVD.

Figure 9:
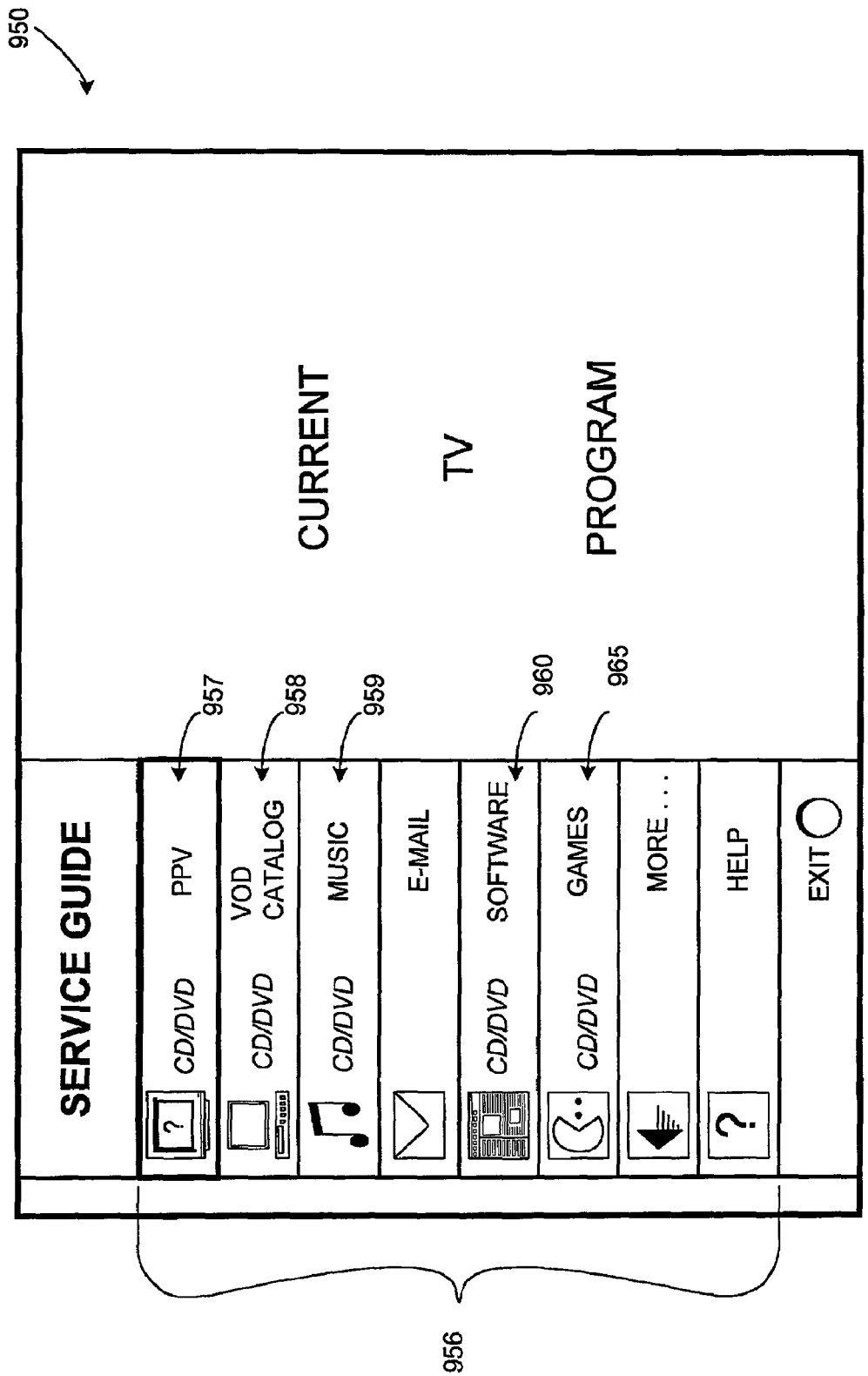
FIG. 9 is a screen diagram of an example service guide for accessing purchasable recordable media content, in accordance with one embodiment of the invention.
Figure 10:
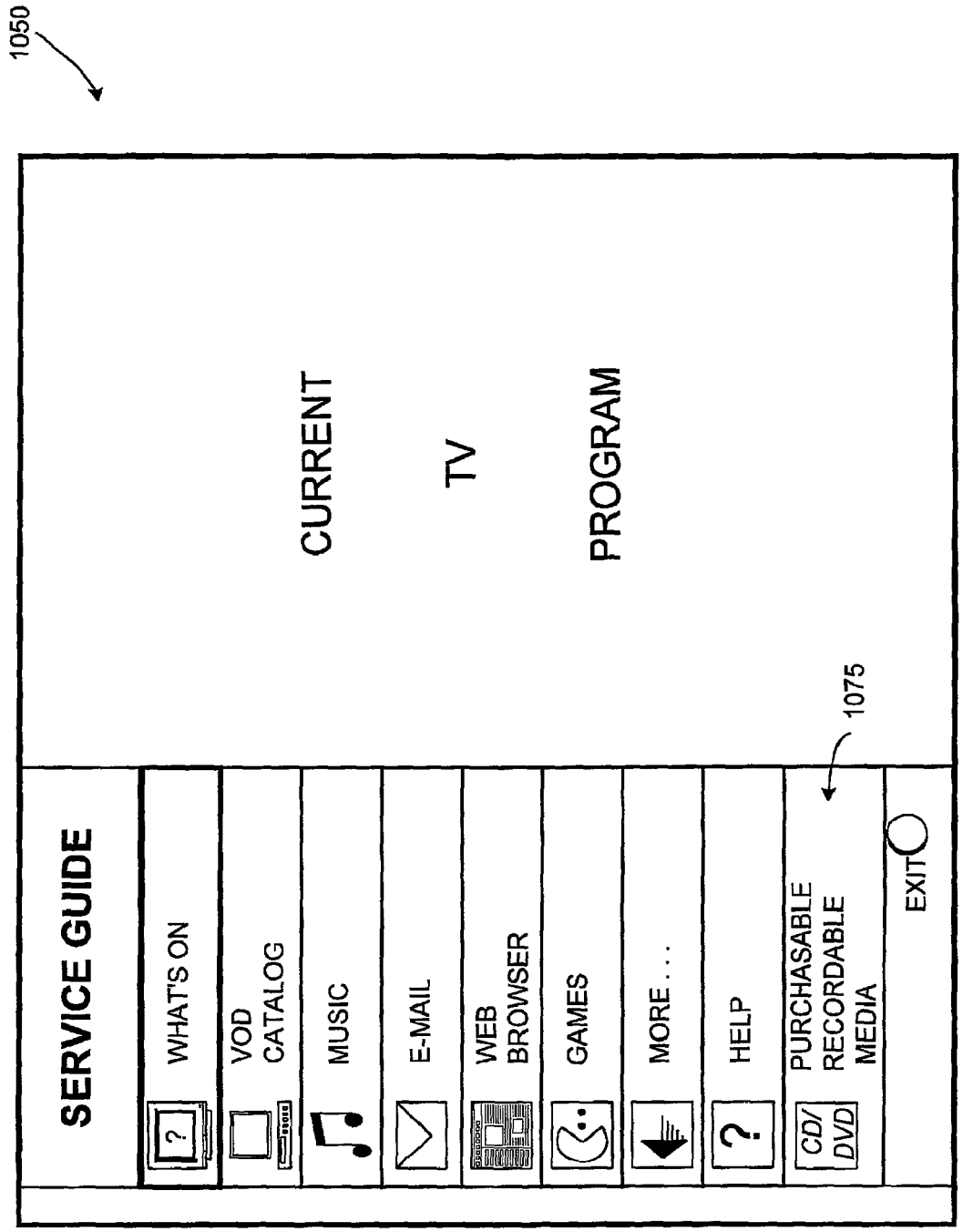
FIG. 10 is a screen diagram of an alternate embodiment of an example service guide for providing notice to the user that purchasable recordable media content is available, in accordance with one embodiment of the invention.

In another embodiment, the user may be presented with a service guide option 876 such as in the example IPG 890 depicted in FIG. 8. Upon selecting the service guide option 876, the user is presented with service selections 956 in a service guide, such as example service guide 950 as illustrated in FIG. 9. Alternatively, the PRM service 1075 may be a selectable service entity, as illustrated in example service guide 1050 of FIG. 10. Selecting the PRM service 1075 from the example service guide 1050 may present various media content options that are purchasable recorded media content, categorized, for example, in media content categories such as music, movies, software, etc.

Figure 11:
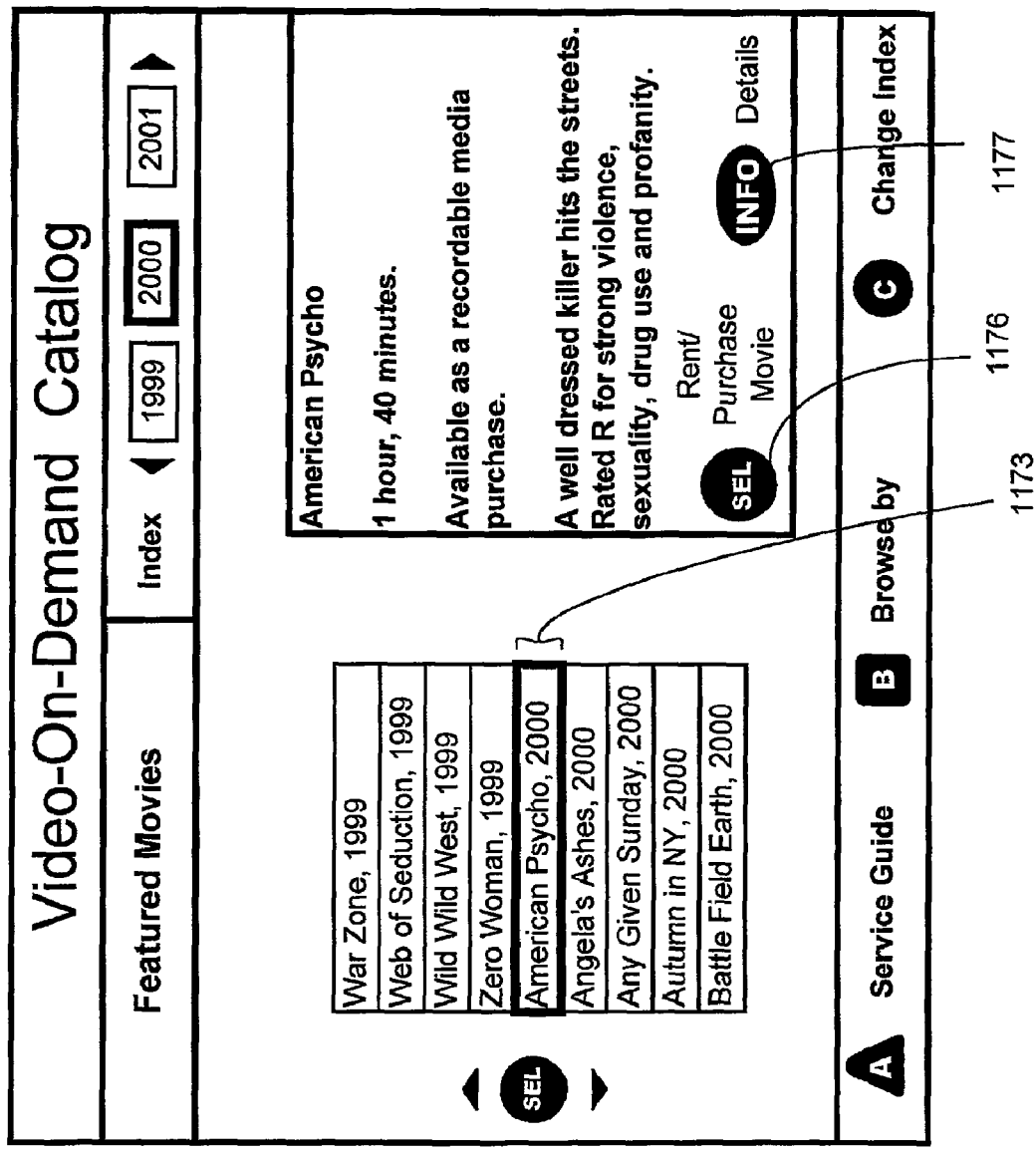
FIG. 11 is a screen diagram of an example video on-demand catalog screen for enabling a user to choose purchasable recordable media content as part of a video on-demand selection session, in accordance with one embodiment of the invention.

FIG. 11 is a screen diagram of an example VOD selection screen display 1170 responsive to the user entering the VOD catalog selection 958 in the example service guide 950 in FIG. 9. A similarly formatted screen may be presented, for example, if the user selects from the service guide 950 (FIG. 9) a PPV selection 957, or music selection 959, or software selection 960. Referring to FIG. 11, the user is presented with an information screen display 1111 that includes a select button 1176, which provides the user the ability to rent or purchase the highlighted selection 1173. By pressing the select button 1176, the user is presented with a user interface screen (not shown) that provides the user with an option to either download (purchase) the highlighted selection 1173 for recording and thus for indefinite personal possession (i.e. buy), or rent. The PRM service is integrated into the VOD catalog, in one embodiment, as another option (like price). In one implementation, the system operator may choose what VOD content is available for PRM service and then program the headend 11 (FIG. 3) accordingly. In another implementation, the content provider may offer certain VOD content with PRM service, which is then a feature provided to the user through the headend 11. Once the user selects the aforementioned download option (not shown), the user will be presented with the example PRM purchase screen illustrated in FIG. 12 and described below. Note that the screen display 1111 also includes an information button 1177, which enables the user to learn more about the highlighted selection 1173 they seek to purchase or rent. If the user selects rent, conventional VOD processing occurs.

Figure 12:
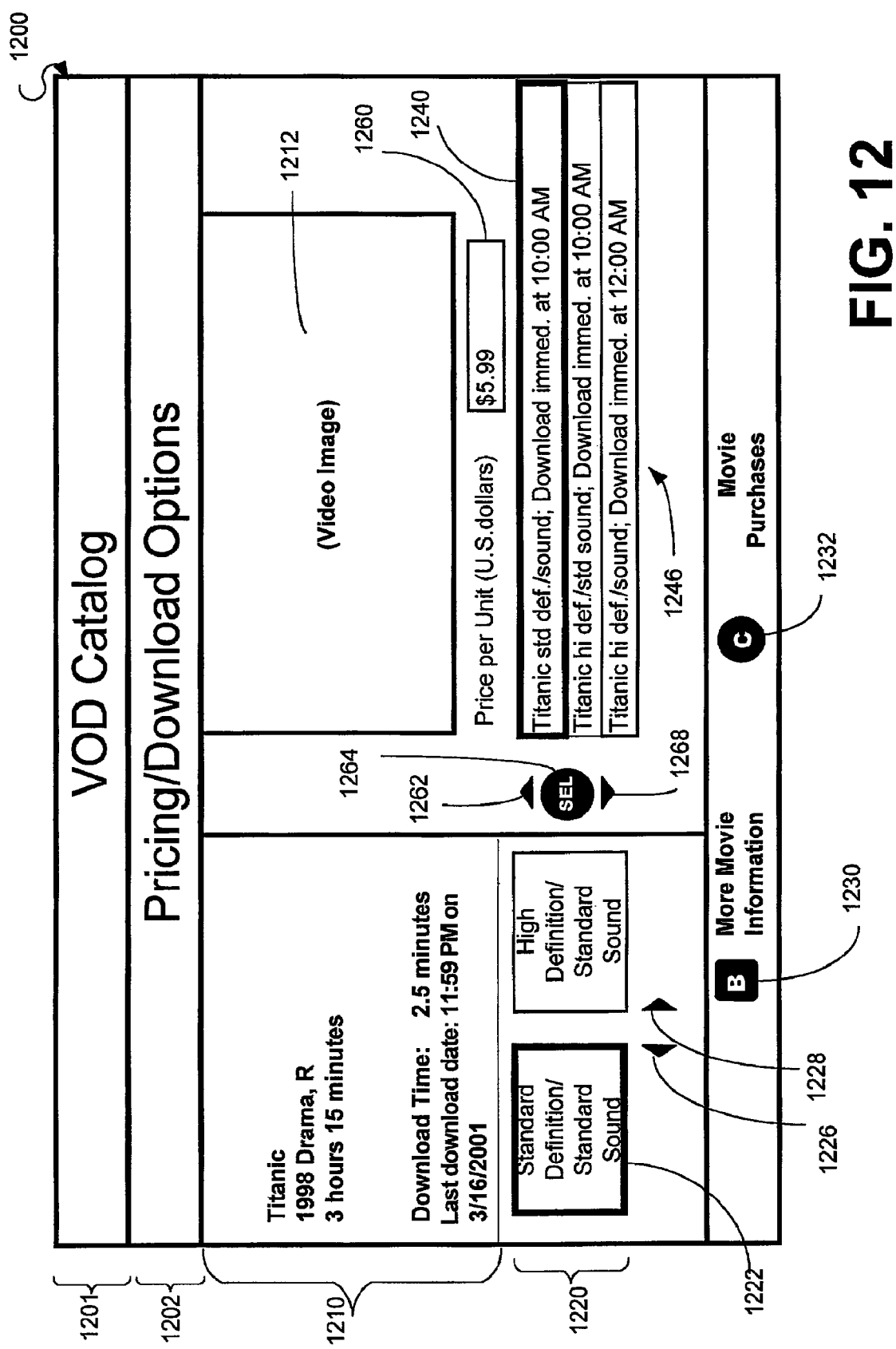
FIG. 12 is a screen diagram of an example purchasing screen for purchasable recordable media content as part of a video on-demand selection session with an example set of download options, in accordance with one embodiment of the invention.

Once the user has decided on a media content selection for downloading, either by entering a selection in an IPG, a service guide, or during the presentation of a particular media content instance as part of an impulse purchase, the user is presented with an example purchase screen 1200, as illustrated in FIG. 12. In one embodiment, this purchase screen 1200 may be invoked as a mini-program located within the PRM application 477 (FIG. 4A) "called" by another application, for example, during a VOD session when the user has selected the purchase option over the rental option, or during a media content instance presentation from a service upon the user requesting an impulse buy. Alternatively, PRM application 477 functionality may exist as a sub-routine within the current media service application in session. Alternatively, PRM application 477 functionality may exist as software in the headend 11 (FIG. 3). Purchase screen 1200 includes title header 1201 identifying the media service from which the PRM content instance will be purchased. Subtitle header 1202 suggests the purpose of the purchase screen 1200, which is to select download and price options. The reduced screen area 1212 displays an image from the media content instance to be purchased. Assuming that the movie selection was Titanic, a picture of a representative scene for the highlighted movie may be presented. Similarly, pictures of representative spreadsheets from a software product selected may be displayed, or a picture of a song artist may be displayed for the music selection, all mentioned by way of example. Information section 1210 contains some characterizing information about the media content purchase, including but not limited to media content title, date of composition, rating, download time, and available purchase window. Content quality index 1220 provides the user with content quality options, such as, for example, high definition television or standard definition, surround sound, etc. A higher quality option may require additional consumption of system resources.

As with other user interface screens described previously, the user preferably advances highlight block 1222 over a desired content quality option of the content quality index 1220 by using left scroll arrow 1226 or right scroll arrow 1228. Selections preferably advance until an end is reached in the list, or alternatively, selections may "wrap-around" in a manner whereby the selections repeat themselves. Download option list 1246 contains download options. The user advances the highlight block 1240 over the desired download option by using up arrow 1262 and down arrow 1268, and a corresponding price for that option and content quality is displayed in the price block 1260. Pricing for PRM content and the planning and/or scheduling of bandwidth are inherently related, as the price structure will depend on, among other factors, the time of the download and the duration of the download. In a subscriber television system that markets PRM content with a plurality of prices, a first subscriber may be willing to pay a premium to immediately download a PRM content instance that is purchased during a peak-period. A second subscriber may pay a lesser purchase fee when purchasing a PRM content instance during a peak-period but selecting to download the purchased PRM content instance at a later time corresponding to an off-peak period.

In one embodiment, the PRM service offers a plurality of prices for a PRM content instance, and each respective price is associated with a different downloading time and a download duration. The price assigned to each available download option may depend on a number of factors. Demand for a PRM content instances, such as for new releases and popular media content instances, may influence pricing. The amount of bandwidth consumed to download the PRM content instance (and hence the download duration), the time of day, the day of the week (weekday, weekend, or holiday), and the amount of time that the subscriber has to wait until the downloading operation starts also influence the price. Other factors that influence pricing of a PRM content instance include the PRM content type (e.g., audio, movie, or game), the PRM content quality (e.g., CD quality or surround sound quality audio; standard or high-definition picture quality), and the delivery mode (e.g., repossessed VOD excess bandwidth or via BFS services). In the example purchase screen 1200 of FIG. 12, the user highlights an immediate download option, but other options (not shown) include downloads with a duration ending after a defined period (e.g. 1 hour) beginning from the download selection and purchase of the PRM content, and delayed download starts for subsequent immediate or extended duration, for example. Furthering this example, the user has indicated a desire for standard definition video with standard sound (as illustrated by the option within highlight block 1240), but other content quality options can be scrolled to and selected. Price block 1260 shows that the resultant price for this download configuration is $5.99. Other download options can be presented as the user scrolls through the list, including lower priced downloads during traditional off-peak VOD time periods (e.g. early morning), "trickle" downloads (i.e. extended duration downloads), downloads that have a delayed start, but are immediate or are extended, or downloads with varying quality levels.

Other features illustrated in the example purchase screen 1200 of FIG. 12 include interactive mechanisms for the user. The select button 1264 enables the user to purchase the desired selection. The user may select the "B" more movie information button 1230 to learn more details about the movie the user is about to purchase. The user may also select the "C" movie purchases button 1232 to return to the main media content screen, for example, the VOD catalog screen as illustrated in FIG. 11, to consider other movie purchases.

The PRM application client 477 (FIG. 4A) and the PRM application server 319 (FIG. 3) communicate via system communication resources and functionality extended via communication with DNCS 323 (FIG. 3). The PRM application client 477 provides for a user interface for specification of downloading options in communication and cooperation with PRM application server 319 and in cooperation with other client applications, for example VOD 463 and PPV 464 and Music 478 applications (FIG. 4A), as described above. Alternatively, the user interface may be provided from the headend 11 (FIG. 3). The information provided on PRM user interface screens, such as the purchase screen 1200 (FIG. 12), is supported by the PRM database 481 (FIG. 4A). Similar to an IPG application 377 (FIG. 4A) that has an IPG database 483 (FIG. 4A) of records in which program information is supported by client-server IPG counterparts, the PRM application client 477 employs the PRM database 481 of records that comprises PRM content information pertaining to PRM content for presentation to a subscriber. The PRM database 481 contains sufficient information for the presentation of available PRM content at the current time and for subsequent periods. The PRM content information comprises data organized into records of the PRM database 481 with record fields containing, but not limited to, information such as PRM content title, PRM content description, PRM genre, release year, casts or performers list, ratings information, and play duration for each PRM content instance. PRM database 481 also comprises of downloadable content information as well as information comprising downloadable options for a plurality of intervals, starting with the interval corresponding to the current time. Pricing information associated with a downloadable option constitutes another part of PRM database 481 to facilitate pricing updates throughout the progression of time. Alternatively, pricing information may reflect association with PRM content title (i.e. each instance) as well and a price may be associated with each PRM title and downloadable option pair. Downloadable options for a particular interval are displayable in a purchase screen, such as purchase screen 1200 (FIG. 12). Since the downloadable options available in a first interval may be different from the downloadable options for a second interval, PRM client 477 dynamically adapts displayed information according to available download options as the user navigates throughout different intervals. Downloadable content information, downloadable options information, and pricing information may be separate structures of PRM database 481 or one or any combination thereof. The effective window of calendar days in which respective PRM content is purchasable may also be included. Additional information may be included in aggregate fields to denote a PRM content instance rating and consequently support invoking parental control of media content via the PIN entry screen. Other fields designate information about the person that purchased and recorded the media content instance, the seller, the date purchased, the date recorded, and the method of sale (i.e., PRM purchase).

PRM content information associated with PRM content is transmitted on a regular or periodic basis from PRM application server 319 (FIG. 3) to one or more DHCTs 16 (FIG. 4A). The PRM application server 319, in communication with PRM application client 477 (FIG. 4A), effects updates to the PRM database 481 (FIG. 4A) stored in memory 449 (FIG. 4A) or in a storage device (such as storage device 413, FIG. 4A) of DHCT 16. PRM application client 477 reads PRM database 481 records and processes them into a displayable representation as part of a GUI presentation displayed on a television 441 (FIG. 4A) or similar display device for presentation to a subscriber. As described above, PRM content information may comprise descriptive information to populate the entries of a PRM guide, a service guide, or an IPG presentation with the corresponding PRM fields that are presented to the subscriber via a GUI from which a subscriber can select and request additional descriptive information about respective PRM content. Hence, per PRM content in the displayed presentation to the subscriber, the subscriber can retrieve and view (and hear if applicable) information specific to a PRM content title and proceed to purchase specific PRM content (i.e. one or more PRM content instances).

Considering the download options, such as those illustrated in the purchase screen 1200 (FIG. 12) for example, communication between PRM server 319 (FIG. 3) and PRM application 477 (FIG. 4A) effects PRM application 477 to omit an unavailable download option (or add an available option) in the set of download options 1240 (FIG. 12). Based on information received from PRM server 319, PRM application 477 interprets the information and accordingly adapts the displayed options presented to the user. Received information includes available downloadable options for each of a plurality of intervals, starting with an interval demarcated with a start time equal to the current time and spanning into subsequent future intervals. Availability of download options for intervals in the future can vary as subscribers schedule download options and possibly exhaust network resources for a particular download option during an interval. On the other hand, a particular download option that is unavailable for a future interval becomes available to a second subscriber when a first subscriber cancels a scheduled download option and indirectly return network resources to fulfill the particular download option requested by second subscriber.

In one embodiment, the PRM server 319 (FIG. 3) in communication with the DNCS 323 (FIG. 3) update the planning and scheduling mechanism (as described in association with FIGS. 5 & 6) throughout the progression of time to reflect availability of download options for the plurality of intervals and this information is transmitted from PRM server 319 to PRM application 477 (FIG. 4A). As a non-limiting example, the updated information for adapting the download options is transmitted by employing the messaging and signaling capabilities of the DNCS 323, and the BFS server 328 is employed to deliver the updated information. In one embodiment, the updates are performed on a periodic schedule ahead of the start time of the next predetermined interval to allow sufficient time for PRM application 477 to present the most recent availability of download options to a user. As a non-limiting example, interval can start on 10 minute increments and updates to download options can transpire 5 minutes before each interval (and thus also 10 minutes apart). Updates to downloadable options may also update pricing information for the respective downloadable option to reflect supply and demand. In an alternate embodiment, updates to download options availability are conducted by PRM server 319 in communication with DNCS 323 upon each requested download grant to a first DHCT 16 but transmitted to a second DHCT 16 upon a subsequent download request generated by second DHCT 16.

The download request of the user (as selected, for example, through the purchase screen 1200 of FIG. 12, or unavailable barkers as will be discussed below) can be characterized in several ways. For example, the download type is one characterization. The download type refers to the manner in which the download is accomplished, for example, either as a file via out-of-band transmission (e.g. via BFS server 328, FIG. 3), a file via in-band transmission, or an on-demand session via in-band transmission. Further characterization involves the repository that stores the requested content in headend 11 (FIG. 3). For example, downloadable content may reside in VOD content server 322 (FIG. 3), or be placed in VOD content server 322 for the duration of the download to effect an on-demand in-band transmission. Downloadable content can reside in BFS server 328 or be placed there throughout the duration of the download. Other characterizations include the bandwidth required to effect the download type, the start-time when the subscriber wants to begin the download of the selected PRM content, and the span of time (i.e. duration) of the download beginning from the start-time. The DNCS 323 (FIG. 3) attempts to allocate and assign resources at the selected start-time and for the duration required to fulfill the PRM download request from the headend 11 to the DHCT 16 (FIG. 4A). As a non-limiting example, network resources (i.e. download resources) to effect a download option include downstream bandwidth, signaling support, and server storage. A download option can be further characterized as a deterministic versus non-deterministic transmission. Transmission of content throughout pockets of time when network resources become available to effect part of the download constitutes a non-deterministic transmission. The user can be notified upon completion of the download, for example with an audible signal, a displayed graphical message on TV 441, or a displayed code in the front-panel of DHCT 16.

In one implementation, the user requests PRM content through the purchase screen 1200 (FIG. 12), or a similar screen for purchasing PRM content with different options, as described above, and the DNCS 323 (FIG. 3) attempts to allocate resources to provide the download of the requested PRM content. For a scheduled download, the DNCS 323 queries the application servers of the headend 11 (FIG. 3) to determine if resources are available to fulfill the scheduled download that the subscriber is requesting, and provide notice to the user if service was unavailable. Further, the DNCS 323 can also detect PRM service interruptions that may occur during a download, such as in the case of an emergency or network malfunction. In one implementation, where VOD excess (repossessed) bandwidth capacity is employed to fulfill a PRM content instance purchase request, and with continued reference to FIGS. 3 & 4A, a "session" between the DHCT 16 (FIG. 4A) and the PRM application server 319 (FIG. 3) is set throughout the course of downloading the PRM content instance. Upon the subscriber purchasing a PRM content instance for a price via the displayed user interface (i.e. the subscriber enters input via an input device and such input may comprise a password or PIN to authenticate authorization to purchase the PRM content instance), as described above in association with FIG. 12, a purchase transaction is executed by the processor 444 (FIG. 4A), as configured by the PRM application 477 (FIG. 4A), that, in one implementation, causes a session to be set-up between subscriber television system resources to the DHCT 16.

As facilitated by session manager 334 in DNCS 323 (FIG. 3), a session is a logical entity used to define a connection between the DHCT 16 (FIG. 4A) and the VOD content server 322 (FIG. 3) and the resources used to maintain that connection in the subscriber television system. Session manager 334 coordinates and effects the signaling required to implement the session which is preferably defined by the MPEG-2 standard ISO/IEC 13818-6 IS (MPEG-2 DSM-CC). Upon a session setup request generated by the DHCT 16 (usually in response to a request from a subscriber), the DNCS 323 verifies the eligibility of the DHCT 16 to receive the PRM service. The amount of bandwidth that will be reserved for the duration of the PRM service session is communicated to the relevant servers and headend 11 (FIG. 3) components. Via the messaging capabilities of DNCS 323, the PRM application server 319 (FIG. 3) sends a message to the DHCT 16 that indicates that it is ready to begin delivering the video content using the resources allocated. The DHCT 16 receives information in the message identifying the QAM modulator 324 (FIG. 3) that is transmitting the video content (and hence where to tune to receive the requested content) and the bandwidth allocated to deliver the service. After a session has been established, the DHCT 16 communicates directly with the server in which the content resides, as identified to DHCT 16 by PRM application server 319, to facilitate delivery of the requested PRM service. In certain instances, PRM application server 319 may contain the requested content. Throughout the course of time that a PRM service is active, further messaging is conducted between the respective DHCT 16 receiving the PRM content and the PRM application server 319 to monitor the status of the session, as provisioned by the signaling and messaging mechanisms and capabilities in the network. In one implementation, PRM content is delivered via the BFS server 328, where a session need not be established. However, the DNCS 323 allocates resources for the download of requested PRM content whether a session set-up is required or not, for the duration of time required to effect the download. In one embodiment, the download is effected in a series of intervals scheduled throughout pockets of time for which network resources are projected to be available or as they become available.

The PRM application 477 (FIG. 4A) provides for a plurality of GUIs when PRM content, selected by a user in one of the PRM content purchase screens (e.g. example screen display 1200 in FIG. 12), is unavailable. The GUI screens that are prompted when PRM content is unavailable are prompted using different information than the information that is used for the initial PRM purchase screens. For example, the download options list 1246 (FIG. 12) provides the user with a list of options anticipated via the planning and scheduling mechanisms discussed in association with FIGS. 5 and 6. That is, options are based on a projected bandwidth usage, peak times, etc., that are all factors relevant to furnishing the GUI download options list 1246 of FIG. 12. Nevertheless, projected versus actual resource availability can differ throughout the course of time or at different instances throughout the course of time. For actual PRM service consumption, resource allocation for the requested PRM content, delivered according to download options selected via the purchase screen 1200 (FIG. 12), has to be allocated and assigned by the DNCS 323 (FIG. 3) to the subscriber for consumption, and thus the PRM application 477 waits for a grant acknowledgement from the DNCS 323. Thus, when a subscriber selects a download option, mechanisms are put into effect which may result in the identification of insufficient resources to effect the PRM download as initially requested by the subscriber.

Figure 13:
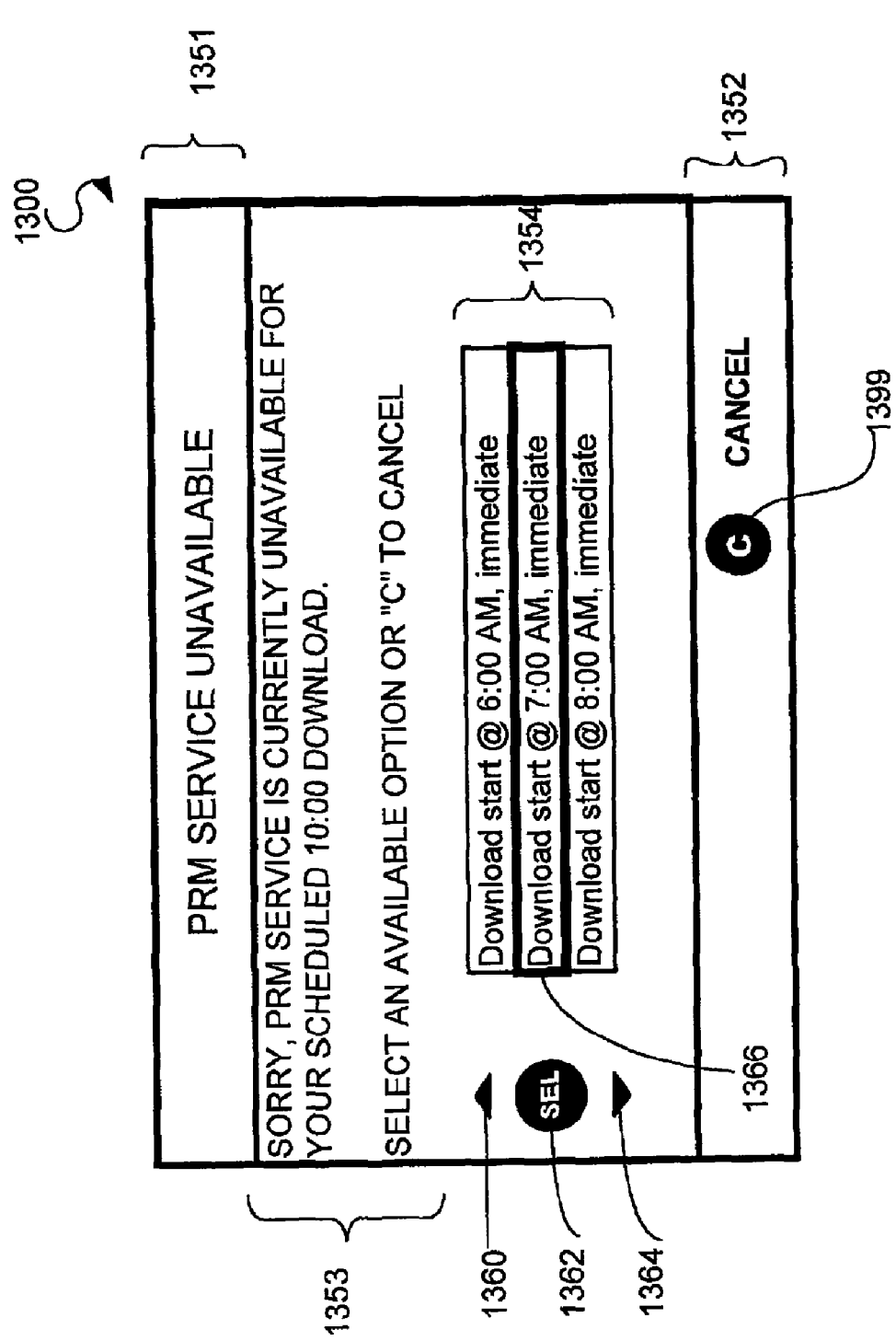
FIGS. 13-19 are screen diagrams of example screen displays presenting to the user various alternate selectable download options when the selected purchase from FIG. 12 is unavailable, in accordance with several embodiments of the invention.

As indicated above, the PRM application client 477 (FIG. 4A) will receive notice from the DNCS 323 (FIG. 3) when the resources necessary to fulfill the requested download cannot be met. The PRM application client 477 will responsively generate an unavailable-service barker comprising a choice of alternate download options, as will be described below in association with FIGS. 13-19. Alternatively, the unavailable-service barker can be generated at the headend 11 (FIG. 3). FIGS. 13-19 are screen diagrams depicting example unavailable-service barker screens that provide the user with a notice of unavailability of requested PRM service and alternative download options in the event of the service unavailability. As described above, the DNCS 323, upon receiving a request that resources could not be allocated during the scheduled time requested, determines when the download can be available and forwards these options to the PRM application client 477 for presentation to the user via a GUI presented, in one implementation, as an unavailable-service barker. FIG. 13 is a screen diagram depicting an example barker screen 1300 resulting when a particular subscriber request for PRM content cannot be fulfilled. For this example, and others that follow, assume the highlighted user download selection made in the example purchase screen 1200 of FIG. 12, with the understanding that similar mechanisms are employed to present alternate download options when PRM content associated with a different initial download option is selected. Top portion 1351 contains a heading describing the problem to the user, a bottom portion 1352 illustrating relevant navigation button(s) available on the remote control device 480 (FIG. 4B) for interacting with the example barker screen 1300, and a top center portion 1353 which provides the user with a message, for example: "SORRY, PRM SERVICE IS CURRENTLY UNAVAILABLE FOR YOUR SCHEDULED 10:00 DOWNLOAD. SELECT AN AVAILABLE OPTION OR "C" TO CANCEL". The user may use up arrow 1360 or down arrow 1364 to advance the highlighted box 1366 over the desired download option from download options list 1354. The user may then enter their selection by pressing the select button 1362. In this example barker screen 1300, the user has scrolled through the download options list 1354 for download options that provide the initially requested PRM content at an earlier time.

Download option list 1354 provides the user with a list of available download options, the content quality (e.g. high definition television versus standard definition) if different from the content quality initially selected, and price (if different from the price of the initial selection). The download options will be generated using information stored in the PRM database 481 (FIG. 4A) for PRM application 477 (FIG. 4A) similar to the database retrieval and presentation mechanisms employed to generate the initial PRM content purchase screen (e.g. purchase screen 1200 of FIG. 12). Alternatively, content quality and price can always be displayed. Alternatively, a screen may be presented such that the user is presented with a button to select alternative download options from purchase screens, such as for example, purchase screen 1200 (FIG. 12). Also, as described above, there exists a variety of information collected in the PRM database 481 (FIG. 4A) that can be used for display presentation to the user. In this example, the user has scrolled through the list to find that the PRM content can be downloaded at an earlier time than the time that the user initially requested. The screen display may present the alternate options at the same price, or at a different price, or no price, depending on the several pricing factors discussed above in association with the purchase screen 1200 of FIG. 12.

Figure 14:
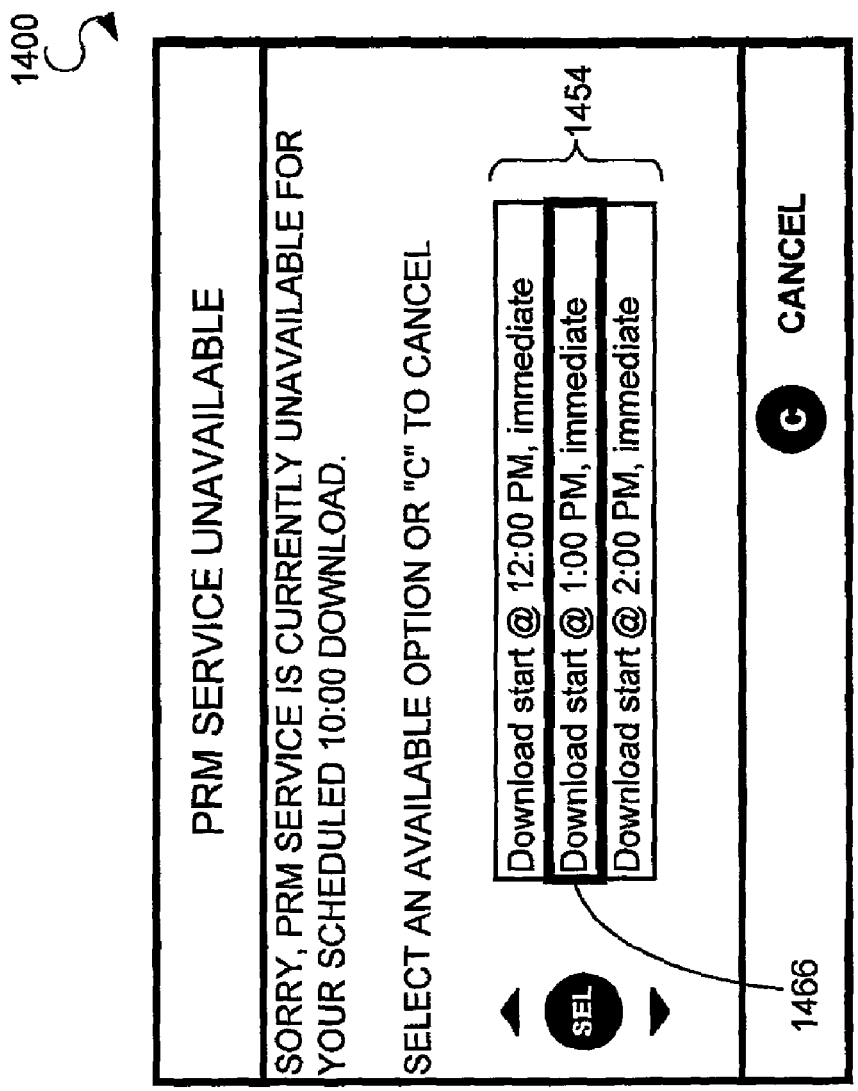
Figure 15:
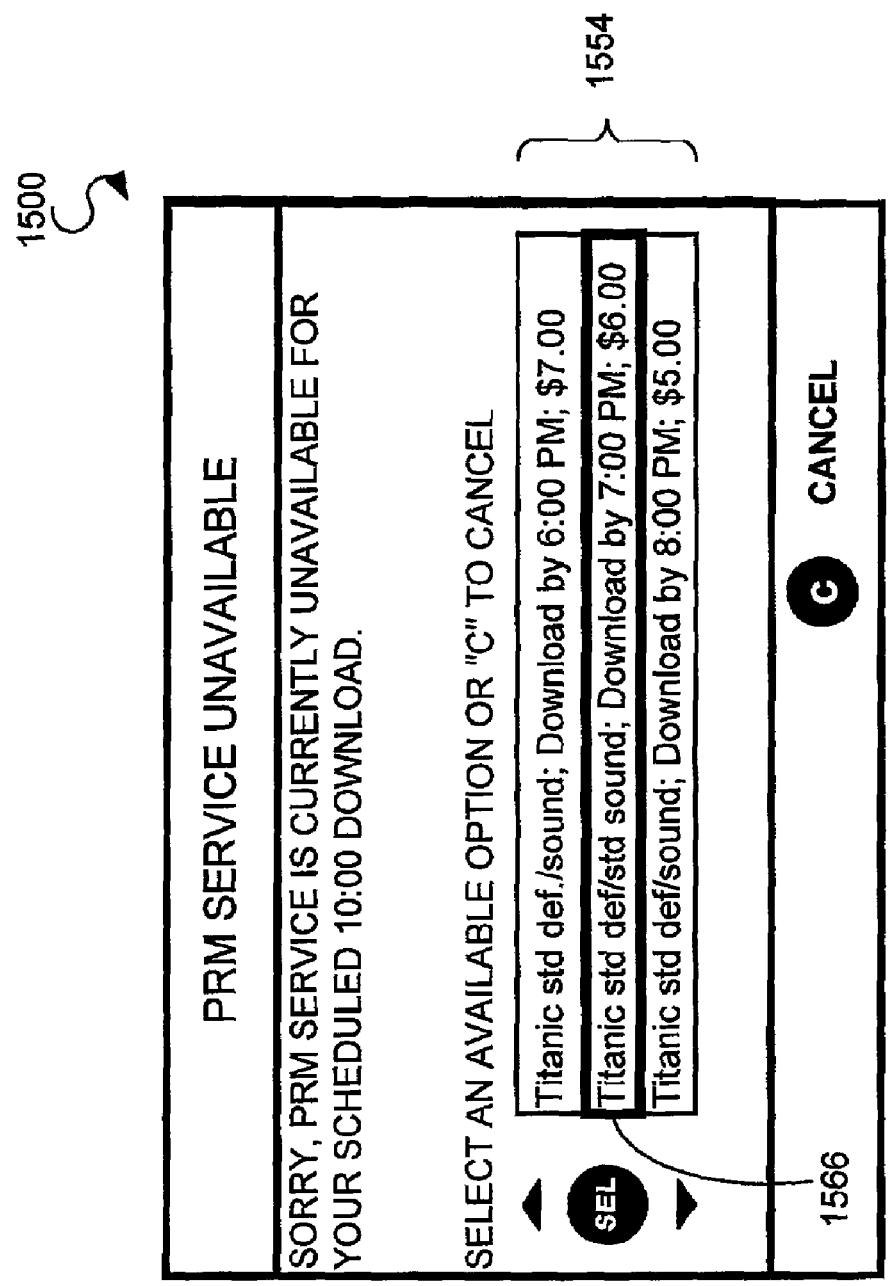
Figure 16:
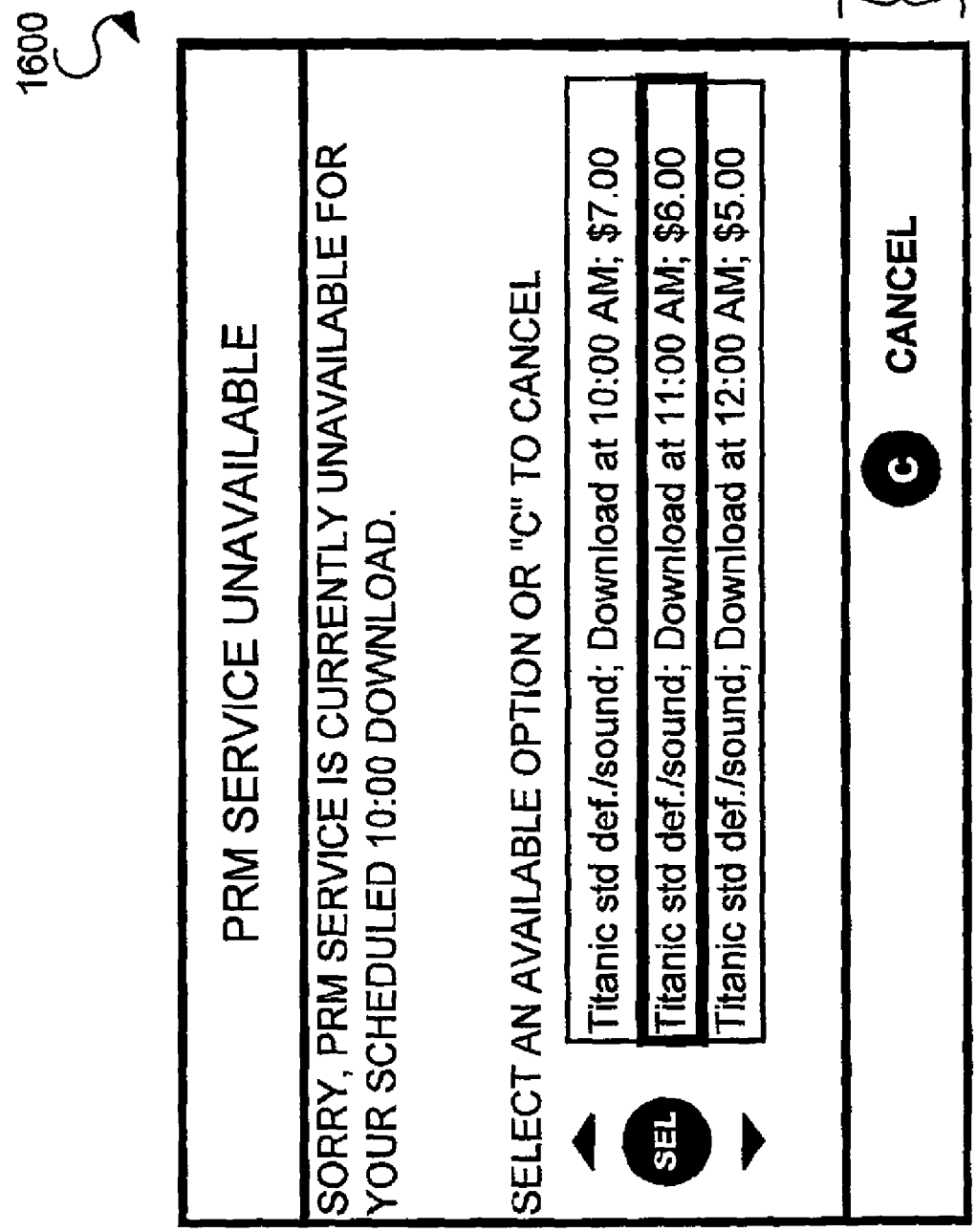

FIG. 14 is a screen diagram of an example screen display 1400 that depicts the situation where the alternate download selection scrolled to and displayed in download options list 1454 presents a download option that is scheduled for a later time. As noted, the user is presented with a message that a selected download option, such as that selected in FIG. 12 or similar screen, could not be met. Further, a list of available options are presented in download options list 1454 that the user can scroll through to find a suitable alternative to his or her initial selection of PRM content. The user has scrolled to a point in the list that presents an option to choose a later time for the download. FIG. 15 is a screen diagram of an example screen display 1500 that depicts the situation where the selected download from purchase screen 1200 (FIG. 12) is unavailable, and the user has scrolled through the download options list 1554 to a download option that offers a different download duration. In this embodiment, the PRM content is transmitted over an extended duration at a lower bandwidth as the bandwidth availability varies throughout the day or non-deterministically as network resources become available. FIG. 16 depicts the situation where the alternate download option from download options list 1654 of example screen display 1600 can be met at the scheduled time requested, but at a quality level different from what was requested initially by the user. For instance, suppose the user has selected a high definition television option for his initial download request. Because standard definition television consumes significantly less bandwidth in comparison to high definition television, the download options presented can include scheduled download times at lower quality levels that may be offered in close time-proximity to the initial requested time of download.

Figure 17:
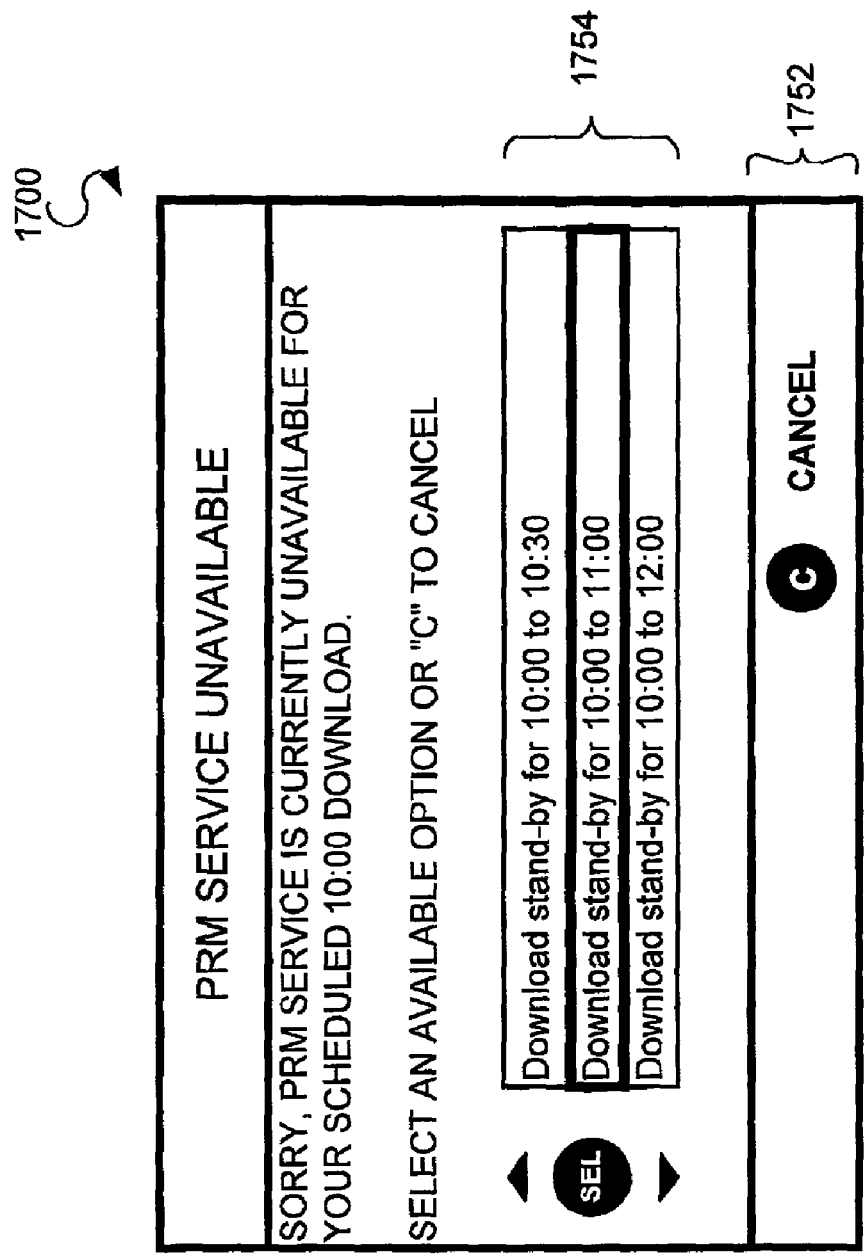

FIG. 17 is a screen diagram of an example screen display 1700 that depicts the situation where the user is presented with a stand-by option. As with the previous example screen displays, the user has scrolled through the list of alternate download options of download options list 1754 and has come to the option that provides the user the choice of waiting a period of time in the stand-by mode. For instance, another subscriber may cancel a scheduled download that was to take effect in, for example, the next half hour. With the user selecting the stand-by option displayed in the download options list, the bandwidth made available (i.e. "freed-up") via the other subscriber's cancellation is now available to meet the stand-by user request. In one embodiment, the user is presented with a confirmation barker (not shown) that is prompted when the PRM content is available to be downloaded. In another embodiment, the download can take place and the user can be notified while the download is occurring, or the user can be notified after the download has occurred, or both. In another embodiment, the user can be notified of the download by an LED display on the DHCT. In another embodiment, the user can be notified by an audio signal, or a tone. The audio signal, or tone, can be implemented alone or in concert with the visual notification.

Figure 18:
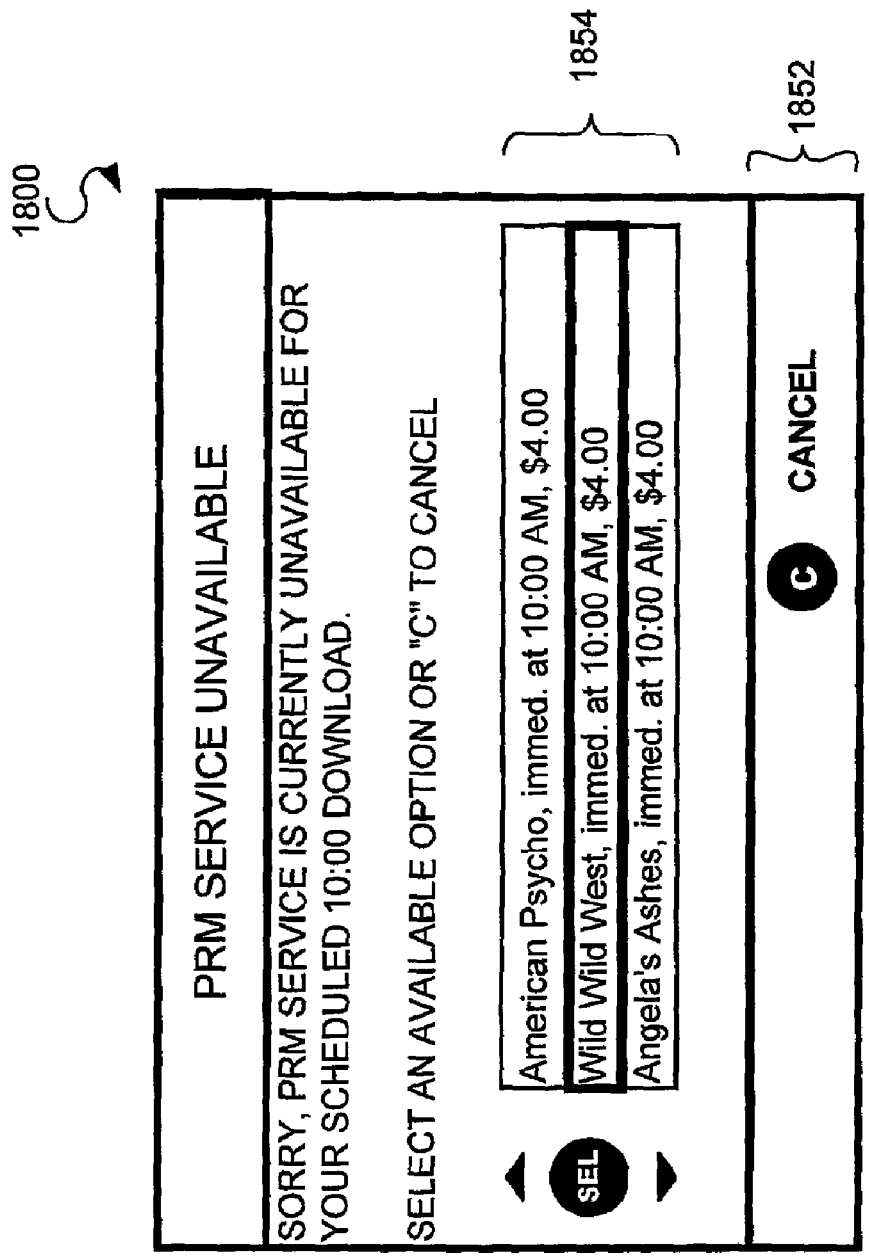
Figure 19:

FIG. 18 is a screen diagram of an example screen display 1800 that depicts the situation where the user scrolls to an option that provides an alternate PRM content title (e.g. movie title, like American Psycho) for the scheduled time. This option can be presented, for instance, at a reduced charge in comparison to the scheduled download, or in other embodiments, a reduced charge relative to standard pricing for the scheduled download. In other implementations, the price can be the same or greater than the initially requested selection. FIG. 19 depicts the situation where the user has scrolled to an "over-ride" option. An "over-ride" option is where the user can request that he or she receive the initially requested PRM content at the scheduled time, despite the unavailable notice, but the "over-ride" option can be at a higher price than the option initially selected. In this option, bandwidth can be preserved by the system operator for situations where users just need to have the PRM content downloaded at the desired time. The option can be presented at a higher price than is typically offered for that PRM content.

The DNCS 323 operating software and the PRM application client 477 which comprise an ordered listing of executable instructions for implementing logical functions, can be embodied in any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" can be any means that can contain, store, communicate, propagate, or transport the program for use by or in connection with the instruction execution system, apparatus, or device. The computer readable medium can be, for example but not limited to, an electronic, magnetic, optical, electromagnetic, infrared, or semiconductor system, apparatus, device, or propagation medium. More specific examples (a nonexhaustive list) of the computer-readable medium would include the following: an electrical connection (electronic) having one or more wires, a portable computer diskette (magnetic), a random access memory (RAM) (magnetic), a read-only memory (ROM) (magnetic), an erasable programmable read-only memory (EPROM or Flash memory) (magnetic), an optical fiber (optical), or a portable compact disc read-only memory (CDROM) (optical). Note that the computer-readable medium could even be paper or another suitable medium upon which the program is printed, as the program can be electronically captured, via for instance optical scanning of the paper or other medium, then compiled, interpreted, or otherwise processed in a suitable manner if necessary, and then stored in a computer memory.

It is emphasized that the above-described embodiments of the present invention, particularly any "preferred embodiments", are merely possible examples of the implementations, among others, that are merely set forth for a clear understanding of the principles of the invention. It will be apparent to those skilled in the art that many modifications and variations may be made to the embodiments of the present invention, as set forth above, without departing substantially from the principles of the present invention. All such modifications and variations are intended to be included herein within the scope of the disclosure and present invention and protected by the following claims.

Therefore, having thus described the invention, at least the following is claimed:

1. A method, implemented in a digital content delivery system, for providing download options for purchasable recordable media (PRM), the method comprising:
   storing a download option associated with a PRM content instance, the download option including at least one time at which the PRM content instance is downloadable from the digital content delivery system; and
   responsive to a change in availability of resources that are associated with transmitting the PRM content instance to a subscriber, updating the PRM download option and transmitting the PRM download option to a digital home communication terminal (DHCT).

2. The method of claim 1, wherein the updating further comprises omitting the at least one time from the download option when the at least one time is no longer available to the subscriber due to a greater than scheduled use of the resources that are associated with transmitting the PRM content instance to the subscriber.

3. The method of claim 1, wherein the updating further comprises adding the at least one time to the download option when the at least one time becomes available to the subscriber due to a less than scheduled use of the download resources.

4. The method of claim 1, wherein the at least one time comprises a plurality of download times at which the PRM content instance is available for download.

5. The method of claim 1, wherein the updating occurs on a periodic schedule ahead of the start time of a next predefined download schedule.

6. The method of claim 1, wherein the updating occurs upon the DHCT requesting the download option.

7. The method of claim 1, wherein the download option further includes a price.

8. A digital content delivery system for providing download options for purchasable recordable media (PRM), the system comprising:
   a tangible computer-readable medium encoded with software; and
   a processor configured to execute the software to:
   maintain a download option associated with a PRM content instance, the download option including at least one time at which the PRM content instance is downloadable from the digital content delivery system; and
   update a PRM database in a digital home communication terminal (DHCT) with the purchasable recordable media (PRM) download option, responsive to a change in availability of resources that are associated with transmitting the PRM content instance to a subscriber.

9. The system of claim 8, wherein the processor is further configured to execute the software to omit the at least one time from the download option when the at least one time is no longer available to the subscriber due to a greater than scheduled use of the resources that are associated with transmitting the PRM content instance to the subscriber.

10. The system of claim 8, wherein the processor is further configured to execute the software to add the at least one time to the download option when the at least one time becomes available to the subscriber due to a less than scheduled use of the download resources.

11. The system of claim 8, wherein the at least one time comprises a plurality of download times at which the PRM content instance is available for download.

12. The system of claim 8, wherein the update occurs on a periodic schedule ahead of the start time of a next predefined download schedule.

13. A method, implemented at a subscriber location, for providing improved availability of purchasable recordable media (PRM) content downloaded from a remote server, said method comprising the steps of:
   providing a download option to a user, the download option associated with a purchasable recordable media content instance and including an indication of at least one time at which the PRM content instance is available for download from the remote server; and
   updating the download option responsive to a change in availability of the download option due to a change in download resources that are associated with transmitting the PRM content instance to the subscriber.

14. The method of claim 13, wherein the at least one download time comprises a plurality of download times at which the PRM content instance is available for download.

15. The method of claim 13, further comprising:
   providing the user notice that an initially selected download option, selected before the change in availability, is unavailable; and
   providing an updated download option to the user that, if selected, enables the PRM content instance to be downloaded at a time that is different than the at least one time in the initially selected download option.

16. The method of claim 13, further comprising:
provide the user notice that an initially selected download option, selected before the change in availability, is unavailable; and
providing an updated download option to the user that, if selected, enables the PRM content instance to be downloaded over a different duration than the initially selected download option.

17. The method of claim 13, wherein the download option further includes a quality level, the method further comprising:
providing the user notice that an initially selected download option, selected before the change in availability, is unavailable; and
providing an updated download option to the user that, if selected, enables the PRM content instance to be downloaded at a quality level that is different than the quality level in the initially selected download.

18. The method of claim 13, further comprising:
providing the user notice that an initially selected download option, selected before the change in availability, is unavailable; and
providing an updated download option to the user that, if selected, enables the user to be placed on stand-by for receiving the PRM media content instance of the initially selected download option.

19. The method of claim 13, further comprising:
providing the user notice that an initially selected download option, selected before the change in availability, is unavailable; and
providing an updated download option to the user that, if selected, enables another PRM content instance to be downloaded in place of the PRM content instance of the initially selected download option.

20. The method of claim 13, further comprising:
providing the user notice that an initially selected download option, selected before the change in availability, is unavailable; and
providing an override option to the user that, if selected, enables the user to receive the initially selected PRM content instance, that is unavailable, by paying a premium.

* * * * *